US011237417B2

(12) United States Patent
Woodgate et al.

(10) Patent No.: US 11,237,417 B2
(45) Date of Patent: Feb. 1, 2022

(54) DIRECTIONAL DISPLAY APPARATUS

(71) Applicant: RealD Spark, LLC, Boulder, CO (US)

(72) Inventors: Graham J. Woodgate, Henley on Thames (GB); Michael G. Robinson, Boulder, CO (US); Jonathan Harrold, Leamington Spa (GB); Robert A Ramsey, Boulder, CO (US); Ben Ihas, Boulder, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 17/244,525

(22) Filed: Apr. 29, 2021

(65) Prior Publication Data

US 2021/0341769 A1 Nov. 4, 2021

Related U.S. Application Data

(60) Provisional application No. 63/017,721, filed on Apr. 30, 2020.

(51) Int. Cl.
*G02F 1/13* (2006.01)
*F21V 8/00* (2006.01)
(Continued)

(52) U.S. Cl.
CPC ......... *G02F 1/1323* (2013.01); *G02B 6/0053* (2013.01); *G02B 6/0068* (2013.01); *G02F 1/0136* (2013.01); *G02F 1/13471* (2013.01)

(58) Field of Classification Search
None
See application file for complete search history.

(56) References Cited

U.S. PATENT DOCUMENTS 3,914,022 A 10/1975 Kashnow
4,059,916 A 11/1977 Tachihara et al.
(Continued)

FOREIGN PATENT DOCUMENTS

CA 2222313 A1 6/1998
CN 1125943 C 10/2003
(Continued)

OTHER PUBLICATIONS

Cheng, et al., "Fast-Response Liquid Crystal Variable Optical Retarder and Multilevel Attenuator," Optical Engineering 52 (10), 107105 (Oct. 16, 2013). (Year: 2013).
(Continued)

*Primary Examiner* — Phu Vu
(74) *Attorney, Agent, or Firm* — Penny L. Lowry

(57) ABSTRACT

A switchable privacy display for an automotive vehicle comprises a spatial light modulator, a first switchable liquid crystal retarder and first passive retarder arranged between a first pair of polarisers and a second switchable liquid crystal retarder and second passive retarder arranged between a second pair of polarisers. A first switchable liquid crystal retarder comprises a two homeotropic alignment layers and a second switchable liquid crystal retarder comprises two homogeneous alignment layers. In a privacy mode of operation, on-axis light from the spatial light modulator is directed without loss to the passenger, whereas off-axis light has reduced luminance to reduce the visibility of the display to off-axis driver leaning towards the display. In a shared mode of operation, the liquid crystal layers are controlled so that off-axis luminance and reflectivity are unmodified.

36 Claims, 37 Drawing Sheets

(51) Int. Cl.
  *G02F 1/01*       (2006.01)
  *G02F 1/1347*     (2006.01)

(56)            References Cited

U.S. PATENT DOCUMENTS

| | | | |
|---|---|---|---|
| 4,621,898 A | 11/1986 | Cohen |
| 4,974,941 A | 12/1990 | Gibbons et al. |
| 5,005,108 A | 4/1991 | Pristash et al. |
| 5,035,491 A | 7/1991 | Kawagishi et al. |
| 5,126,882 A | 6/1992 | Oe et al. |
| 5,608,550 A | 3/1997 | Epstein et al. |
| 5,658,490 A | 8/1997 | Sharp et al. |
| 5,671,994 A | 9/1997 | Tai et al. |
| 5,715,028 A | 2/1998 | Abileah et al. |
| 5,779,337 A | 7/1998 | Saito et al. |
| 5,791,757 A | 8/1998 | O'Neil et al. |
| 5,808,784 A | 9/1998 | Ando et al. |
| 5,835,166 A | 11/1998 | Hall et al. |
| 5,854,872 A | 12/1998 | Tai |
| 5,894,361 A | 4/1999 | Yamazaki et al. |
| 5,914,760 A | 6/1999 | Daiku |
| 5,997,148 A | 12/1999 | Ohkawa |
| 6,055,103 A | 4/2000 | Woodgate et al. |
| 6,099,758 A | 8/2000 | Verrall et al. |
| 6,144,433 A | 11/2000 | Tillin et al. |
| 6,169,589 B1 | 1/2001 | Kaneko |
| 6,204,904 B1 | 3/2001 | Tillin et al. |
| 6,222,672 B1 | 4/2001 | Towler et al. |
| 6,280,043 B1 | 8/2001 | Ohkawa |
| 6,364,497 B1 | 4/2002 | Park et al. |
| 6,379,016 B1 | 4/2002 | Boyd et al. |
| 6,392,727 B1 | 5/2002 | Larson et al. |
| 6,437,915 B2 | 8/2002 | Moseley et al. |
| 6,731,355 B2 | 5/2004 | Miyashita |
| 7,067,985 B2 | 6/2006 | Adachi |
| 7,072,096 B2 | 7/2006 | Holman et al. |
| 7,163,319 B2 | 1/2007 | Kuo et al. |
| 7,227,602 B2 | 6/2007 | Jeon et al. |
| 7,366,392 B2 | 4/2008 | Honma et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,070,346 B2 | 12/2011 | Maeda et al. |
| 8,098,350 B2 | 1/2012 | Sakai et al. |
| 8,154,686 B2 | 4/2012 | Mather et al. |
| 8,237,876 B2 | 8/2012 | Tan et al. |
| 8,249,408 B2 | 8/2012 | Coleman |
| 8,262,271 B2 | 9/2012 | Tillin et al. |
| 8,469,575 B2 | 6/2013 | Weber et al. |
| 8,646,931 B2 | 2/2014 | Choi et al. |
| 8,801,260 B2 | 8/2014 | Urano et al. |
| 8,848,132 B2 | 9/2014 | O'Neill et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 9,541,698 B2 | 1/2017 | Wheatley et al. |
| 10,054,732 B2 | 8/2018 | Robinson et al. |
| 10,126,575 B1 | 11/2018 | Robinson et al. |
| 10,303,030 B2 | 5/2019 | Robinson et al. |
| 10,401,638 B2 | 9/2019 | Robinson et al. |
| 10,488,705 B2 | 11/2019 | Xu et al. |
| 10,527,775 B2 | 1/2020 | Yang et al. |
| 10,649,248 B1 | 5/2020 | Jiang et al. |
| 10,649,259 B2 | 5/2020 | Lee et al. |
| 10,935,714 B2 | 3/2021 | Woodgate et al. |
| 11,070,791 B2 | 7/2021 | Woodgate et al. |
| 2001/0024561 A1 | 9/2001 | Cornelissen et al. |
| 2002/0015300 A1 | 2/2002 | Katsu et al. |
| 2002/0024529 A1 | 2/2002 | Miller et al. |
| 2002/0171793 A1 | 11/2002 | Sharp et al. |
| 2003/0058381 A1 | 3/2003 | Shinohara et al. |
| 2003/0089956 A1 | 5/2003 | Allen et al. |
| 2003/0107686 A1 | 6/2003 | Sato et al. |
| 2003/0117792 A1 | 6/2003 | Kunimochi et al. |
| 2003/0214615 A1 | 11/2003 | Colgan et al. |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0141107 A1 | 7/2004 | Jones |
| 2004/0145703 A1 | 7/2004 | O'Connor et al. |
| 2004/0240777 A1 | 12/2004 | Woodgate et al. |
| 2004/0264910 A1 | 12/2004 | Suzuki et al. |
| 2005/0002174 A1 | 1/2005 | Min et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0213348 A1 | 9/2005 | Parikka et al. |
| 2005/0219693 A1 | 10/2005 | Hartkop et al. |
| 2005/0270798 A1 | 12/2005 | Lee et al. |
| 2006/0066785 A1 | 3/2006 | Moriya |
| 2006/0082702 A1 | 4/2006 | Jacobs et al. |
| 2006/0098296 A1 | 5/2006 | Woodgate et al. |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0139772 A1 | 6/2007 | Wang |
| 2007/0223251 A1 | 9/2007 | Liao |
| 2007/0285775 A1 | 12/2007 | Lesage et al. |
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0285310 A1 | 11/2008 | Aylward et al. |
| 2008/0316198 A1 | 12/2008 | Fukushima et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0205667 A1 | 8/2010 | Anderson et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0176089 A1 | 7/2011 | Ishikawa et al. |
| 2011/0241983 A1 | 10/2011 | Chang |

(56) References Cited

U.S. PATENT DOCUMENTS

| | | |
|---|---|---|
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0086875 A1 | 4/2012 | Yokota |
| 2012/0127573 A1 | 5/2012 | Robinson et al. |
| 2012/0147280 A1 | 6/2012 | Osterman et al. |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Vinther et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0201844 A1 | 7/2014 | Buck |
| 2014/0211125 A1 | 7/2014 | Kurata |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293289 A1 | 10/2015 | Shinohara et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0090103 A1 | 3/2017 | Holman |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196235 A1 | 6/2019 | Robinson et al. |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1* | 8/2019 | Robinson ............ G02F 1/1323 |
| 2019/0278010 A1 | 9/2019 | Sakai et al. |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2019/0361165 A1 | 11/2019 | Chang et al. |
| 2020/0026125 A1 | 1/2020 | Robinson et al. |
| 2020/0159055 A1 | 5/2020 | Robinson et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2021/0149233 A1 | 5/2021 | Robinson et al. |

FOREIGN PATENT DOCUMENTS

| | | |
|---|---|---|
| CN | 1776484 A | 5/2006 |
| CN | 101518095 A | 8/2009 |
| CN | 101681061 A | 3/2010 |
| CN | 103473494 A | 12/2013 |
| CN | 104133292 A | 11/2014 |
| CN | 104303085 A | 1/2015 |
| CN | 204740413 U | 11/2015 |
| CN | 106104372 A | 11/2016 |
| CN | 106415342 A | 2/2017 |
| CN | 209171779 U | 7/2019 |

(56) References Cited

FOREIGN PATENT DOCUMENTS

| | | |
|---|---|---|
| GB | 2418518 A | 3/2006 |
| GB | 2428100 A | 1/2007 |
| GB | 2482065 A | 1/2012 |
| GB | 2486935 B | 9/2013 |
| JP | H01130783 U | 9/1989 |
| JP | H11174489 A | 7/1999 |
| JP | 2007148279 A | 6/2007 |
| JP | 2007273288 A | 10/2007 |
| KR | 20120011228 A | 2/2012 |
| KR | 101990286 B1 | 6/2019 |
| TW | M537663 U | 3/2017 |
| TW | 1612360 B | 1/2018 |
| WO | 2005071449 A2 | 8/2005 |
| WO | 2010021926 A2 | 2/2010 |
| WO | 2014011328 A1 | 1/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2018035492 A1 | 2/2018 |
| WO | 2018208618 A1 | 11/2018 |
| WO | 2019055755 A1 | 3/2019 |
| WO | 2019067846 A1 | 4/2019 |
| WO | 2019147762 A1 | 8/2019 |

OTHER PUBLICATIONS

PCT/US2021/029937 International search report and written opinion of the international searching authority dated Aug. 6, 2021.
PCT/US2021/029944 International search report and written opinion of the international searching authority dated Aug. 3, 2021.
PCT/US2021/029947 International search report and written opinion of the international searching authority dated Aug. 10, 2021.
PCT/US2021/029954 International search report and written opinion of the international searching authority dated Aug. 10, 2021.
PCT/US2021/029958 International search report and written opinion of the international searching authority dated Aug. 10, 2021.
Adachi, et al. "P-228L: Late-News Poster: Controllable Viewing-Angle Displays using a Hybrid Aligned Nematic Liquid Crystal Cell", ISSN, SID 2006 Digest, pp. 705-708.
Brudy et al., "Is Anyone Looking? Mitigating Shoulder Surfing on Public Displays through Awareness and Protection", Proceedings of the International Symposium on Persuasive Displays (Jun. 3, 2014), pp. 1-6.
CN201780030715.3 Notification of the First Office Action dated Jan. 21, 2020.
CN201880042320.X Notification of the First Office Action dated May 25, 2021.
EP-16860628.3 Extended European Search Report of European Patent Office dated Apr. 26, 2019.
EP-17799963.8 Extended European Search Report of European Patent Office dated Oct. 9, 2019.
EP-18855604.7 Extended European Search Report of European Patent Office dated Jun. 1, 2021.
EP-18857077.4 Extended European Search Report of European Patent Office dated Jun. 16, 2021.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
Kalantar, et al. "Backlight Unit With Double Surface Light Emission," J. Soc. Inf. Display, vol. 12, Issue 4, pp. 379-387 (Dec. 2004).
PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
PCT/US2020/040686 International search report and written opinion of the international searching authority dated Nov. 20, 2020.
PCT/US2020/044574 International search report and written opinion of the international searching authority dated Oct. 21, 2020.
PCT/US2020/053863 International search report and written opinion of the international searching authority dated Mar. 12, 2021.
PCT/US2020/060155 International search report and written opinion of the international searching authority dated Feb. 5, 2021.
PCT/US2020/060191 International search report and written opinion of the international searching authority dated Feb. 8, 2021.
PCT/US2020/063638 International search report and written opinion of the international searching authority dated Mar. 2, 2021.
PCT/US2020/064633 International search report and written opinion of the international searching authority dated Mar. 15, 2021.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks For Large-Scale Image Recognition", ICLR 2015.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
CN201680061632.6 Notification of the First Office Action dated Sep. 14, 2021.
EP-19743619.9 Extended European Search of European Patent Office dated Nov. 23, 2021.
EP-19743701.5 Extended European Search Report of European Patent Office dated Nov. 24, 2021.
EP19771688.9 Extended European Search Report of European Patent Office dated Dec. 2, 2021.
PCT/US2021/043435 International search report and written opinion of the international searching authority dated Nov. 1, 2021.
PCT/US2021/043444 International search report and written opinion of the international searching authority dated Nov. 1, 2021.

* cited by examiner

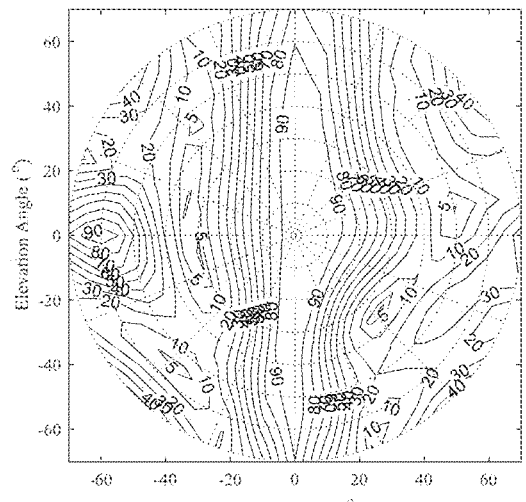
FIG. 8A
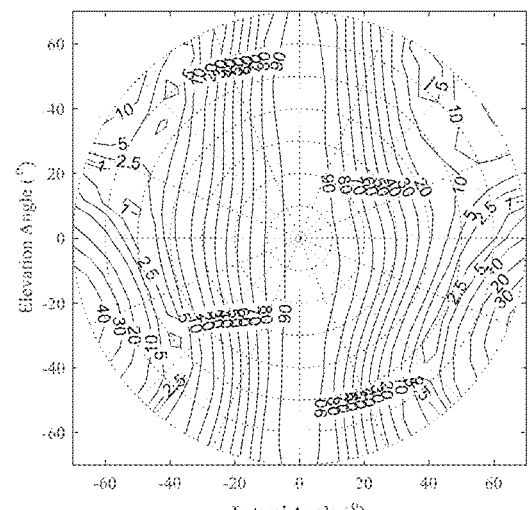
FIG. 8B
FIG. 8C

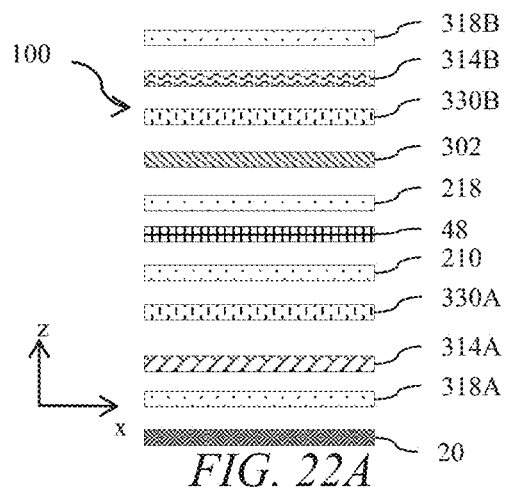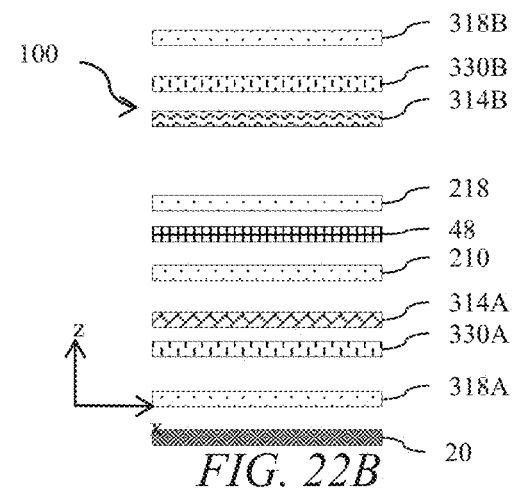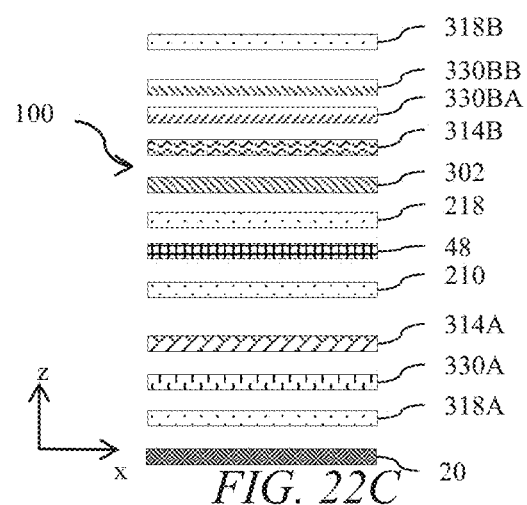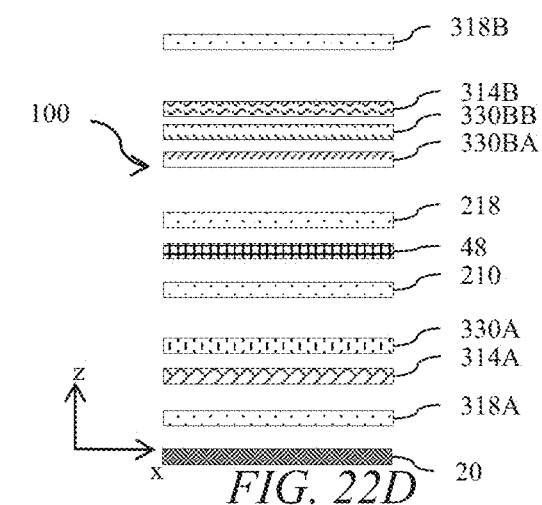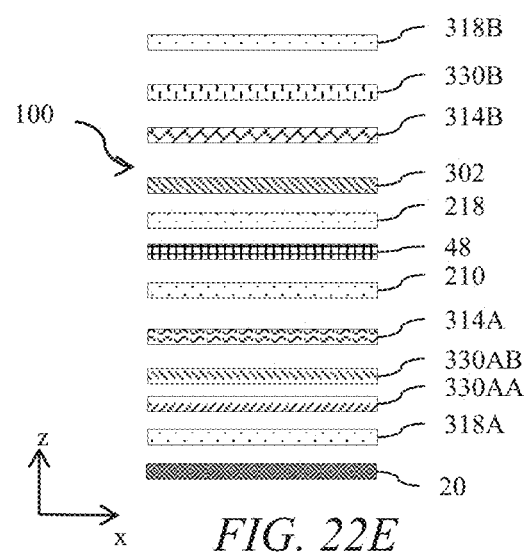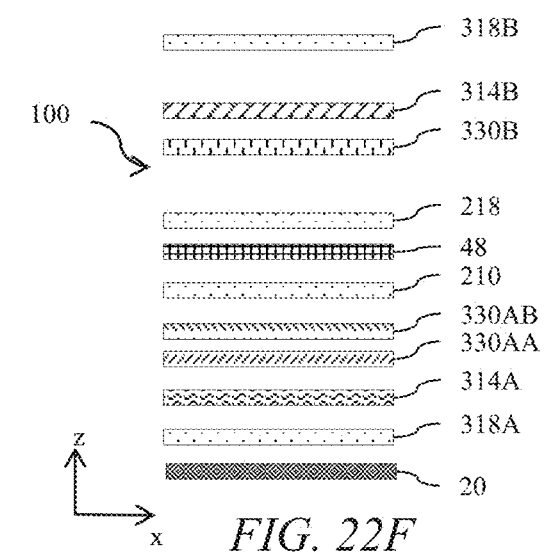

DIRECTIONAL DISPLAY APPARATUS

TECHNICAL FIELD

This disclosure generally relates to illumination from light modulation devices, and more specifically relates to optical stacks for providing control of illumination for use in display including privacy display and night-time display.

BACKGROUND

Privacy displays provide image visibility to a primary user that is typically in an on-axis position and reduced visibility of image content to a snooper, that is typically in an off-axis position. A privacy function may be provided by micro-louvre optical films that transmit some light from a display in an on-axis direction with low luminance in off-axis positions. However such films have high losses for head-on illumination and the micro-louvres may cause Moiré artefacts due to beating with the pixels of the spatial light modulator. The pitch of the micro-louvre may need selection for panel resolution, increasing inventory and cost.

Switchable privacy displays may be provided by control of the off-axis optical output.

Control may be provided by means of luminance reduction, for example by means of switchable backlights for a liquid crystal display (LCD) spatial light modulator. Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety.

BRIEF SUMMARY

According to a first aspect of the present disclosure there is provided a display device comprising a backlight arranged to output light; a transmissive spatial light modulator arranged to receive output light from the backlight; a display polariser arranged on a side of the spatial light modulator, the display polariser being a linear polariser; a first additional polariser arranged on the same side of the spatial light modulator as the display polariser, the first additional polariser being a linear polariser; at least one first polar control retarder arranged between the first additional polariser and the display polariser, a second additional polariser, the second additional polariser being a linear polariser; and at least one second polar control retarder, wherein either: the second additional polariser is arranged on the same side of the spatial light modulator as the first additional polariser outside the first additional polariser, and the at least one second polar control retarder is arranged between the first additional polariser and the second additional polariser; or said display polariser is an input display polariser arranged on the input side of the spatial light modulator, and the display device further comprises an output display polariser arranged on the output side of the spatial light modulator, the second additional polariser is arranged on the output side of the spatial light modulator, and the at least one second polar control retarder is arranged between the second additional polariser and the output display polariser, wherein: each of the at least one first polar control retarder and the at least one second polar control retarder comprises a respective switchable liquid crystal retarder comprising a layer of liquid crystal material and two surface alignment layers disposed adjacent to the layer of liquid crystal material and on opposite sides thereof, in respect of one of the at least one first polar control retarder and the at least one second polar control retarder, both of the surface alignment layers are arranged to provide homogenous alignment in the adjacent liquid crystal material, and in respect of the other of the at least one first polar control retarder and the at least one second polar control retarder, both of the surface alignment layers are arranged to provide homeotropic alignment in the adjacent liquid crystal material, and the switchable liquid crystal retarder of said one of the at least one first polar control retarder and the at least one second polar control retarder has a retardance for light of a wavelength of 550 nm having a first retardance value and the switchable liquid crystal retarder of said other of the at least one first polar control retarder and the at least one second polar control retarder has a retardance for light of a wavelength of 550 nm has a second retardance value, the first retardance value and the second retardance value being different, the magnitude of the difference between the first retardance value and the second retardance value being at least 10% of the average of the first retardance value and the second retardance value. The magnitude of the difference between the first retardance value and the second retardance value may be at least 25% of the average of the first retardance value and the second retardance value.

A switchable display device may be provided that may provide switching of luminance profile over a large polar region. The display device may for example provide switching between illumination of a passenger, and illumination of a driver and passenger for a switchable privacy display in an automotive application. In other applications switching between a primary display user and a snooper may be provided.

The first retardance value may be greater than the second retardance value. The first retardance value may be in a range from 500 nm to 2000 nm, preferably in a range from 700 nm to 1500 nm, and the second retardance value may be in a range from 350 nm to 900 nm, preferably in a range from 500 nm to 850 nm. Advantageously colour variation with polar angle may be reduced in share mode of operation for the driver.

The first retardance value may be less than the second retardance value. The first retardance value may be in a range from 350 nm to 1000 nm, preferably in a range from 500 nm to 900 nm, and the second retardance value may be in a range from 650 nm to 2800 nm, preferably in a range from 1000 nm to 2000 nm. Advantageously colour variation with polar angle may be reduced in privacy mode of operation for the passenger.

Said one of the at least one first polar control retarder and the at least one second polar control retarder may further comprise at least one passive compensation retarder. Advantageously the size of the polar region over which luminance is reduced in privacy mode may be increased.

The at least one passive compensation retarder of said one of the at least one first polar control retarder and the at least one second polar control retarder may comprise a pair of passive uniaxial retarders having optical axes in the plane of the retarders that are crossed. The first retardance value may be greater than the second retardance value, and the pair of passive uniaxial retarders having optical axes in the plane of the retarders that are crossed may each have a retardance for light of a wavelength of 550 nm in a range from 300 nm to 1500 nm, preferably in a range from 500 nm to 1200 nm. The first retardance value may be less than the second retardance value, and the pair of passive uniaxial retarders having optical axes in the plane of the retarders that are crossed may each have a retardance for light of a wavelength of 550 nm in a range from 300 nm to 900 nm, preferably in a range from 400 nm to 800 nm. Advantageously increased security factor may be achieved for the driver leaning towards the display.

The at least one passive compensation retarder of said other of the at least one first polar control retarder and the at least one second polar control retarder may comprise a passive uniaxial retarder having its optical axis perpendicular to the plane of the retarder. The first retardance value may be greater than the second retardance value, and the passive uniaxial retarder having its optical axis perpendicular to the plane of the retarder has a retardance for light of a wavelength of 550 nm in a range from −300 nm to −1700 nm, preferably in a range from −500 nm to −1200 nm. The first retardance value may be less than the second retardance value, and the passive uniaxial retarder having its optical axis perpendicular to the plane of the retarder has a retardance for light of a wavelength of 550 nm in a range from −250 nm to −800 nm, preferably in a range from −300 nm to −700 nm. Advantageously reduced colour variation may be seen by the driver in share mode of operation.

Said other of the at least one first polar control retarder and the at least one second polar control retarder may further comprise at least one passive compensation retarder. The at least one passive compensation retarder of said other of the at least one first polar control retarder and the at least one second polar control retarder may comprise a passive uniaxial retarder having its optical axis perpendicular to the plane of the retarder. The first retardance value may be greater than the second retardance value, and the passive uniaxial retarder having its optical axis perpendicular to the plane of the retarder has a retardance for light of a wavelength of 550 nm in a range from −250 nm to −850 nm, preferably in a range from −400 nm to −800 nm. The first retardance value may be less than the second retardance value, and the passive uniaxial retarder having its optical axis perpendicular to the plane of the retarder has a retardance for light of a wavelength of 550 nm in a range from −400 nm to −2400 nm, preferably in a range from −700 nm to −1700 nm. Advantageously increased size of the polar regions for which security factor is achieved.

The display device may further comprise a reflective polariser, the reflective polariser being a linear polariser, and either: said display polariser may be an output display polariser arranged on the output side of the spatial light modulator, the second additional polariser may be arranged on the same side of the spatial light modulator as the first additional polariser outside the first additional polariser, the at least one second polar control retarder may be arranged between the first additional polariser and the second additional polariser, and the reflective polariser may be arranged between the first additional polariser and the at least one second polar control retarder; or said display polariser may be an input display polariser arranged on the input side of the spatial light modulator, and the display device may further comprise an output display polariser arranged on the output side of the spatial light modulator, the second additional polariser may be arranged on the output side of the spatial light modulator, the at least one second polar control retarder may be arranged between the second additional polariser and the output display polariser, and the reflective polariser may be arranged between the output display polariser and at least one second polar control retarder. Said one of the at least one first polar control retarder and the at least one second polar control retarder may be the at least one second polar control retarder and said other of the at least one first polar control retarder and the at least one second polar control retarder may be the at least one first polar control retarder. Advantageously the reflectivity of the display device may be increased in privacy mode of operation. Security factor may be increased. In an automotive application the freedom of driver location for high security factor may be increased.

Said surface alignment layers of the at least one first polar control retarder may have pretilts having pretilt directions with components in the plane of the layer of liquid crystal material in a first pair of anti-parallel directions. Said surface alignment layers of said second polar control retarder have pretilts having pretilt directions with components in the plane of the layer of liquid crystal material in a second pair of anti-parallel directions. Advantageously high transmission efficiency is achieved. The first pair of anti-parallel directions may be parallel or orthogonal to the electric vector transmission direction of the first additional polariser. The second pair of anti-parallel directions may be parallel or orthogonal to the electric vector transmission direction of second additional polariser. Advantageously complexity and cost of manufacture may be increased. Head-on luminance may be increased.

The first pair of anti-parallel directions may be angularly offset from being parallel or orthogonal to the electric vector transmission direction of said first additional polariser by an amount having a magnitude of at most 20°. The second pair of anti-parallel directions may be angularly offset from being parallel or orthogonal to the electric vector transmission direction of said second additional polariser by an amount having a magnitude of at most 20°. Advantageously in an automotive application the freedom of driver location for high security factor may be increased.

The backlight in at least a first mode of operation may have a first luminance distribution having an output luminance profile having a full width half maximum that may be at most 40 degrees, preferably at most 30 degrees and most preferably at most 20 degrees. Advantageously reduced luminance in privacy mode of operation may be provided to achieve high security factor over a wide polar region while achieving high image luminance to a passenger.

The backlight in a second mode of operation may have a second luminance distribution having an output luminance profile having first and second maxima in luminance at first and second different polar locations with a minimum in luminance therebetween. The luminance of the minimum may be at most 25% of the luminance of the first and second maxima. Advantageously high power efficiency and image luminance may be achieved for illumination of both a passenger and a driver.

The backlight may comprise: at least one first light source arranged to provide input light; at least one second light source arranged to provide input light in an opposite direction from the at least one first light source; a waveguide arrangement comprising at least one waveguide, the waveguide arrangement being arranged to receive the input light from the at least one first light source and the at least one second light source and to cause light from the at least one first light source and the at least one second light source to exit from the waveguide arrangement by breaking total internal reflection; and an optical turning film component comprising: an input surface arranged to receive the light exiting from the waveguide arrangement through a light guiding surface of the at least one waveguide of the waveguide arrangement by breaking total internal reflection, the input surface extending across the plane; and an output surface facing the input surface, wherein the input surface may comprise an array of elongate prismatic elements. The prismatic elements each comprise a pair of elongate facets defining a ridge therebetween. Advantageously a backlight may be provided that is capable of switching illumination between a driver and passenger. In a privacy mode of operation light is directed substantially towards the passenger and substantially not to the driver. High efficiency may be achieved.

The waveguide arrangement may comprise: a waveguide extending across a plane and comprising: first and second opposed light guiding surfaces arranged to guide light along the waveguide, the second light guiding surface being arranged to guide light by total internal reflection, and first and second input ends arranged between the first and second light guiding surfaces and extending in a lateral direction between the first and second light guiding surfaces; wherein the at least one first light source may be arranged to input light into the waveguide through the first input end and the at least one second light source may be arranged to input light into the waveguide through the second input end, and the waveguide may be arranged to cause light from the at least one first light source and the at least one second light source to exit from the waveguide through one of the first and second light guiding surfaces by breaking total internal reflection. Advantageously high luminance uniformity may be achieved across each waveguide and switching between passenger and driver illumination may be achieved.

The waveguide arrangement may comprise: a first waveguide extending across a plane and comprising first and second opposed light guiding surfaces arranged to guide light along the first waveguide, the second light guiding surface being arranged to guide light by total internal reflection; and a first input end arranged between the first and second light guiding surfaces of the first waveguide and extending in a lateral direction between the first and second light guiding surfaces; wherein the at least one first light source may be arranged to input light into the first waveguide through the first input end, and the first waveguide may be arranged to cause light from the at least one first light source to exit from the first waveguide through one of the first and second light guiding surfaces by breaking total internal reflection; a second waveguide extending across the plane arranged in series with the first waveguide and comprising first and second opposed light guiding surfaces arranged to guide light along the second waveguide, the second light guiding surface being arranged to guide light by total internal reflection, and a second input end arranged between the first and second light guiding surfaces of the second waveguide and extending in a lateral direction between the first and second light guiding surfaces; wherein the at least one second light source may be arranged to input light into the second waveguide through the second input end, and the second waveguide may be arranged to cause light from the at least one second light source to exit from the second waveguide through one of the first and second light guiding surfaces by breaking total internal reflection, and wherein the first and second waveguides are oriented so that at least one first light source and at least one second light source input light into the first and second waveguides in opposite directions. Advantageously the thickness and cost of the waveguide assembly may be reduced.

The light from the first light source exits the backlight with a first angular distribution and the light from the second light source exits the backlight with a second angular distribution different from the first angular distribution. Advantageously illumination of a driver and passenger or between a snooper and user may be independently controlled. Efficiency may be improved. Security factor of privacy mode and image visibility in share mode may be improved.

The first angular distribution may be symmetrical about an axis of symmetry of the backlight and the second angular distribution may be asymmetrical about the same axis of symmetry of the backlight. Advantageously the uniformity of the display to a passenger may be increased and luminance to a driver may be increased.

The asymmetrical distribution may be to either the left or the right of an axis of symmetry of the backlight. Advantageously the display may be arranged for operation with a left hand drive or right hand drive vehicle respectively.

Said other of the at least one first polar control retarder and the at least one second polar control retarder is between the backlight and the transmissive spatial light modulator or said one of the at least one first polar control retarder and the at least one second polar control retarder is on the output side of said other of the at least one first polar control retarder and the at least one second polar control retarder. Advantageously flow artefacts may be reduced through mechanical reduction of compression of the liquid crystal retarder 301 that comprises two homeotropic layer. Further scatter at low polar angles may be reduced wherein the liquid crystal retarder with high retardance is on the output side of the liquid crystal retarder with lower retardance.

Any of the aspects of the present disclosure may be applied in any combination.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments and automotive environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 8A is a schematic graph illustrating the polar variation of transmission for a first polar control retarder with rotated alignment layers;

FIG. 8B is a schematic graph illustrating the polar variation of transmission for a second polar control retarder with rotated alignment layers;

FIG. 8C is a schematic graph illustrating the polar variation of security factor, S in a privacy mode of operation for the display device of FIG. 2 with backlight luminance profile of FIG. 5A and transmission profile of FIGS. 8A-B with a display head-on luminance, of value $Y_{max}$ measured in nits that is half of the illuminance of value I measured in lux;

Figure 2:
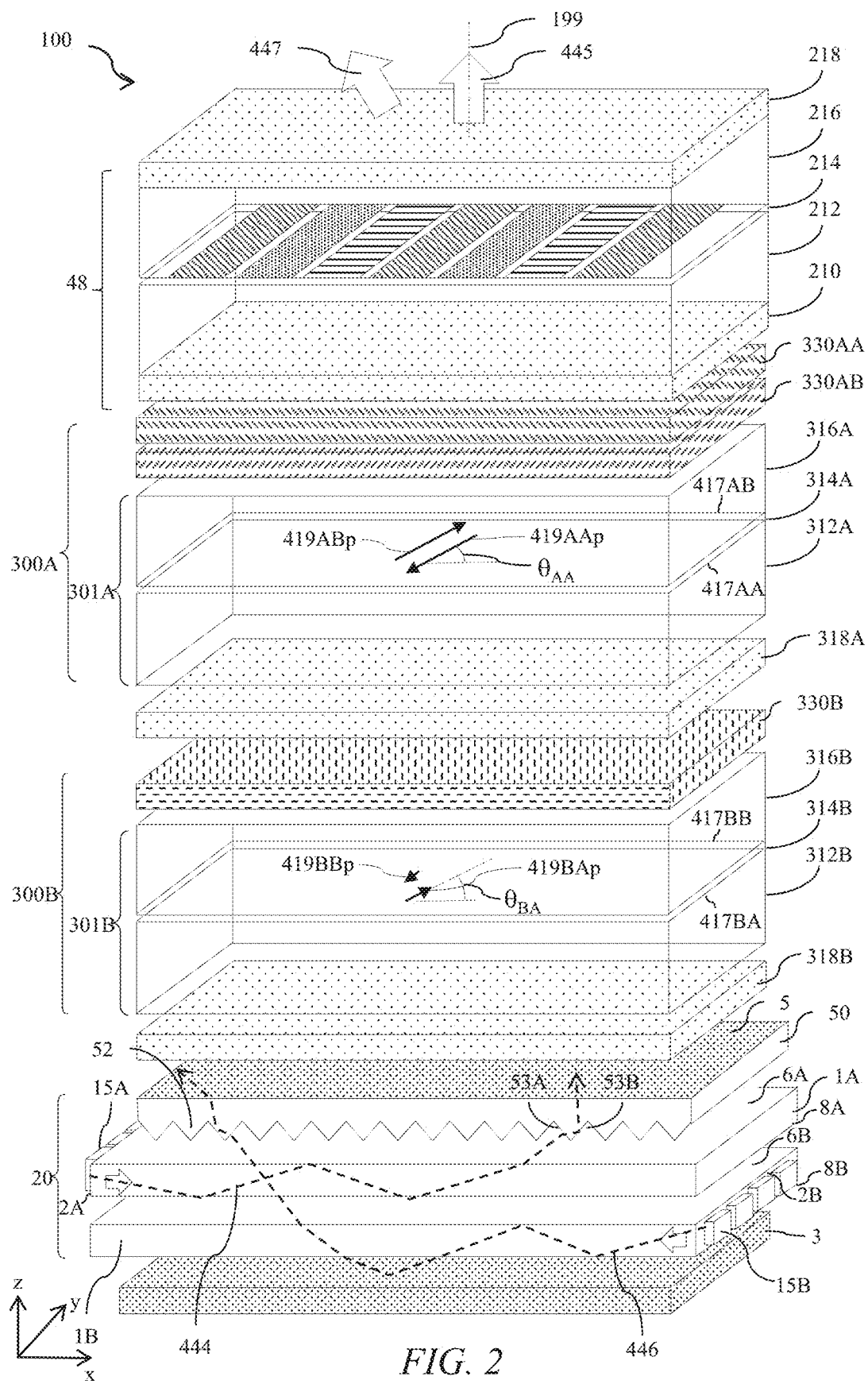
FIG. 2 is a schematic diagram illustrating a front perspective view of a switchable privacy display comprising a transmissive spatial light modulator.
Figure 10A:
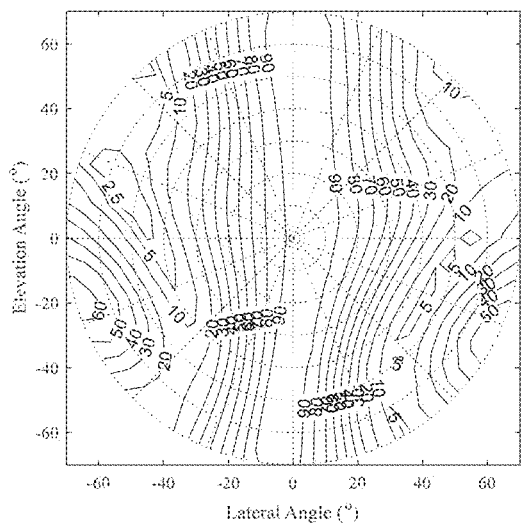
FIG. 10A is a schematic graph illustrating the polar variation of transmission for the first polar control retarder of TABLE 4 in a privacy mode of operation.
Figure 10B:
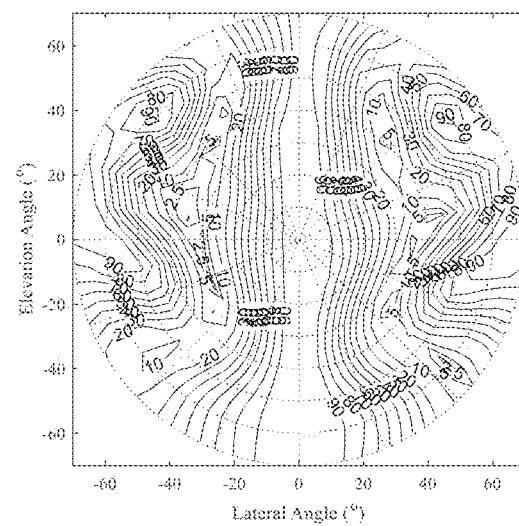
FIG. 10B is a schematic graph illustrating the polar variation of transmission for the second polar control retarder of TABLE 4 in a privacy mode of operation.
Figure 10C:
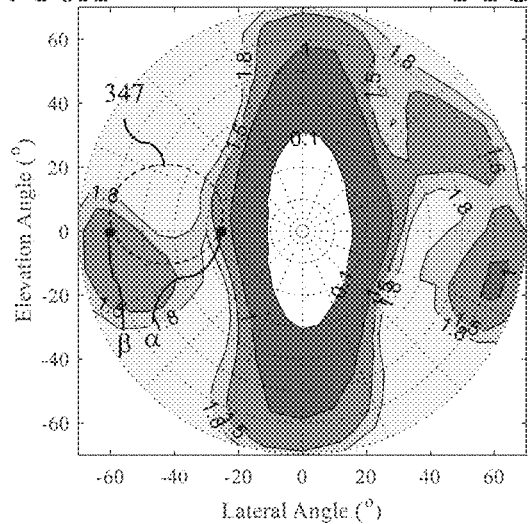
FIG. 10C is a schematic graph illustrating the polar variation of visual security level, S in a privacy mode of operation for the display device of FIG. 2 and profiles of FIG. 5A and FIGS. 10A-B with a display head-on luminance, of value $Y_{max}$ measured in nits that is half of the illuminance of value I measured in lux.
Figure 10D:
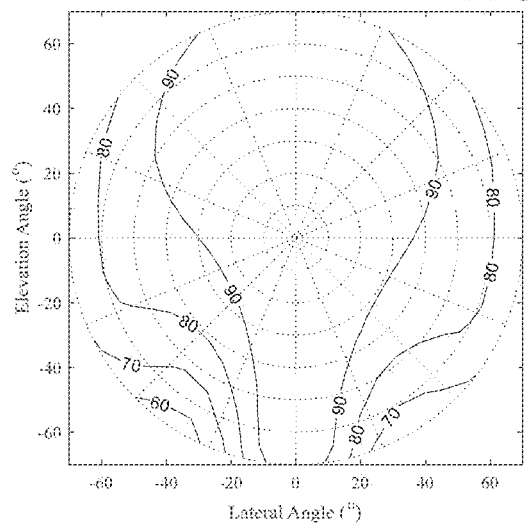
FIG. 10D is a schematic graph illustrating the polar variation of transmission for the first polar control retarder of TABLE 4 in a share mode of operation.
Figure 10E:
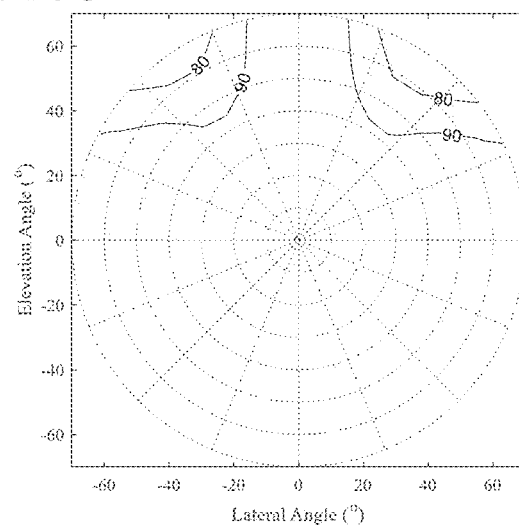
FIG. 10E is a schematic graph illustrating the polar variation of transmission for the second polar control retarder of TABLE 4 in a share mode of operation.
Figure 10F:
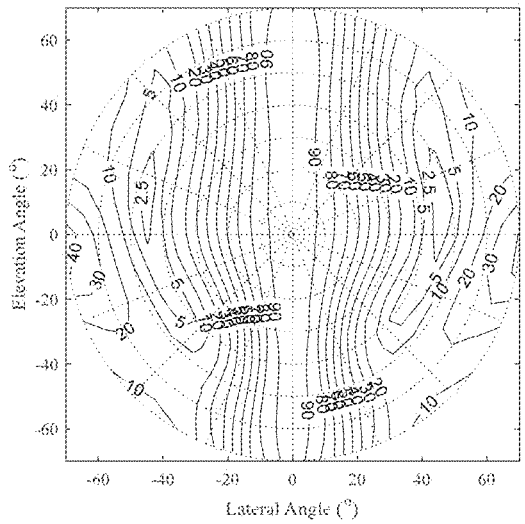
FIG. 10F is a schematic graph illustrating the polar variation of transmission for the first polar control retarder of TABLE 5 in a privacy mode of operation.
Figure 10G:
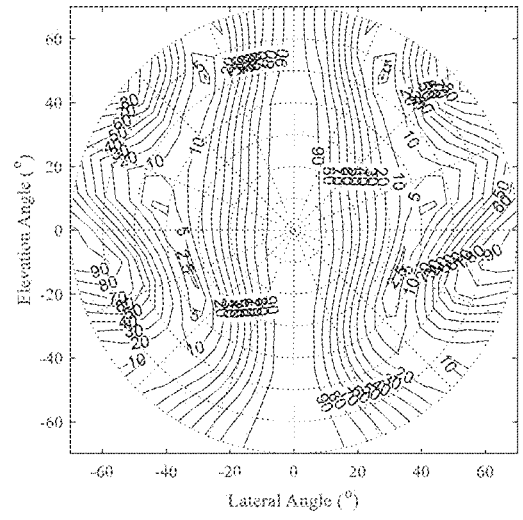
FIG. 10G is a schematic graph illustrating the polar variation of transmission for the second polar control retarder of TABLE 5 in a privacy mode of operation.
Figure 11A:
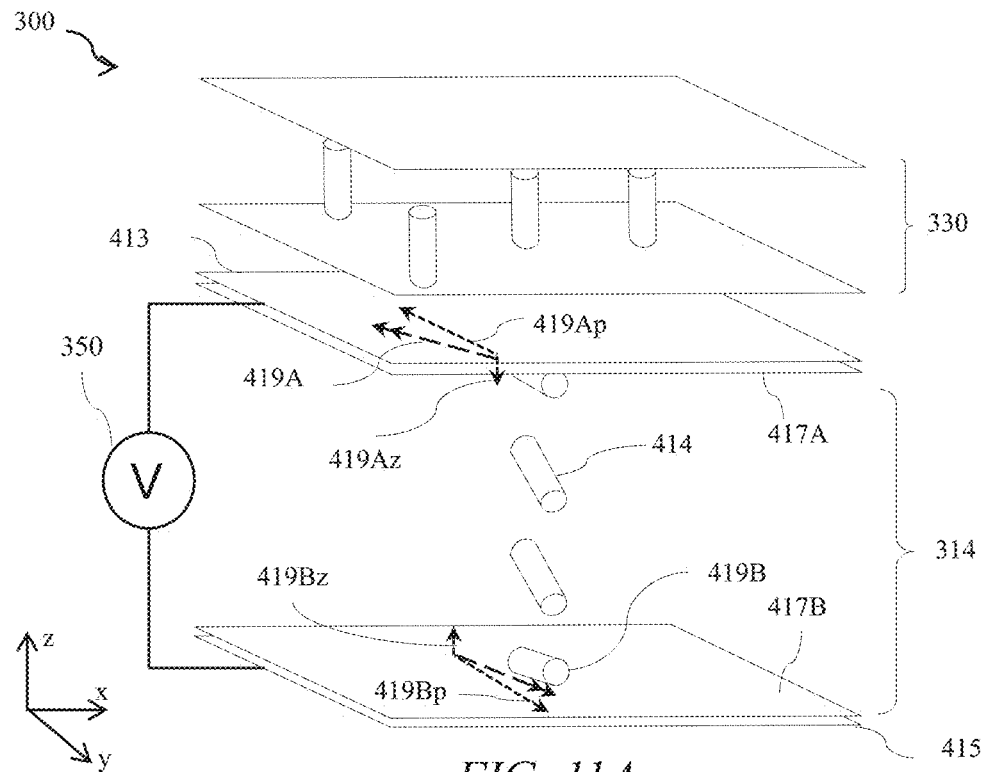
Figure 11B:
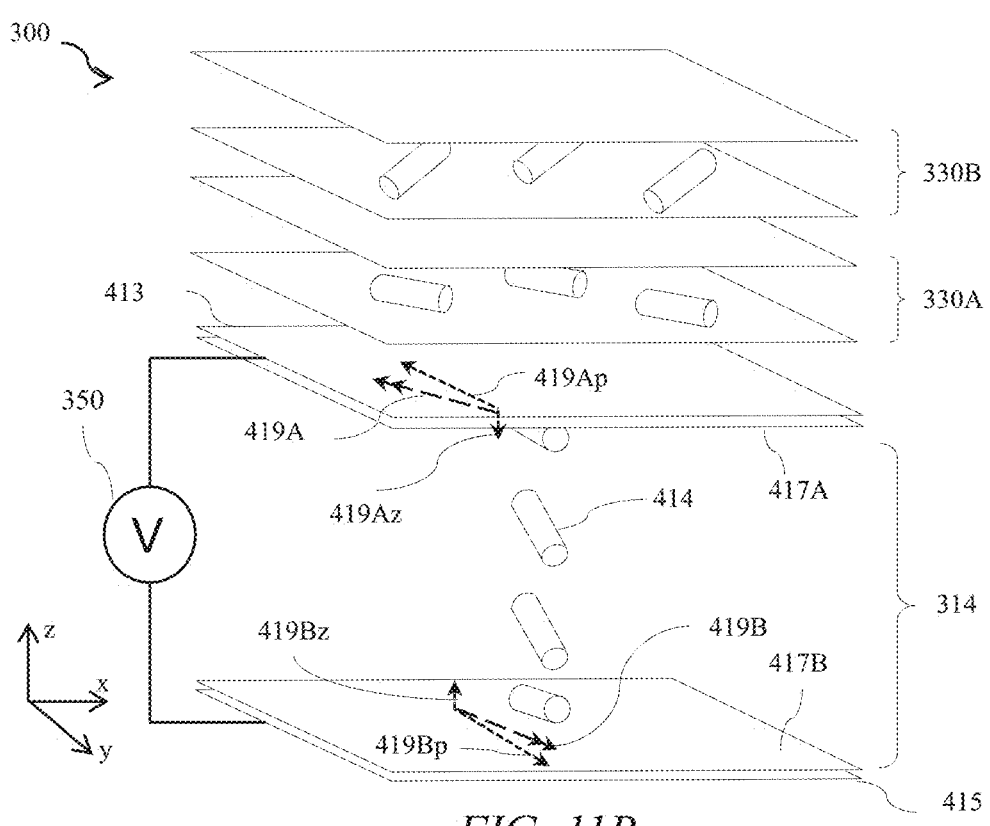
Figure 11C:
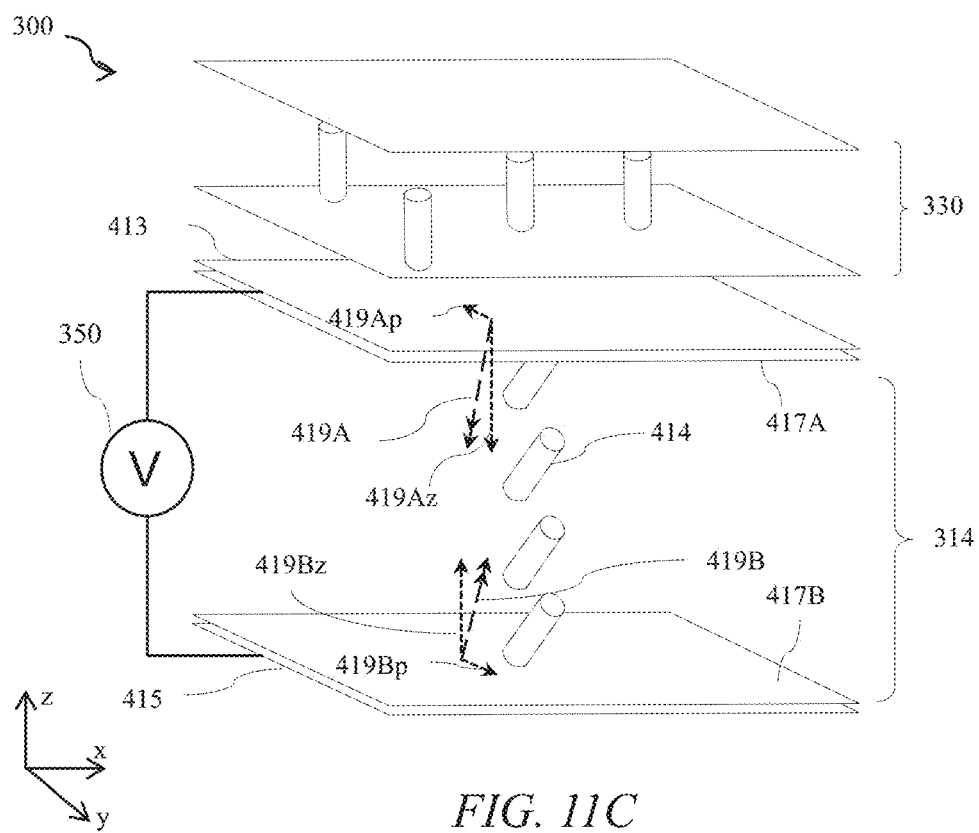
Figure 11D:
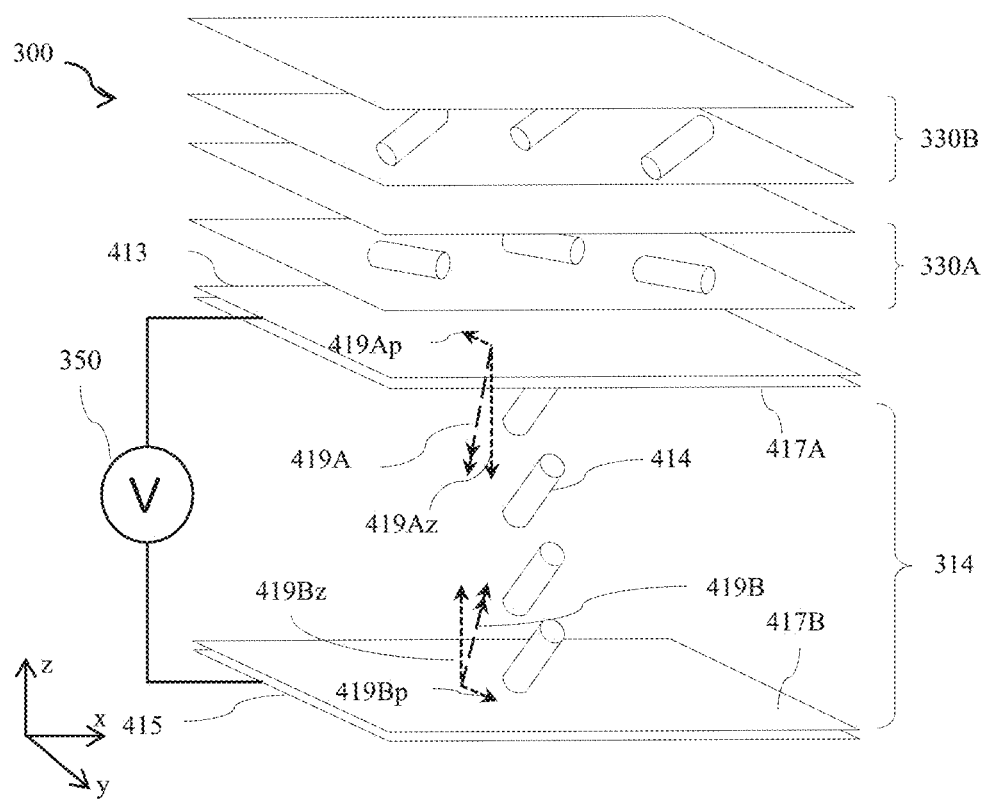
Figure 12A:
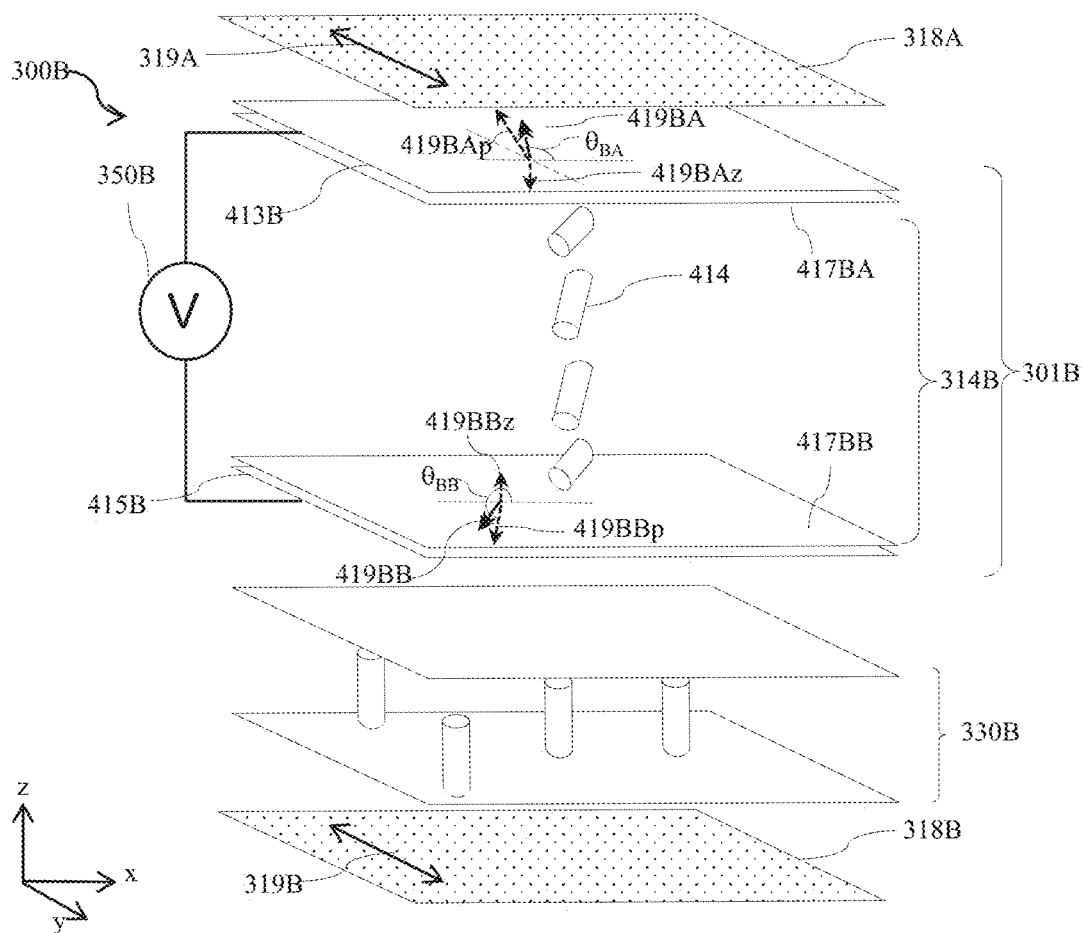
Figure 12B:
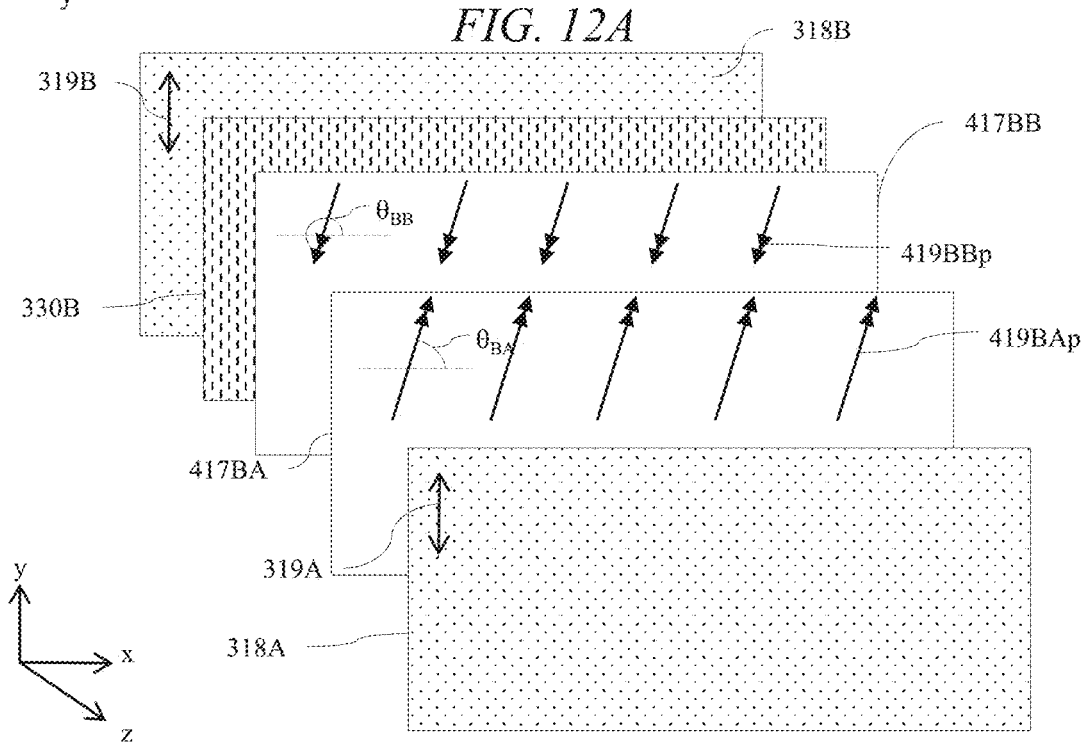
Figure 12C:
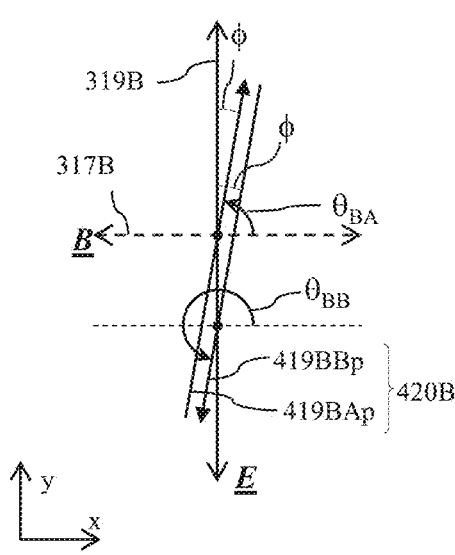
Figure 12D:
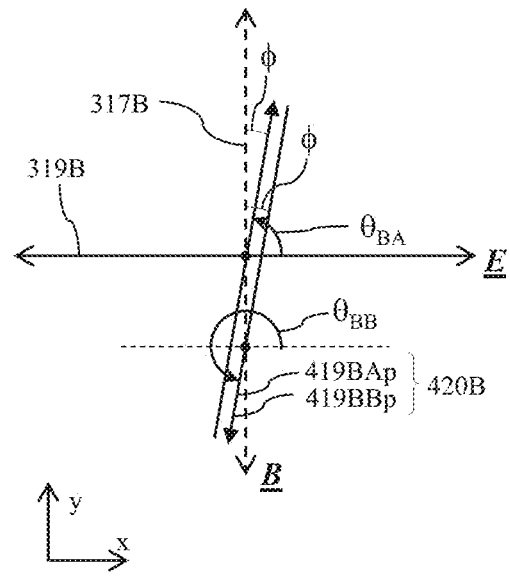
Figure 12E:
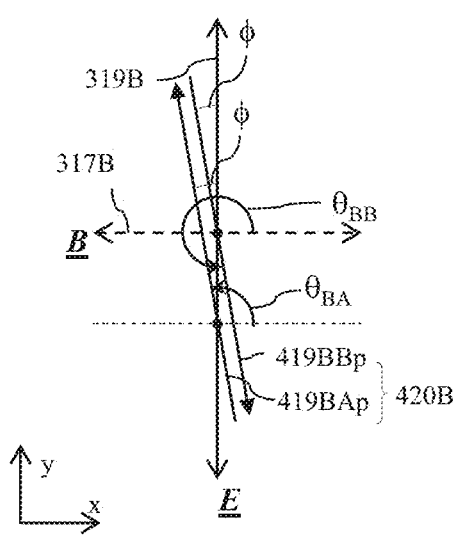
Figure 12F:
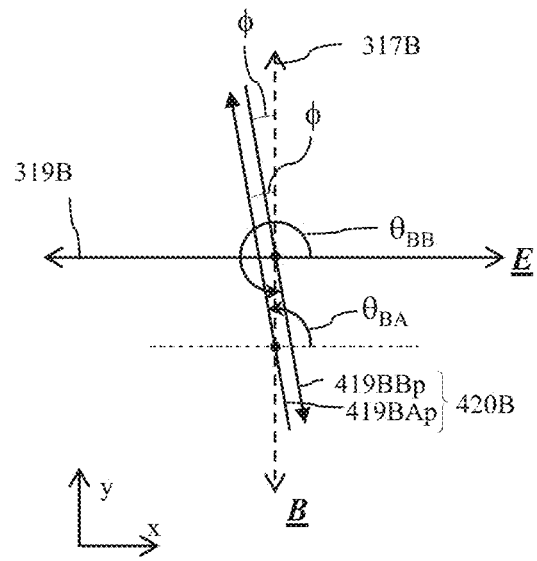
Figure 13A:
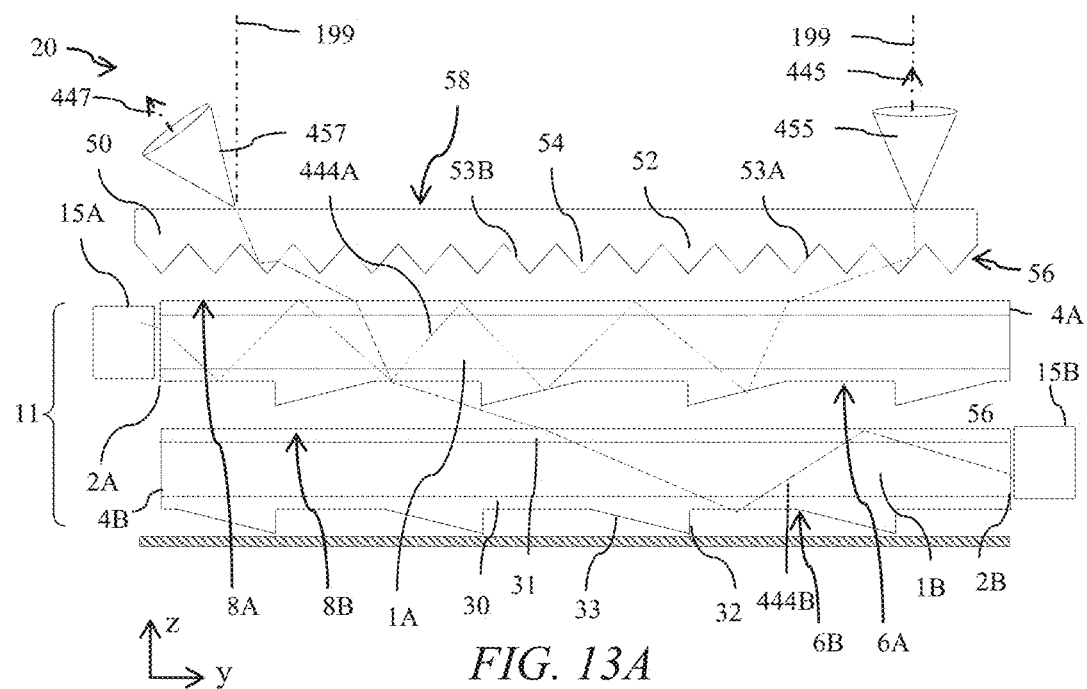
Figure 13B:
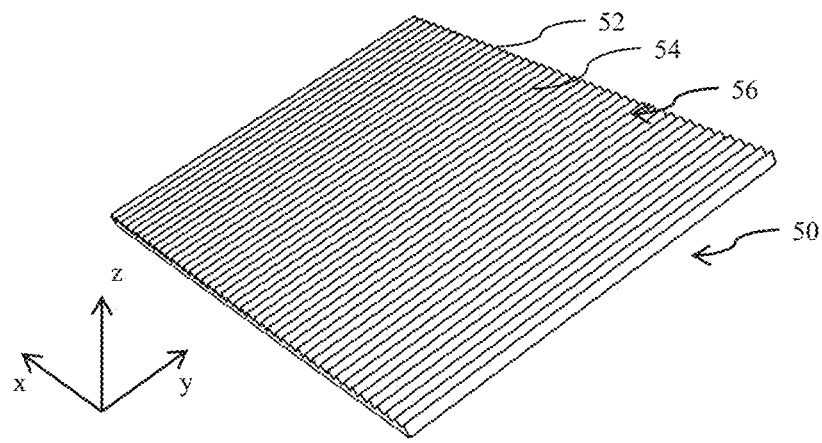
Figure 13C:
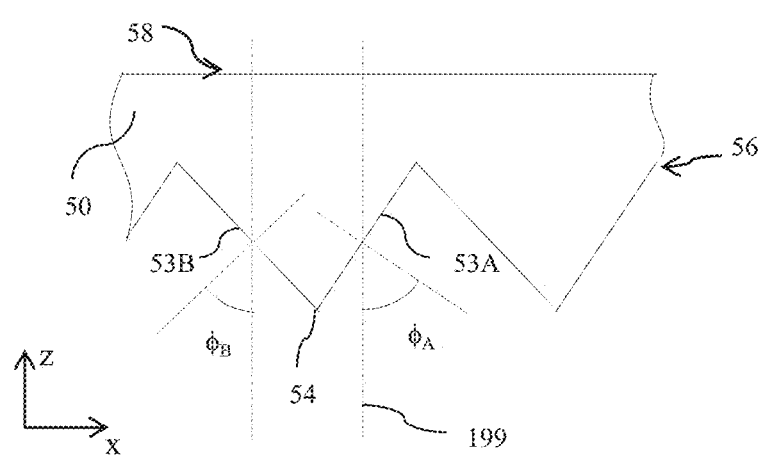
Figure 15:
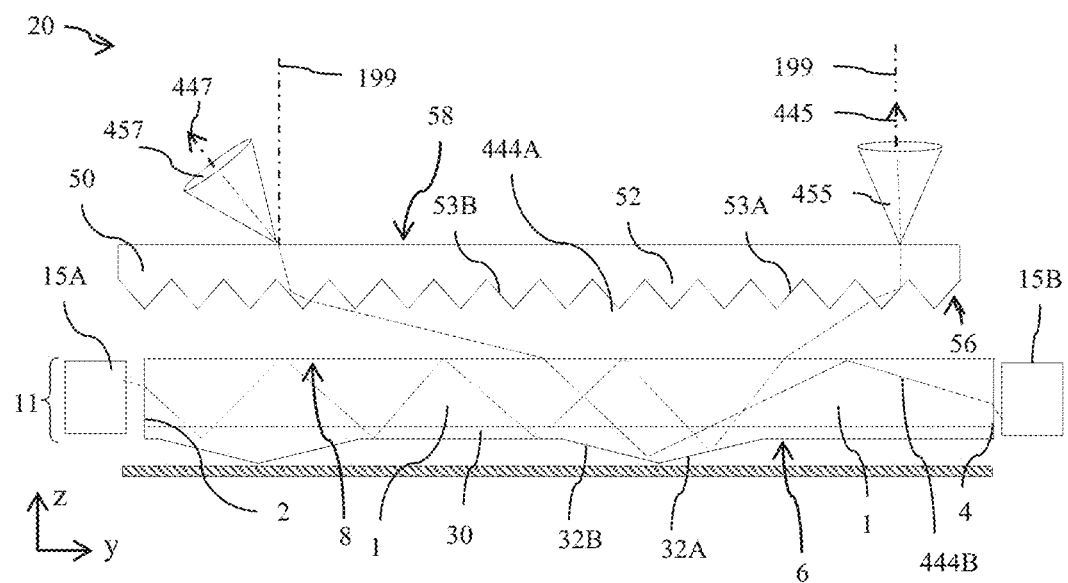
Figure 16A:
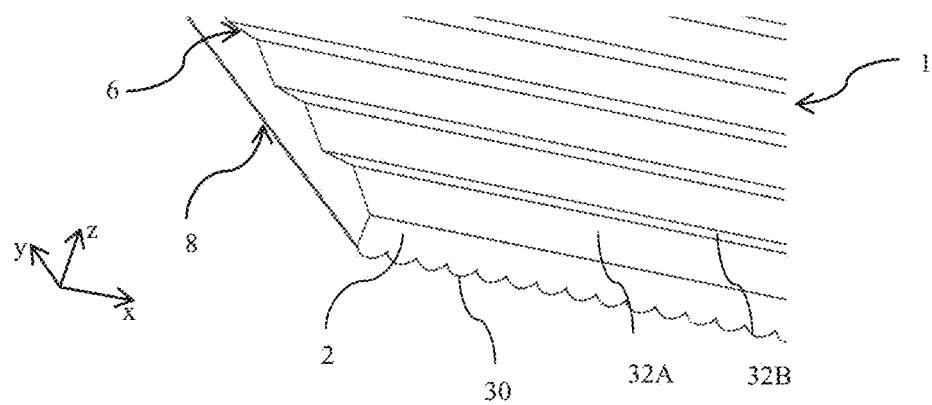
Figure 16B:
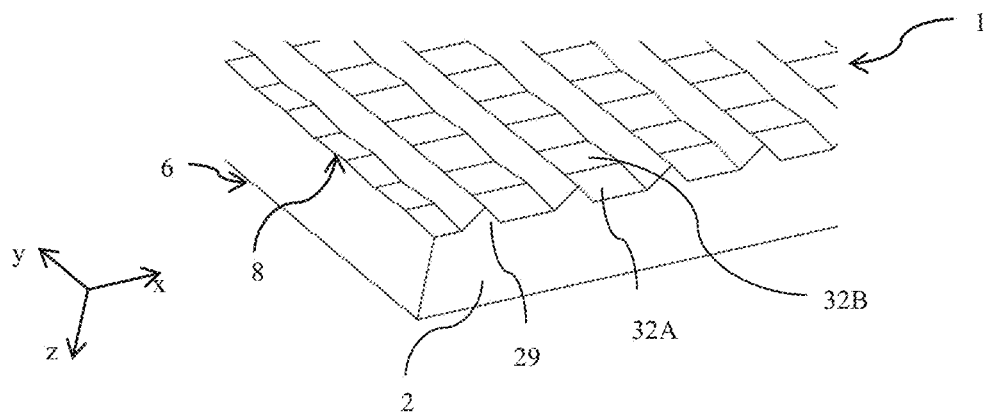
Figure 17:
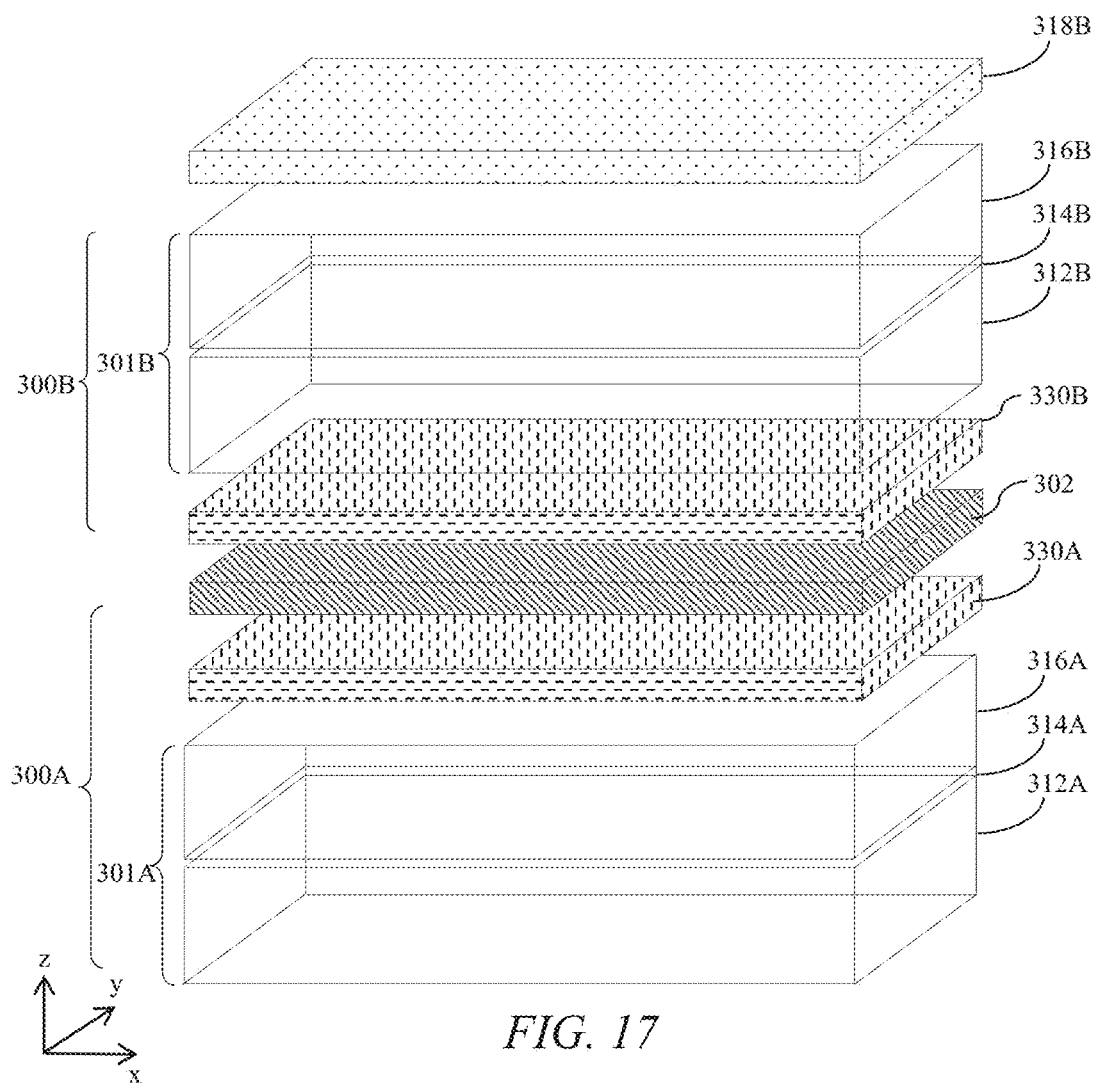
Figure 18A:
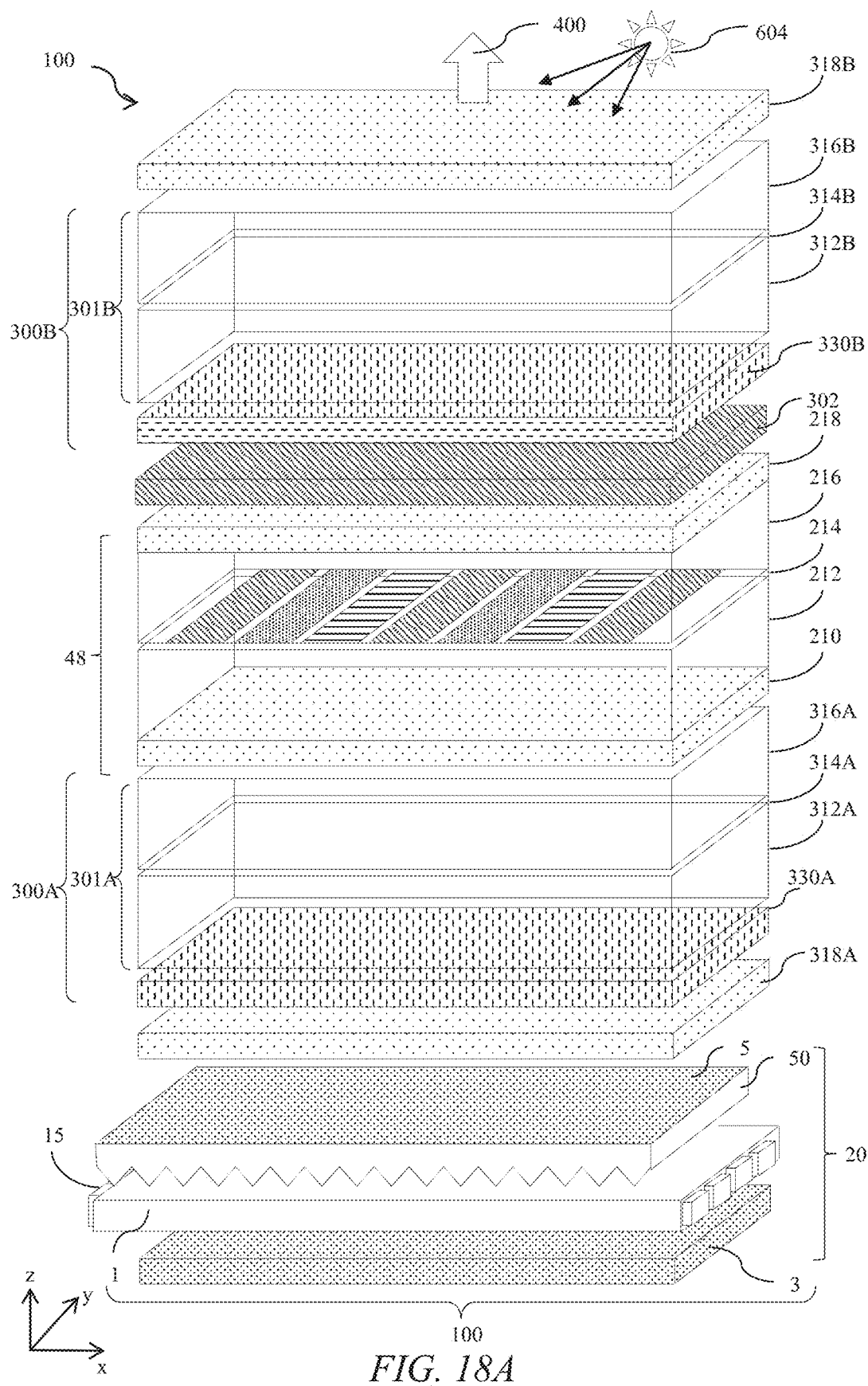
Figure 18B:
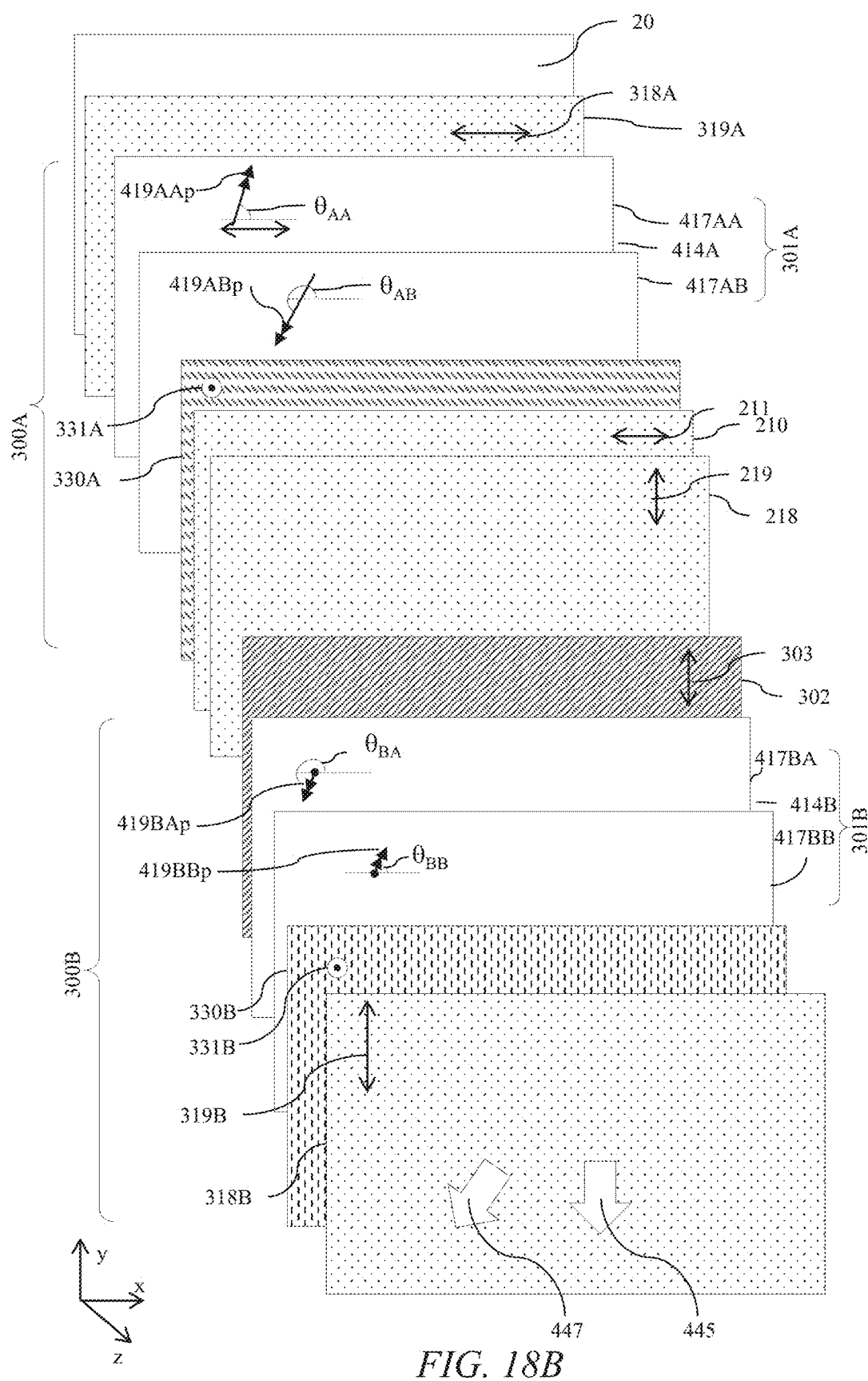
Figure 19A:
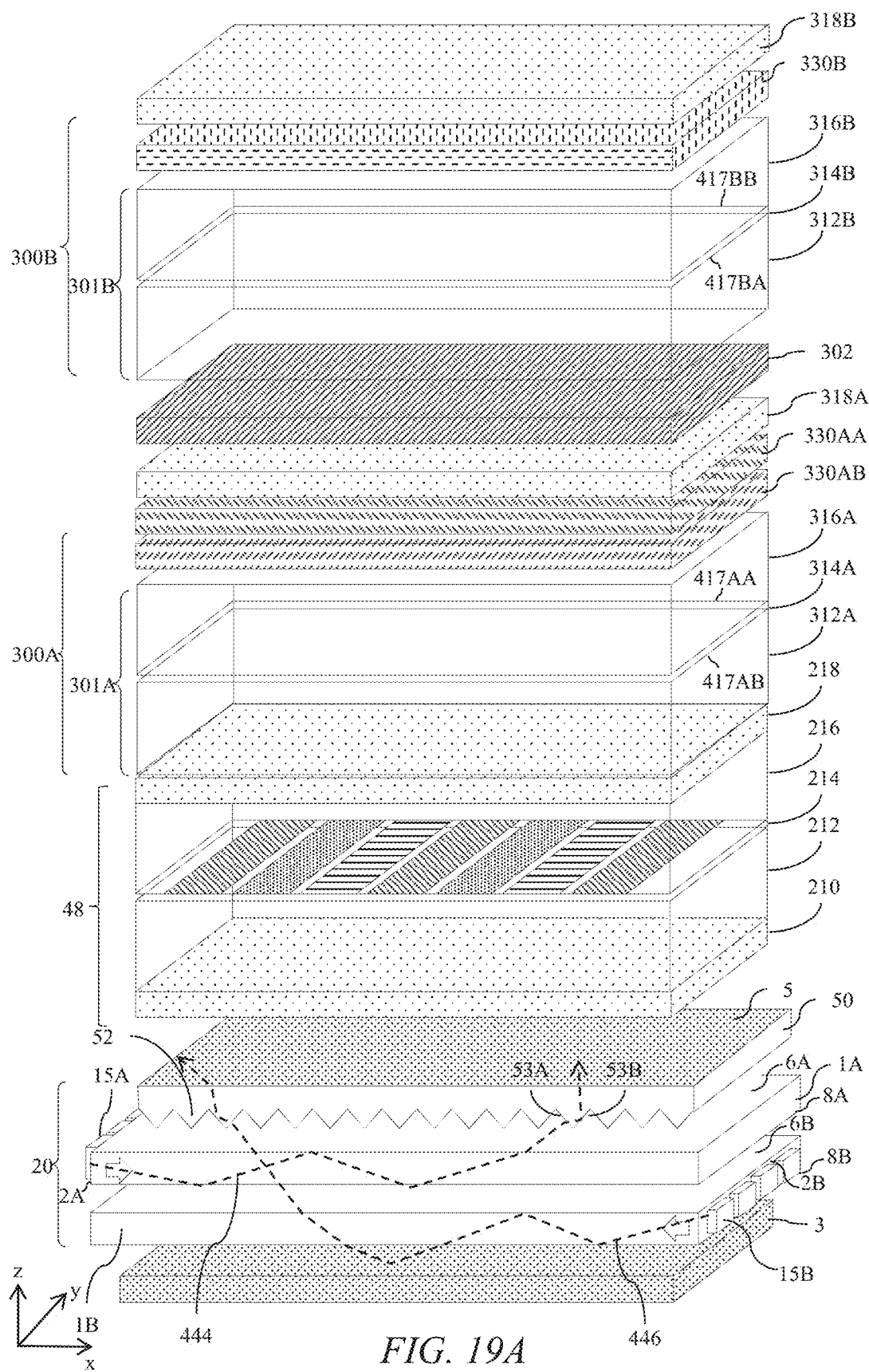
Figure 19B:
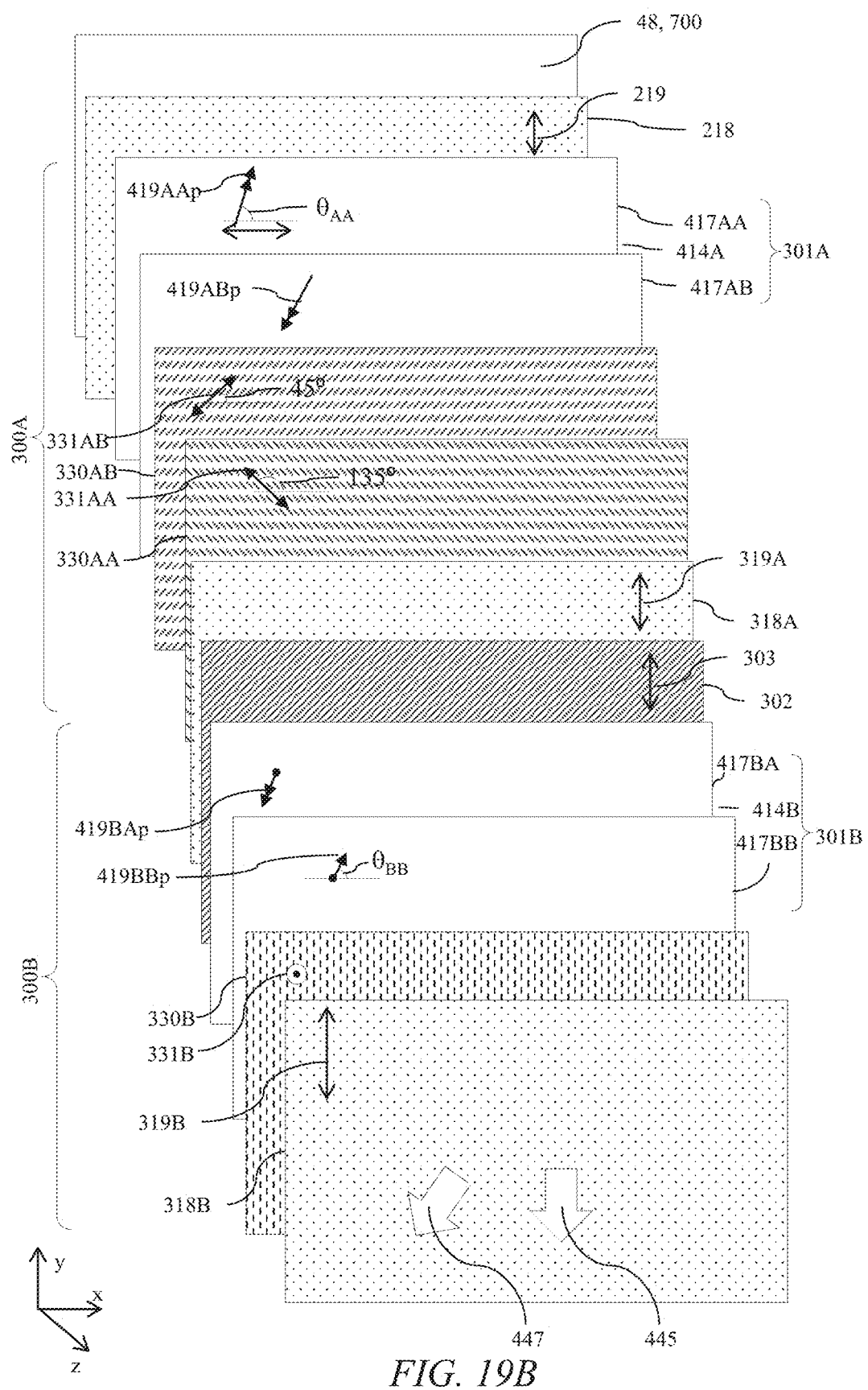
Figure 20:
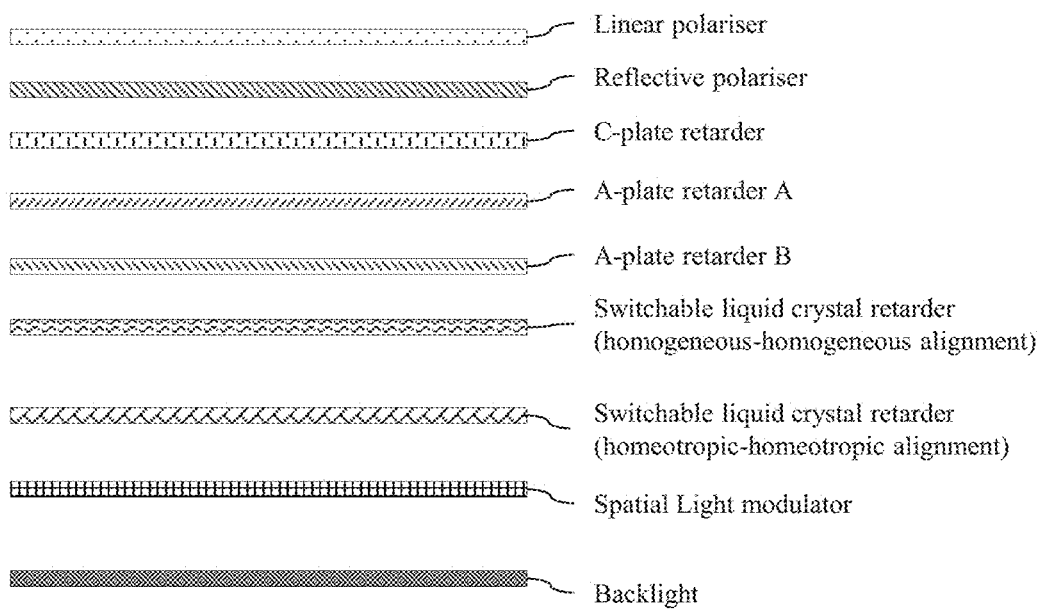
Figure 21A:
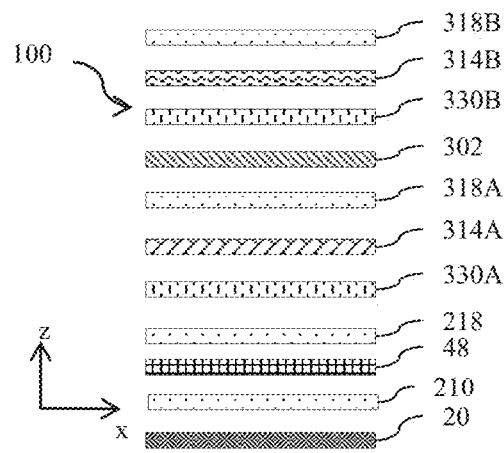
Figure 21B:
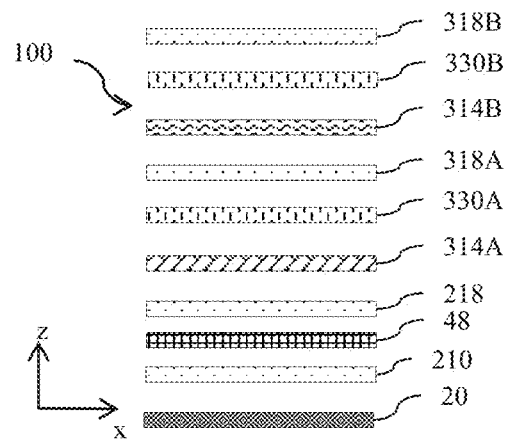
Figure 21C:
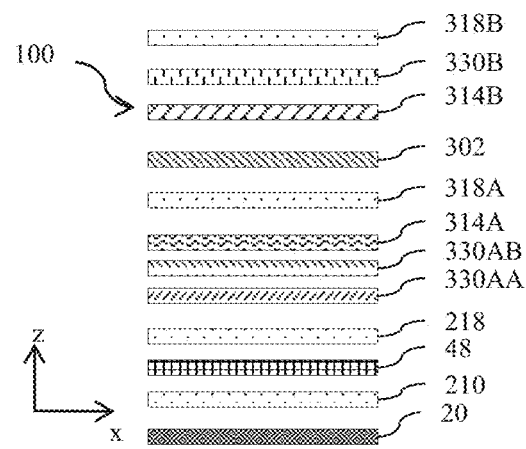
Figure 21D:
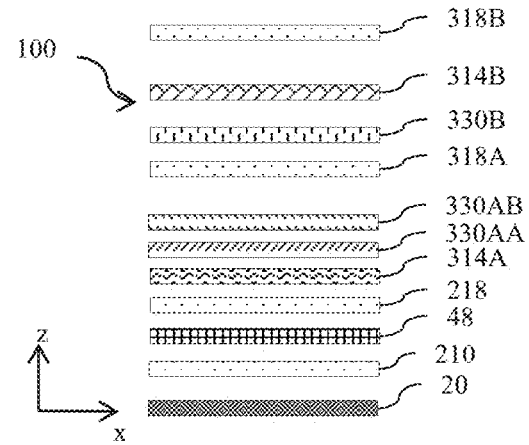
Figure 21E:
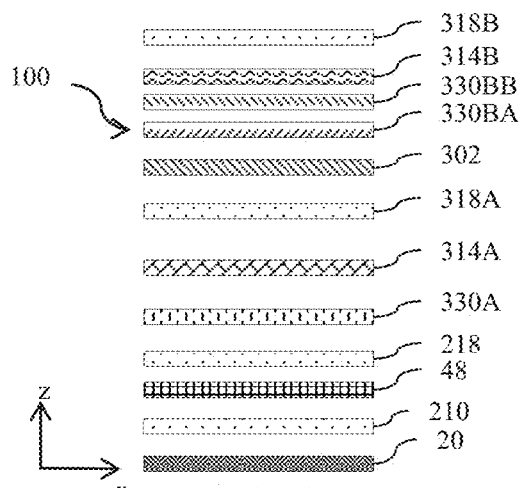
Figure 21F:
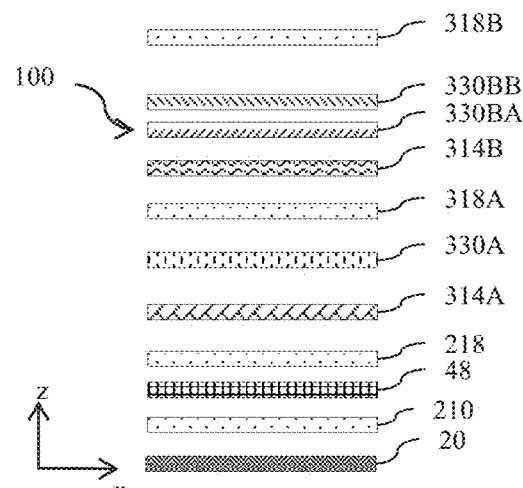
Figure 21G:
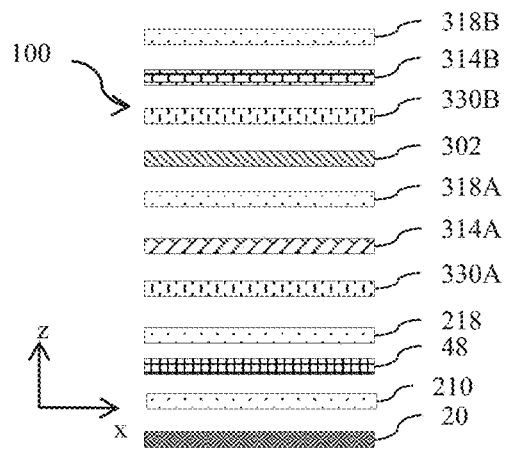
Figure 21H:
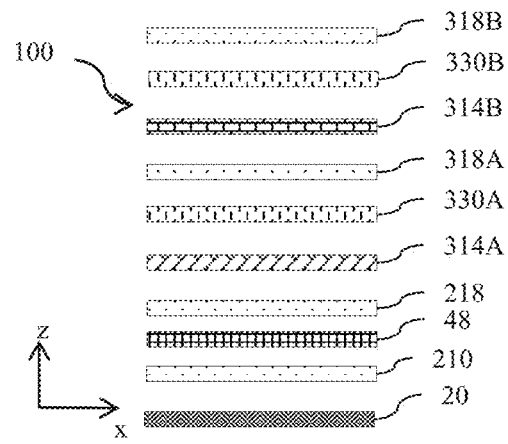
Figure 21I:
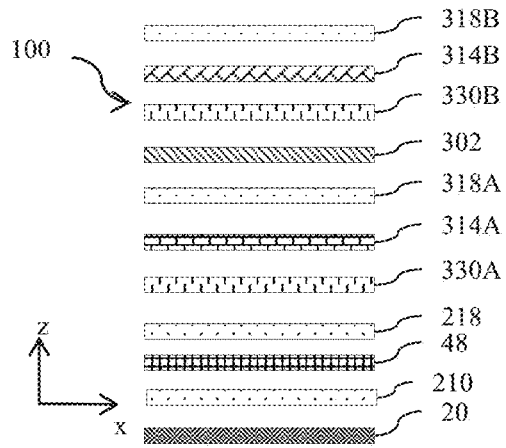
Figure 21J:
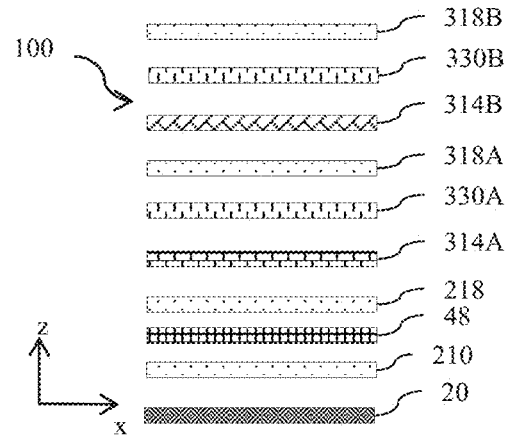
Figure 22G:
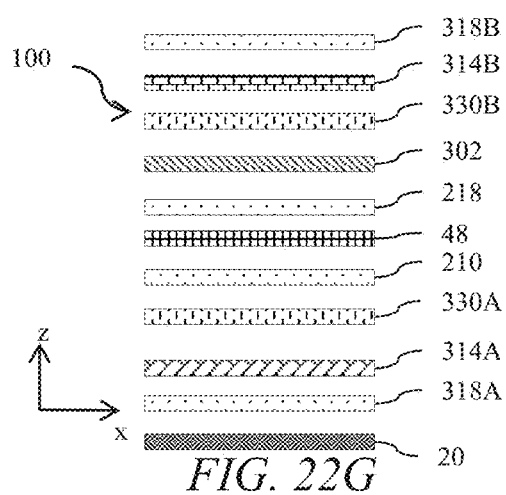
Figure 22H:
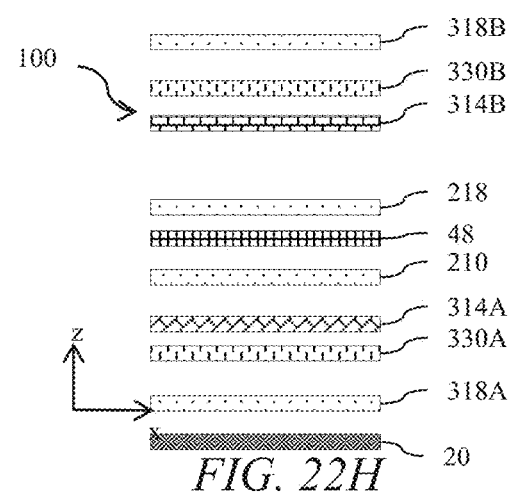
Figure 22I:
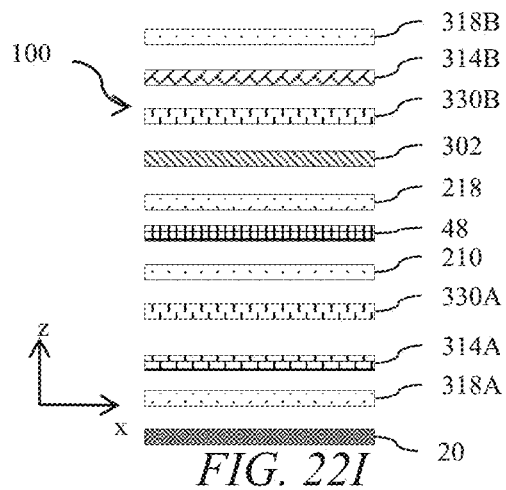
Figure 22J:
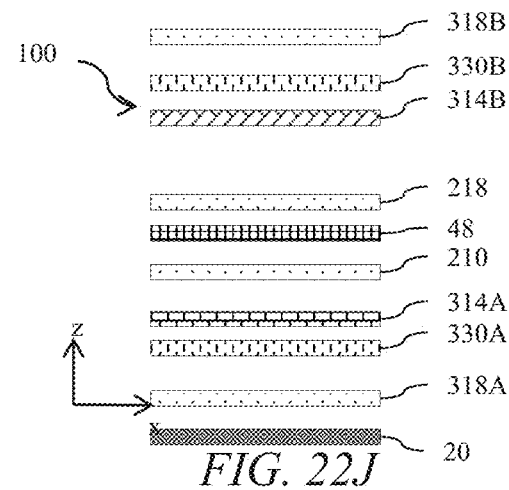
Figure 23A:
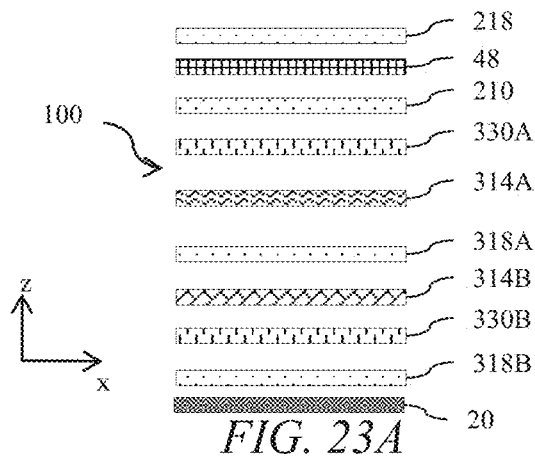
Figure 23D:
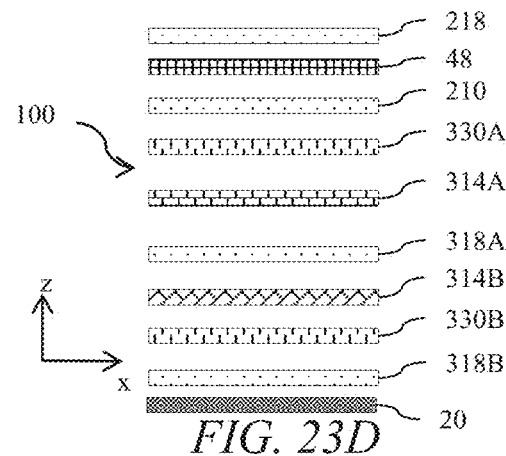
Figure 23B:
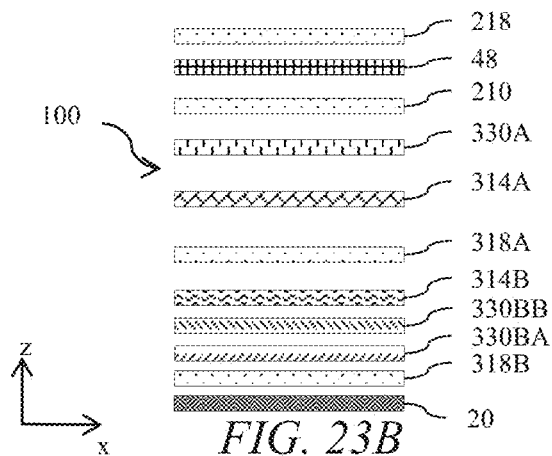
Figure 23E:
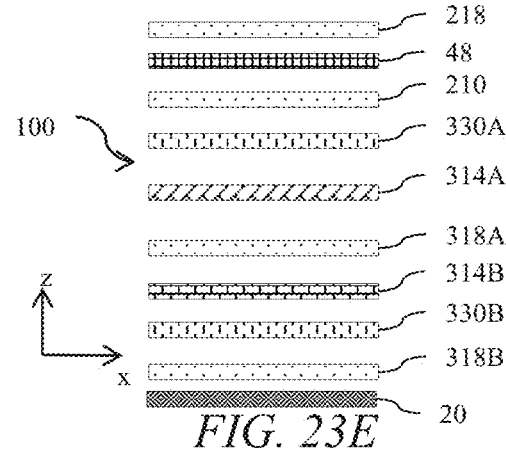
Figure 23C:
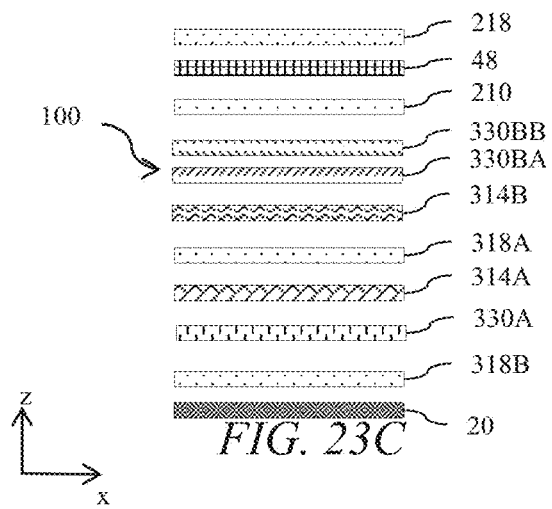
Figure 24A:
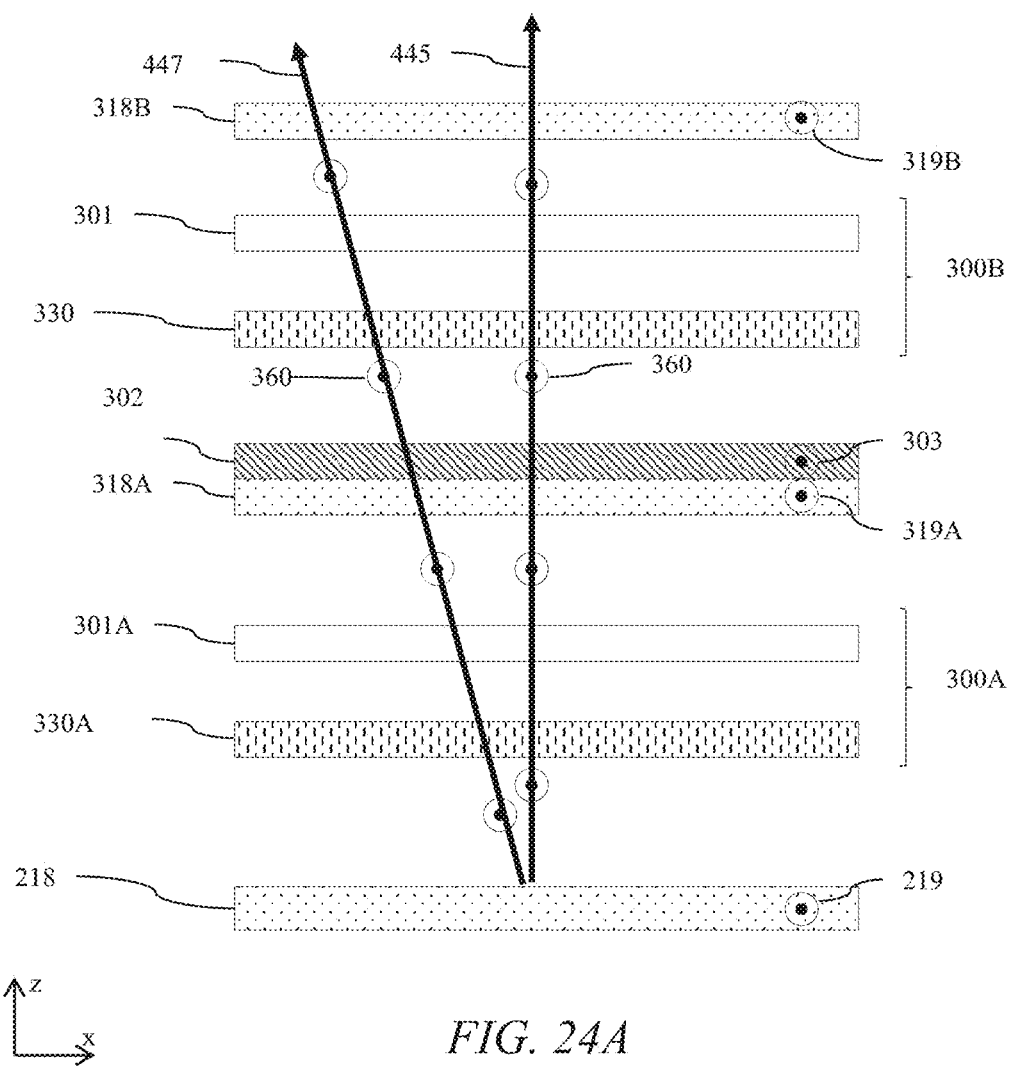
Figure 24B:
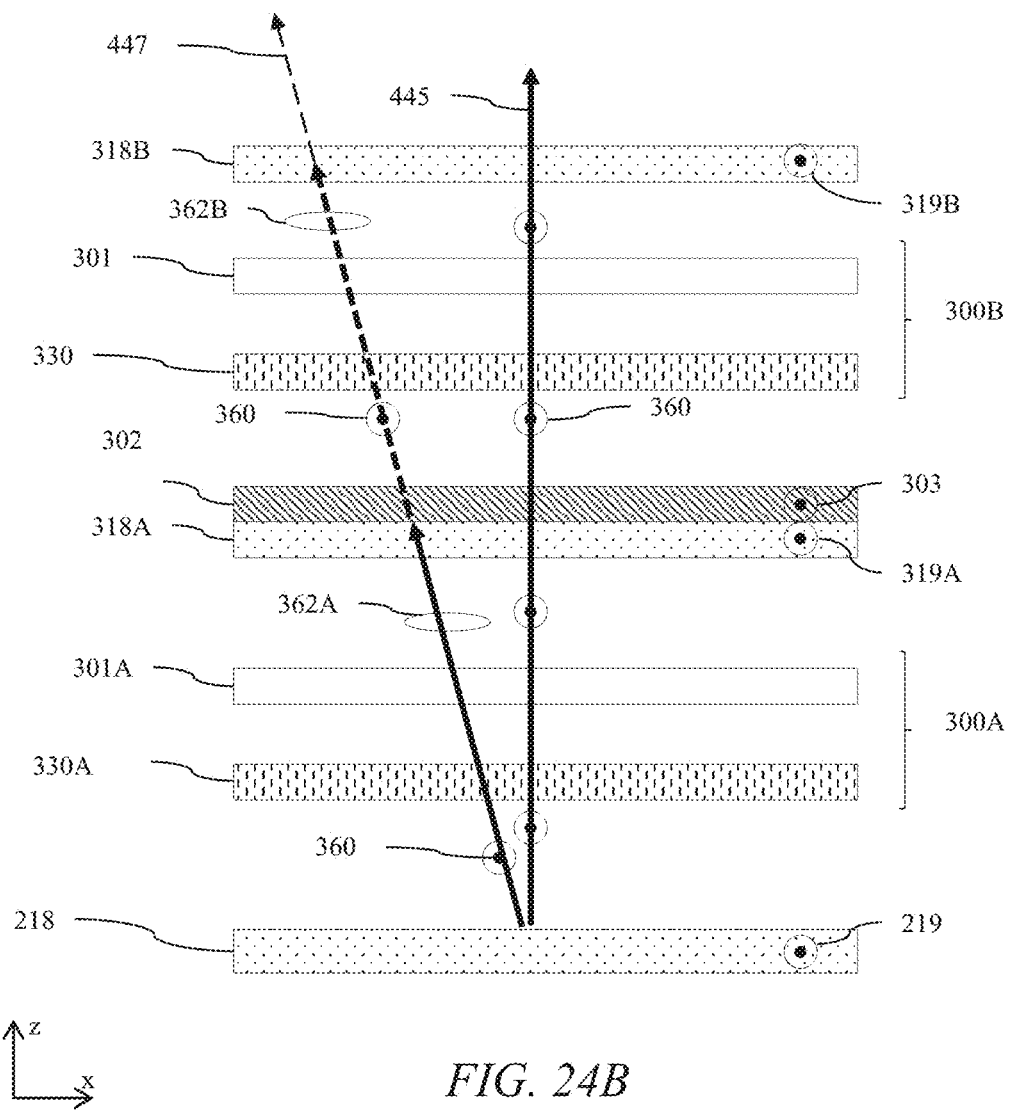
Figure 24C:
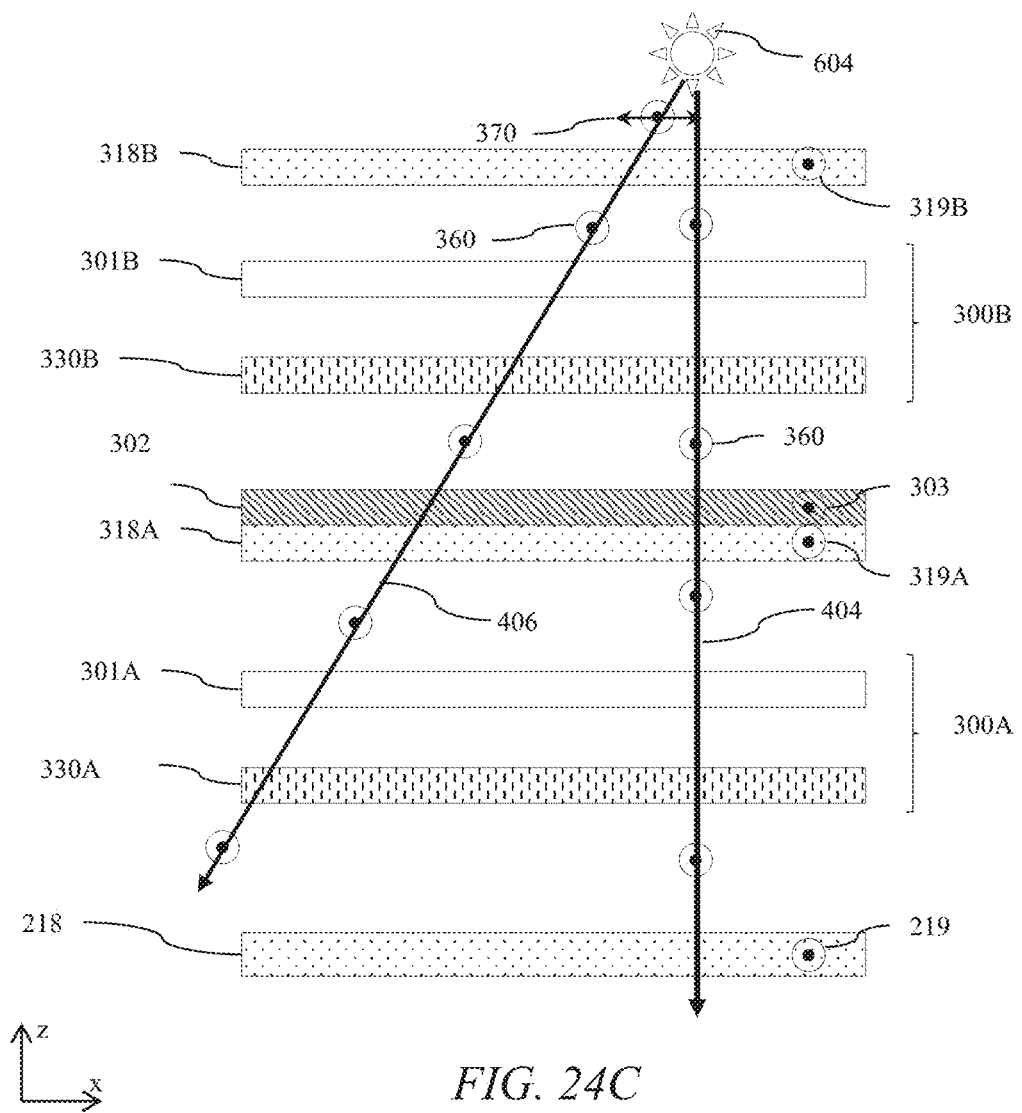
Figure 24D:
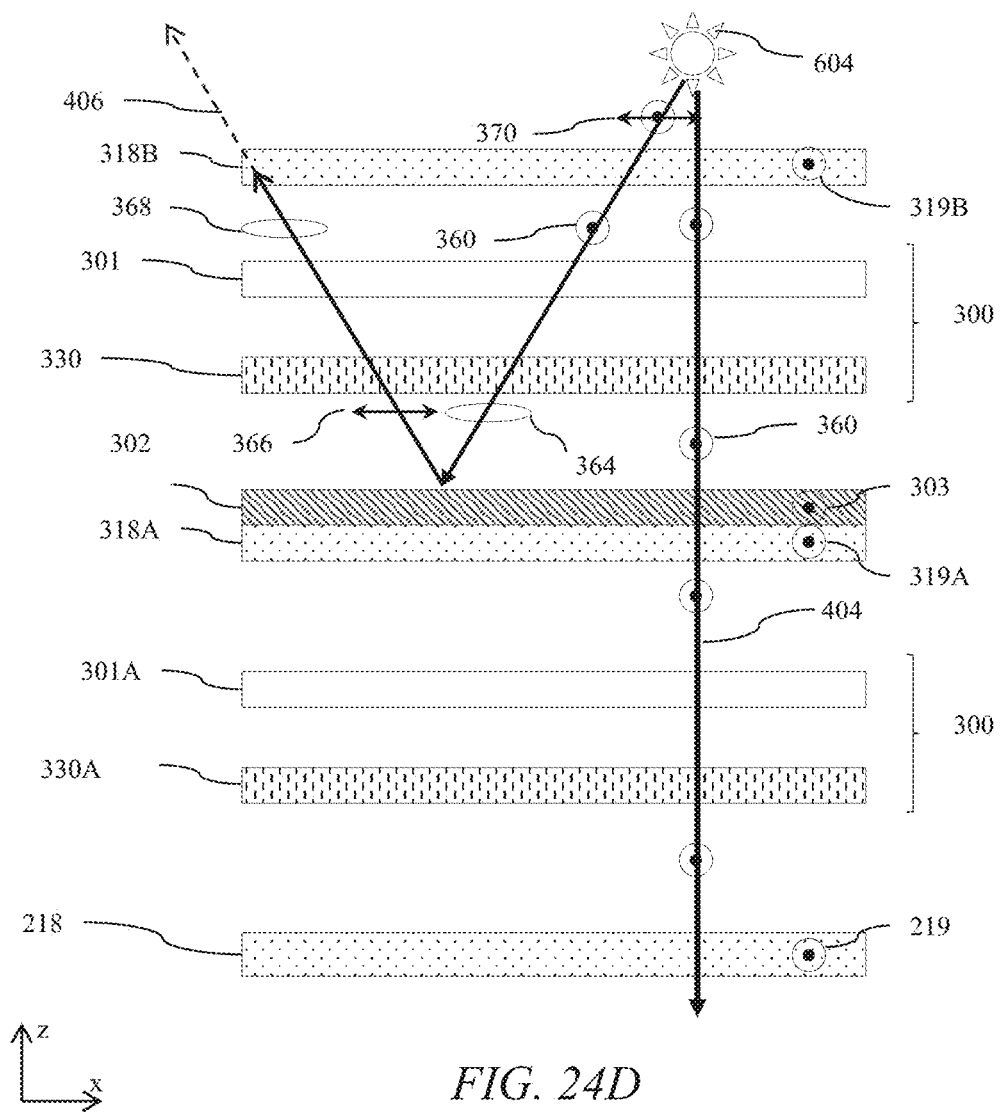

10F and FIG. 10G with a display head-on luminance, of value $Y_{max}$ measured in nits that is half of the illuminance of value I measured in lux;

FIG. 11A is a schematic diagram illustrating in side perspective view a structure of a polar control retarder comprising a passive C-plate and an active liquid crystal layer comprising two homogeneous alignment layers;

FIG. 11B is a schematic diagram illustrating in side perspective view a structure of a polar control retarder comprising passive crossed A-plates and an active liquid crystal layer comprising two homogeneous alignment layers;

FIG. 11C is a schematic diagram illustrating in side perspective view a structure of a polar control retarder comprising a passive C-plate and an active liquid crystal layer comprising two homeotropic alignment layers;

FIG. 11D is a schematic diagram illustrating in side perspective view a structure of a polar control retarder comprising passive crossed A-plates and an active liquid crystal layer comprising two homeotropic alignment layers;

FIG. 12A is a schematic diagram illustrating a front perspective view of a polar control retarder comprising a liquid crystal retarder with alignment layers having pretilt directions with components in the plane of the layer of liquid crystal material that is at an acute non-zero angle to the electric vector transmission directions of the display polariser and the additional polariser;

FIG. 12B is a schematic diagram illustrating a front view of alignment layers having a pretilt direction with components in the plane of the layer of liquid crystal material that are at acute non-zero angles to the electric vector transmission directions of the display polariser and the additional polariser;

FIG. 12C is a schematic diagram illustrating a front view of vertical polariser electric vector transmission direction and alignment directions of pretilt components in the plane of the layer of liquid crystal for a left hand drive vehicle;

FIG. 12D is a schematic diagram illustrating a front view of horizontal polariser electric vector transmission direction and alignment directions of pretilt components in the plane of the layer of liquid crystal for a left hand drive vehicle;

FIG. 12E is a schematic diagram illustrating a front view of vertical polariser electric vector transmission direction and alignment directions of pretilt components in the plane of the layer of liquid crystal for a right hand drive vehicle;

FIG. 12F is a schematic diagram illustrating a front view of horizontal polariser electric vector transmission direction and alignment directions of pretilt components in the plane of the layer of liquid crystal for a right hand drive vehicle;

FIG. 13A is a schematic diagram illustrating a side view of a switchable backlight comprising first and second waveguides, a rear reflector and an optical turning film and outputting light beams for passenger and driver nominal directions;

FIG. 13B is a schematic diagram illustrating a front perspective view of an optical turning film component for the backlight of FIG. 13A;

FIG. 13C is a schematic diagram illustrating a side view of an optical turning film component;

FIG. 14A, FIG. 14B, FIG. 14C, and FIG. 14D are schematic diagrams illustrating perspective views of various alternative waveguides for the embodiment of FIG. 13A;

FIG. 15 is a schematic diagram illustrating a side view of a switchable backlight comprising a waveguide, a rear reflector and an optical turning film and outputting light beams for passenger and driver nominal directions;

FIG. 16A and FIG. 16B are schematic diagrams illustrating perspective views of various alternative waveguides for the embodiment of FIG. 15;

FIG. 17 is a schematic diagram illustrating in side perspective view a switchable privacy display component for use with a spatial light modulator comprising a first polar control retarder and a first additional polariser, a reflective polariser; and a second polar control retarder arranged between the first additional polariser and a second additional polariser;

FIG. 18A is a schematic diagram illustrating a front perspective view of a switchable privacy display comprising a transmissive spatial light modulator wherein a first polar control retarder is arranged between the backlight and the spatial light modulator and wherein the spatial light modulator is arranged between the first and second polar control retarders;

FIG. 18B is a schematic diagram illustrating a front perspective view of alignment orientations for components of the privacy display of FIG. 18A;

FIG. 19A is a schematic diagram illustrating a front perspective view of a switchable privacy display comprising a transmissive spatial light modulator wherein the first and second polar control retarders are arranged to receive light from the spatial light modulator;

FIG. 19B is a schematic diagram illustrating a front perspective view of alignment orientations for components of the privacy display of FIG. 19A;

FIG. 20 is a key for the alternative stacking arrangements of FIGS. 21A-J, FIGS. 22A-J, and FIGS. 23A-E;

FIG. 21A, FIG. 21B, FIG. 21C, FIG. 21D, FIG. 21E, FIG. 21F, FIG. 21G, FIG. 21H, FIG. 21I, and FIG. 21J are schematic diagrams illustrating in side view alternatives for optical component stackings for a switchable privacy display wherein the first and second polar control retarders are arranged to receive light from a transmissive spatial light modulator and backlight;

FIG. 22A, FIG. 22B, FIG. 22C, FIG. 22D, FIG. 22E, FIG. 22F, FIG. 22G, FIG. 22H, FIG. 22I, and FIG. 22J are schematic diagrams illustrating in side view alternatives for optical component stackings for a switchable privacy display wherein one of the first and second polar control retarders is arranged to receive light from a transmissive spatial light modulator and the spatial light modulator is arranged to receive light from the other of the first and second polar control retarders and a backlight;

FIG. 23A, FIG. 23B, FIG. 23C, FIG. 23D, and FIG. 23E are schematic diagrams illustrating in side view alternatives for optical component stackings for a switchable privacy display wherein a transmissive spatial light modulator is arranged to receive light from the first and second polar control retarders and a backlight;

FIG. 24A is a schematic diagram illustrating in side view the operation of the arrangement of FIG. 2 for transmitted light from the spatial light modulator in the share mode of operation;

FIG. 24B is a schematic diagram illustrating in side view the operation of the arrangement of FIG. 2 for transmitted light from the spatial light modulator in a privacy mode of operation with high reflectivity of ambient light;

FIG. 24C is a schematic diagram illustrating in side view the operation of the arrangement of FIG. 18A for ambient light in the share mode of operation; and FIG. 24D is a schematic diagram illustrating in side view the operation of the arrangement of FIG. 18A for ambient light in a privacy mode of operation with high reflectivity of ambient light.

DETAILED DESCRIPTION

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, $\Gamma$, that it imparts on the two polarization components; which is related to the birefringence $\Delta n$ and the thickness d of the retarder by $$\Gamma = 2 \cdot \pi \cdot \Delta n \cdot d / \lambda_0 \qquad \text{eqn. 1}$$

In eqn. 1, $\Delta n$ is defined as the difference between the extraordinary and the ordinary index of refraction, i.e.

$$\Delta n = n_e - n_o \qquad \text{eqn. 2}$$

For a half-wave retarder, the relationship between d, $\Delta n$, and $\lambda_0$ is chosen so that the phase shift between polarization components is $\Gamma = \pi$. For a quarter-wave retarder, the relationship between d, $\Delta n$, and $\lambda_0$ is chosen so that the phase shift between polarization components is $\Gamma = \pi/2$.

The term half-wave retarder herein typically refers to light propagating normal to the retarder and normal to the spatial light modulator.

Some aspects of the propagation of light rays through a transparent retarder between a pair of polarisers will now be described.

The state of polarisation (SOP) of a light ray is described by the relative amplitude and phase shift between any two orthogonal polarization components. Transparent retarders do not alter the relative amplitudes of these orthogonal polarisation components but act only on their relative phase. Providing a net phase shift between the orthogonal polarisation components alters the SOP whereas maintaining net relative phase preserves the SOP. In the current description, the SOP may be termed the polarisation state.

A linear SOP has a polarisation component with a non-zero amplitude and an orthogonal polarisation component which has zero amplitude.

A linear polariser transmits a unique linear SOP that has a linear polarisation component parallel to the electric vector transmission direction of the linear polariser and attenuates light with a different SOP. The term "electric vector transmission direction" refers to a non-directional axis of the polariser parallel to which the electric vector of incident light is transmitted, even though the transmitted "electric vector" always has an instantaneous direction. The term "direction" is commonly used to describe this axis.

Absorbing polarisers are polarisers that absorb one polarisation component of incident light and transmit a second orthogonal polarisation component. Examples of absorbing linear polarisers are dichroic polarisers.

Reflective polarisers are polarisers that reflect one polarisation component of incident light and transmit a second orthogonal polarisation component. Examples of reflective polarisers that are linear polarisers are multilayer polymeric film stacks such as DBEF™ or APF™ from 3M Corporation, or wire grid polarisers such as ProFlux™ from Moxtek. Reflective linear polarisers may further comprise cholesteric reflective materials and a quarter waveplate arranged in series.

A retarder arranged between a linear polariser and a parallel linear analysing polariser that introduces no relative net phase shift provides full transmission of the light other than residual absorption within the linear polariser.

A retarder that provides a relative net phase shift between orthogonal polarisation components changes the SOP and provides attenuation at the analysing polariser.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to positively birefringent C-plate, i.e. a C-plate with a positive $\Delta n$. A 'negative C-plate' refers to a negatively birefringent C-plate, i.e. a C-plate with a negative $\Delta n$.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive $\Delta n$.

Achromatic retarders may be provided wherein the material of the retarder is provided with a retardance $\Delta n \cdot d$ that varies with wavelength $\lambda$ as $$\Delta n \cdot d / \lambda = \kappa \qquad \text{eqn. 3}$$

where $\kappa$ is substantially a constant.

Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by $\Delta n \cdot d$ where $\Delta n$ is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

In a twisted liquid crystal layer, a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A supertwisted liquid crystal layer has a twist of greater than 180 degrees. A twisted nematic layer used in spatial light modulators typically has a twist of 90 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$V=(Y+R)/(Y-K) \qquad \text{eqn. 4}$$

where V is the visual security level (VSL), Y is the luminance of the white state of the display at a snooper viewing angle, K is the luminance of the black state of the display at the snooper viewing angle and R is the luminance of reflected light from the display.

Panel contrast ratio is given as:

$$C=Y/K \qquad \text{eqn. 5}$$

so the visual security level may be further given as:

$$V=(P \cdot Y_{max}+I \cdot \rho/\pi)/(P \cdot (Y_{max}-Y_{max}/C)) \qquad \text{eqn. 6}$$

where: $Y_{max}$ is the maximum luminance of the display; P is the off-axis relative luminance typically defined as the ratio of luminance at the snooper angle to the maximum luminance $Y_{max}$; C is the image contrast ratio; ρ is the surface reflectivity; and I is the illuminance. The units of $Y_{max}$ are the units of I divided by solid angle in units of steradian.

The luminance of a display varies with angle and so the maximum luminance of the display $Y_{max}$ occurs at a particular angle that depends on the configuration of the display.

In many displays, the maximum luminance $Y_{max}$ occurs head-on, i.e. normal to the display. Any display device disclosed herein may be arranged to have a maximum luminance $Y_{max}$ that occurs head-on, in which case references to the maximum luminance of the display device $Y_{max}$ may be replaced by references to the luminance normal to the display device.

Alternatively, any display described herein may be arranged to have a maximum luminance $Y_{max}$ that occurs at a polar angle to the normal to the display device that is greater than 0°. By way of example, the maximum luminance $Y_{max}$ may occur may at a non-zero polar angle and at an azimuth angle that has for example zero lateral angle so that the maximum luminance is for an on-axis user that is looking down on to the display device. The polar angle may for example be 10 degrees and the azimuthal angle may be the northerly direction (90 degrees anti-clockwise from easterly direction). The viewer may therefore desirably see a high luminance at typical non-normal viewing angles.

The off-axis relative luminance, P is sometimes referred to as the privacy level. However, such privacy level P describes relative luminance of a display at a given polar angle compared to head-on luminance, and in fact is not a measure of privacy appearance.

The illuminance, I is the luminous flux per unit area that is incident on the display and reflected from the display towards the observer location. For Lambertian illuminance, and for displays with a Lambertian front diffuser illuminance I is invariant with polar and azimuthal angles. For arrangements with a display with non-Lambertian front diffusion arranged in an environment with directional (non- Lambertian) ambient light, illuminance I varies with polar and azimuthal angle of observation.

Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles. allowing the visual security level to be approximated to:

$$V=1+I\cdot\rho/(\pi\cdot P\cdot Y_{max}) \qquad \text{eqn. 7}$$

In the present embodiments, in addition to the exemplary definition of eqn. 4, other measurements of visual security level, V may be provided, for example to include the effect on image visibility to a snooper of snooper location, image contrast, image colour and white point and subtended image feature size. Thus the visual security level may be a measure of the degree of privacy of the display but may not be restricted to the parameter V.

The perceptual image security may be determined from the logarithmic response of the eye, such that $$S=\log_{10}(V) \qquad \text{eqn. 8}$$

Desirable limits for S were determined in the following manner. In a first step a privacy display device was provided. Measurements of the variation of privacy level, $P(\theta)$ of the display device with polar viewing angle and variation of reflectivity $\rho(\theta)$ of the display device with polar viewing angle were made using photopic measurement equipment. A light source such as a substantially uniform luminance light box was arranged to provide illumination from an illuminated region that was arranged to illuminate the privacy display device along an incident direction for reflection to a viewer positions at a polar angle of greater than 0° to the normal to the display device. The variation $I(\theta)$ of illuminance of a substantially Lambertian emitting lightbox with polar viewing angle was determined by and measuring the variation of recorded reflective luminance with polar viewing angle taking into account the variation of reflectivity $\rho(\theta)$. The measurements of $P(\theta)$, $r(\theta)$ and $I(\theta)$ were used to determine the variation of Security Factor $S(\theta)$ with polar viewing angle along the zero elevation axis.

In a second step a series of high contrast images were provided on the privacy display including (i) small text images with maximum font height 3 mm, (ii) large text images with maximum font height 30 mm and (iii) moving images.

In a third step each observer (with eyesight correction for viewing at 1000 mm where appropriate) viewed each of the images from a distance of 1000 mm, and adjusted their polar angle of viewing at zero elevation until image invisibility was achieved for one eye from a position near on the display at or close to the centre-line of the display. The polar location of the observer's eye was recorded. From the relationship $S(\theta)$, the security factor at said polar location was determined. The measurement was repeated for the different images, for various display luminance $Y_{max}$, different lightbox illuminance $I(\theta=0)$, for different background lighting conditions and for different observers.

From the above measurements S<1.0 provides low or no visual security, 1.0≤S<1.5 provides visual security that is dependent on the contrast, spatial frequency and temporal frequency of image content, 1.5≤S<1.8 provides acceptable image invisibility (that is no image contrast is observable) for most images and most observers and S≥1.8 provides full image invisibility, independent of image content for all observers.

In practical display devices, this means that it is desirable to provide a value of S for an off-axis viewer who is a snooper that meets the relationship S≥$S_{min}$, where: $S_{min}$ has a value of 1.0 or more to achieve the effect that the off-axis viewer cannot perceive the displayed image; $S_{min}$ has a value of 1.5 or more to achieve the effect that the displayed image is invisible, i.e. the viewer cannot perceive even that an image is being displayed, for most images and most observers; or $S_{min}$ has a value of 1.8 or more to achieve the effect that the displayed image is invisible independent of image content for all observers.

In comparison to privacy displays, desirably wide angle displays are easily observed in standard ambient illuminance conditions. One measure of image visibility is given by the contrast sensitivity such as the Michelson contrast which is given by:

$$M=(I_{max}-I_{min})/(I_{max}+I_{min}) \qquad \text{eqn. 9}$$

and so:

$$M=((Y+R)-(K+R))/((Y+R)+(K+R))=(Y-K)/(Y+K+2\cdot R) \qquad \text{eqn. 10}$$

Thus the visual security level (VSL), V is equivalent (but not identical to) 1/M. In the present discussion, for a given off-axis relative luminance, P the wide angle image visibility, W is approximated as $$W=1/V=1/(1+I\cdot\rho/(\pi\cdot P\cdot Y_{max})) \qquad \text{eqn. 11}$$

The above discussion focusses on reducing visibility of the displayed image to an off-axis viewer who is a snooper, but similar considerations apply to visibility of the displayed image to the intended user of the display device who is typically on-axis. In this case, decrease of the level of the visual security level (VSL) V corresponds to an increase in the visibility of the image to the viewer. During observation S<0.1 may provide acceptable visibility of the displayed image. In practical display devices, this means that it is desirable to provide a value of S for an on-axis viewer who is the intended user of the display device that meets the relationship S≤$S_{max}$, where $S_{max}$ has a value of 0.1.

In the present discussion the colour variation Δε of an output colour ($u_w'+\Delta u'$, $v_w'+\Delta v'$) from a desirable white point ($u_w'$, $v_w'$) may be determined by the CIELUV colour difference metric, assuming a typical display spectral illuminant and is given by:

$$\Delta\varepsilon=(\Delta u'^2+\Delta v'^2)^{1/2} \qquad \text{eqn. 12}$$

The structure and operation of various directional display devices will now be described. In this description, common elements have common reference numerals. It is noted that the disclosure relating to any element applies to each device in which the same or corresponding element is provided. Accordingly, for brevity such disclosure is not repeated.

A switchable privacy display such as for a vehicle will now be described.

Figure 1:
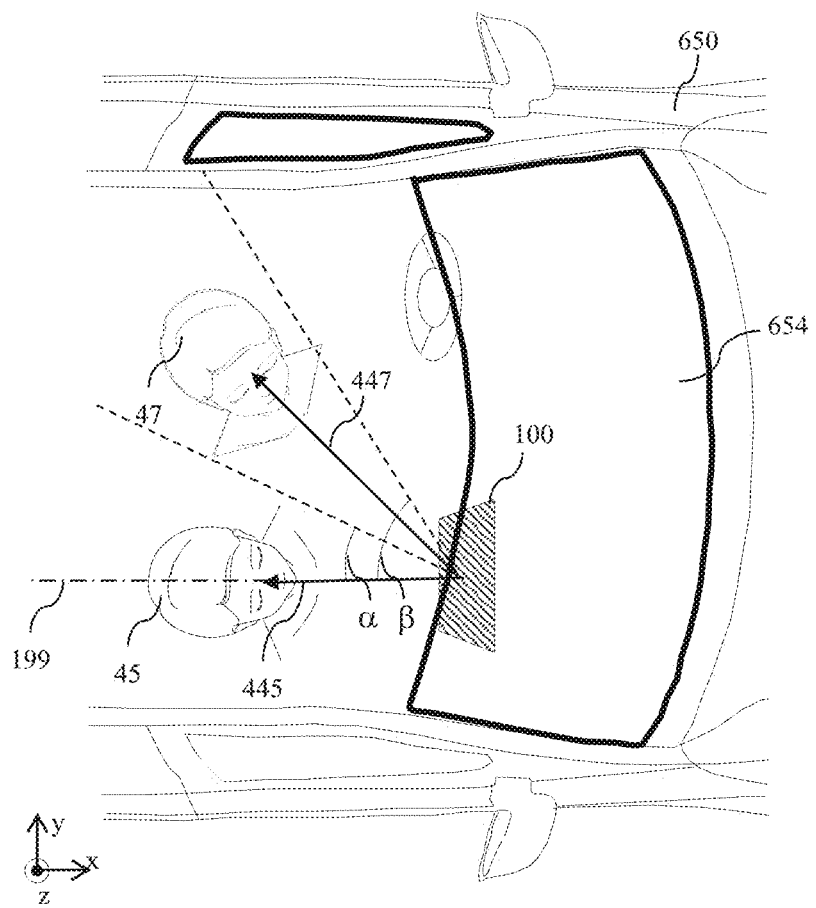
FIG. 1 is a schematic diagram illustrating a top view of a privacy display for use by a passenger in an automotive vehicle.

FIG. 1 is a schematic diagram illustrating a top view of a privacy display device 100 for use by a passenger in a vehicle. Vehicles may include the automotive vehicle 650 of FIG. 1 or trains, boats, and airplanes for example. Features of the embodiment of FIG. 1 not discussed in further detail may be assumed to correspond to the features with equivalent reference numerals as discussed above, including any potential variations in the features.

Display device 100 is arranged in a passenger information display (PID) location, (on the right hand side of the vehicle for Left Hand Drive), with light rays 445, 447 output to the user 45 and user 47 respectively.

In a first mode of operation that is the privacy mode the display device 100 is arranged for viewing by the front passenger 45 near to an on-axis 199 location, and to inhibit viewing by the driver 47.

It is desirable that the passenger 45 may view information such as entertainment without the image causing distraction to the driver 47, that is the privacy mode refers to a low driver distraction mode. This mode is in comparison with a mode in which the passenger display turns off when the vehicle is in motion to prevent driver distraction. More specifically to minimise the visibility to the driver 47 of distracting images at both the nominal driver position and when the driver leans across towards the display while driving, it is desirable to maximise the security factor S at angles α from the optical axis 199 of greater than 30° and preferably greater than 25° in the direction from the optical axis 199 towards the driver 47. Further it is desirable to achieve a high security factor, S for polar angles at least at angles R from the optical axis 199.

Further in a low stray light function of the privacy mode, it may be desirable to provide an image to the passenger 45 with desirable luminance while reducing the luminance to reflecting and scattering surfaces within the vehicle. Advantageously the brightness of internal surfaces of the vehicle 650 may be reduced during night time operation, reducing driver distraction. Further, increased area displays may be provided while maintaining desirably low levels of stray illumination within the vehicle 650 cabin.

In a second mode that is the share mode, the display device 100 is arranged for viewing by driver 47 in an off-axis location. Such use may be for occasions when viewing the display content is safe such as when the vehicle is stationary or the content is appropriate such as map or instrument data.

An illustrative structure that can achieve the desirable characteristics of the display device 100 of FIG. 1 will now be described.

Figure 3A:
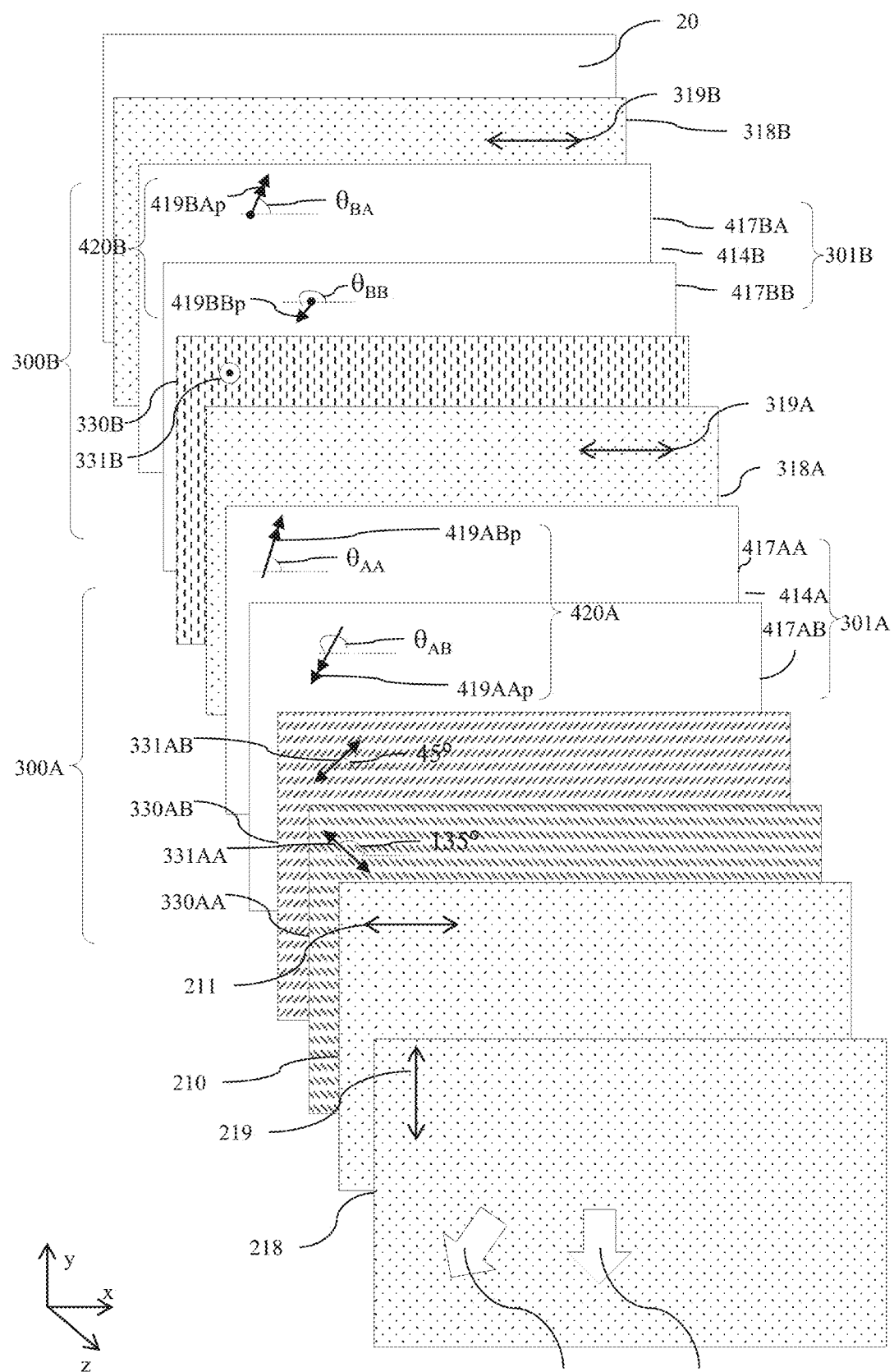
FIG. 3A is a schematic diagram illustrating a front perspective view of alignment orientations for components of the privacy display of FIG. 2.

FIG. 2 is a schematic diagram illustrating a front perspective view of a switchable privacy display device 100 comprising a transmissive spatial light modulator 48; and FIG. 3A is a schematic diagram illustrating a front perspective view of alignment orientations for components of the privacy display device 100 of FIG. 2. Features of the embodiment of FIG. 2 and FIG. 3A not discussed in further detail may be assumed to correspond to the features with equivalent reference numerals as discussed above, including any potential variations in the features.

The display device 100 comprises a backlight 20 arranged to output light 444, 446; a transmissive spatial light modulator 48 arranged to receive output light from the backlight 20; a display polariser 210 arranged on a side of the spatial light modulator 48, the display polariser 210 being a linear polariser.

A first additional polariser 318A is arranged on the same side of the spatial light modulator 48 as the display polariser 210, the first additional polariser 318A being a linear polariser; at least one first polar control retarder 300A arranged between the first additional polariser 318A and the display polariser 210, a second additional polariser 318B, the second additional polariser 318B being a linear polariser; and at least one second polar control retarder 300B.

In the embodiment of FIG. 2 the display polariser is an input display polariser 210 arranged on the input side of the spatial light modulator 48. The first additional polariser 318A is arranged on the same side of the spatial light modulator 48 as the input display polariser 210, the first additional polariser 318A being a linear polariser. At least one first polar control retarder 300A is arranged between the first additional polariser 318A and the input display polariser 210. A second additional polariser 318B is arranged on the same side of the spatial light modulator 48 as the first additional polariser 318A outside (on the input side of) the first additional polariser 318A. The at least one second polar control retarder 300B is arranged between the first additional polariser 318A and the second additional polariser 318B.

In the embodiment of FIG. 19A the display polariser is an output display polariser 218 arranged on the output side of the spatial light modulator 48. A first additional polariser 318A is arranged on the output side of the spatial light modulator 48 as the display polariser 218, the first additional polariser 318A being a linear polariser. At least one first polar control retarder 300A is arranged between the first additional polariser 318A and the display polariser 218 and the second additional polariser 318B is arranged on the same side of the spatial light modulator 48 as the first additional polariser 318A outside (on the output side of) the first additional polariser 318A. The at least one second polar control retarder 300B is arranged between the first additional polariser 318A and the second additional polariser 318B.

In the present disclosure, the spatial light modulator 48 may comprise a liquid crystal display comprising substrates 212, 216, and liquid crystal layer 214 having red, green and blue pixels 220, 222, 224. The spatial light modulator 48 has an input display polariser 210 and an output display polariser 218 on opposite sides thereof. The output display polariser 218 is arranged to provide high extinction ratio for light from the pixels 220, 222, 224 of the spatial light modulator 48. Typical polarisers 210, 218 may be absorbing polarisers such as dichroic polarisers such as an iodine polariser on stretched PVA.

The backlight apparatus 20 comprises a rear reflector 3 and a waveguide arrangement comprising first and second waveguides 1A, 1B, and optical turning film component 50 and arranged to receive light exiting from the waveguides 1A, 1B and direct through the spatial light modulator 48.

The waveguides 1A, 1B each comprise input ends 2A, 2B arranged between first and second light guiding surfaces 6A, 8A and 6B, 8B respectively.

Light source arrays 15A, 15B are arranged to input input light into the input sides 2A, 2B of waveguides 1A, 1B respectively.

Optical stack 5 may comprise diffusers, and other known optical backlight structures such as recirculating polarisers (not shown). Asymmetric diffusers, that may comprise asymmetric surface relief features for example, may be provided in the optical stack 5 with increased diffusion in the elevation direction in comparison to the lateral direction may be provided. Advantageously image uniformity may be increased.

Display apparatus 100 further comprises additional polarisers 318A, 318B arranged between the spatial light modulator 48 and the input display polariser 210. Polarisers 318A, 318B, 318 may be absorbing dichroic polarisers such as an iodine polariser on stretched PVA.

The display input polariser 210 and the additional polarisers 318A, 318B have electric vector transmission directions 211, 319A, 319B respectively that are parallel, and orthogonal to the output polariser 218 transmission direction 219.

Polar control retarder 300A is arranged between the display polariser 210 and the first additional polariser 318A, the polar control retarder 300A including a switchable liquid crystal retarder 301A comprising a layer 214A of liquid crystal material. Each of the at least one first polar control retarder 300A and the at least one second polar control retarder 300B comprises a respective switchable liquid crystal retarder 301A, 301B comprising a layer 314A, 314B of liquid crystal material 414A, 414B and two surface alignment layers 417AA, 417AB and 417BA, 417BB disposed adjacent to the layer 314A, 314B of liquid crystal material 414A, 414B and on opposite sides thereof.

Polar control retarder 300B is arranged between the additional polarisers 318A, 318B, the polar control retarder 300B including a switchable liquid crystal retarder 301B comprising a layer 214B of liquid crystal material.

More generally polar control retarders 300A, 300B comprise: (i) a switchable liquid crystal retarder 301A, 301B comprising a layer 314A, 314B of liquid crystal material arranged between transparent support substrates 312A, 312B, 316A, 316B; and (ii) at least one passive compensation retarder 330A, 330B.

The backlight 20 comprises a pair of waveguides 1A, 1B and respective aligned light sources 15A, 15B that are arranged to provide output illumination into nominal directions 445, 447 respectively directed towards the passenger 45 and driver 47 respectively. The structure and operation of the backlight 20 will be described further with reference to FIG. 13A hereinbelow.

The polar distribution of the light output of rays 445, 447 towards passenger 45 and driver 47 respectively may be further modified by diffusers including diffuser 5 arranged after the turning film 50 of the backlight 20.

The structure of the display device 100 of FIG. 2 does not provide further optical control layers after the output display polariser 218. Advantageously low reflectivity can be achieved for enhanced aesthetic appearance in an automotive cabin, for example by using anti-reflection coatings on the output surface of the polariser 218 or by bonding the display to a further substrate (not shown) comprising an anti-reflection coating on the output surface of the further substrate.

Alignment orientations of the optical stack of the privacy display device 100 of FIG. 2 and FIG. 3A will now be described.

For the light source inputs 15A, 15B of FIG. 2, the output of the backlight 20 may have partially polarised output due to Fresnel reflections at the waveguide 1 and/or turning film component 50. Higher transmission may be for an electric vector direction of the output light from the backlight 20 that is horizontal. Backlight 20 is arranged to illuminate additional polariser 318B that has a horizontal polariser transmission direction 319B. Advantageously efficiency is increased.

The structure of liquid crystal retarders 301A, 301B will be described in further detail with respect to FIGS. 11A-D and FIGS. 12A-B hereinbelow.

In the illustrative embodiment of FIG. 3A, liquid crystal retarder 301B comprises an alignment layer 417BA that provides homeotropic alignment in the adjacent liquid crystal material 414B with an alignment component 419BAp in the plane of the alignment layer 417BA that is inclined at an angle of $\theta_{BA}$ to the horizontal direction.

Liquid crystal retarder 301B further comprises an alignment layer 417BB that provides homeotropic alignment in the adjacent liquid crystal material 414B with an alignment component 419BBp in the plane of the alignment layer 417BB that is inclined at an angle $\theta_{BB}$ that provides anti-parallel alignment of component 419BBp relative to the alignment component 419BAp.

Passive C-plate retarder 330B has an optical axis direction 331B that is out of the plane of the retarder 330B.

Additional polariser 318A has a horizontal polariser transmission direction 319B that is parallel to the direction 318B.

Liquid crystal retarder 301A comprises an alignment layer 417AA that provides homogenous alignment in the adjacent liquid crystal material 414A with an alignment component 419AAp in the plane of the alignment layer 417AA that is inclined at an angle of $\theta_{AA}$ to the horizontal direction (x-axis); and an alignment layer 417AB that provides homogeneous alignment in the adjacent liquid crystal material 414A with an alignment component 419ABp in the plane of the alignment layer 417AB that is inclined at an angle of $\theta_{AA}$ to the horizontal direction such that the component 419ABp is anti-parallel to the component 419AAp.

Passive A-plate retarder 330AB has an optical axis direction at 45° (measured anticlockwise from the horizontal direction) and passive A-plate retarder 330AA has an optical axis direction at 45°. Crossed A-plate retarders 330AA, 330AB provide an asymmetric transmission variation with lateral angle. Advantageously the sequence of the crossed A-plate retarders is provided to maximise off-axis luminance reduction in the direction towards the driver 47 of FIG. 1. The sequence of crossed A-plate retarders 330AA, 330AB may be swapped in displays intended for cars with left hand drive and right hand drive operation to achieve desirable reduced security level.

In other embodiments (not illustrated) the A-plate passive retarders 330AA, 330AB may be rotated clockwise by the angle $90°-\theta_A$ from the respective orientation 331AA, 331AB.

The display polariser comprises the input polariser 210 of the spatial light modulator 48 with electric vector transmission direction 211 that is parallel to the electric vector transmission direction of the additional polarisers 318A, 318B. Advantageously transmission efficiency is increased. The arrangement of FIG. 3A may be provided to enable (i) high efficiency of light input from a partially polarised backlight 20 and (ii) a polarisation output direction from the display that is provided for use with polarised sunglasses.

The spatial light modulator 48 further comprises a display output polariser 218. The output polarisation direction 219 of FIG. 2 and FIG. 3A is arranged to advantageously achieve high transmission for polarised sunglasses worn by display users.

Alternative arrangements of polariser 210, 218, 318A, 318B electric vector transmission directions 211, 219, 319A, 319B will now be described.

Figure 3B:
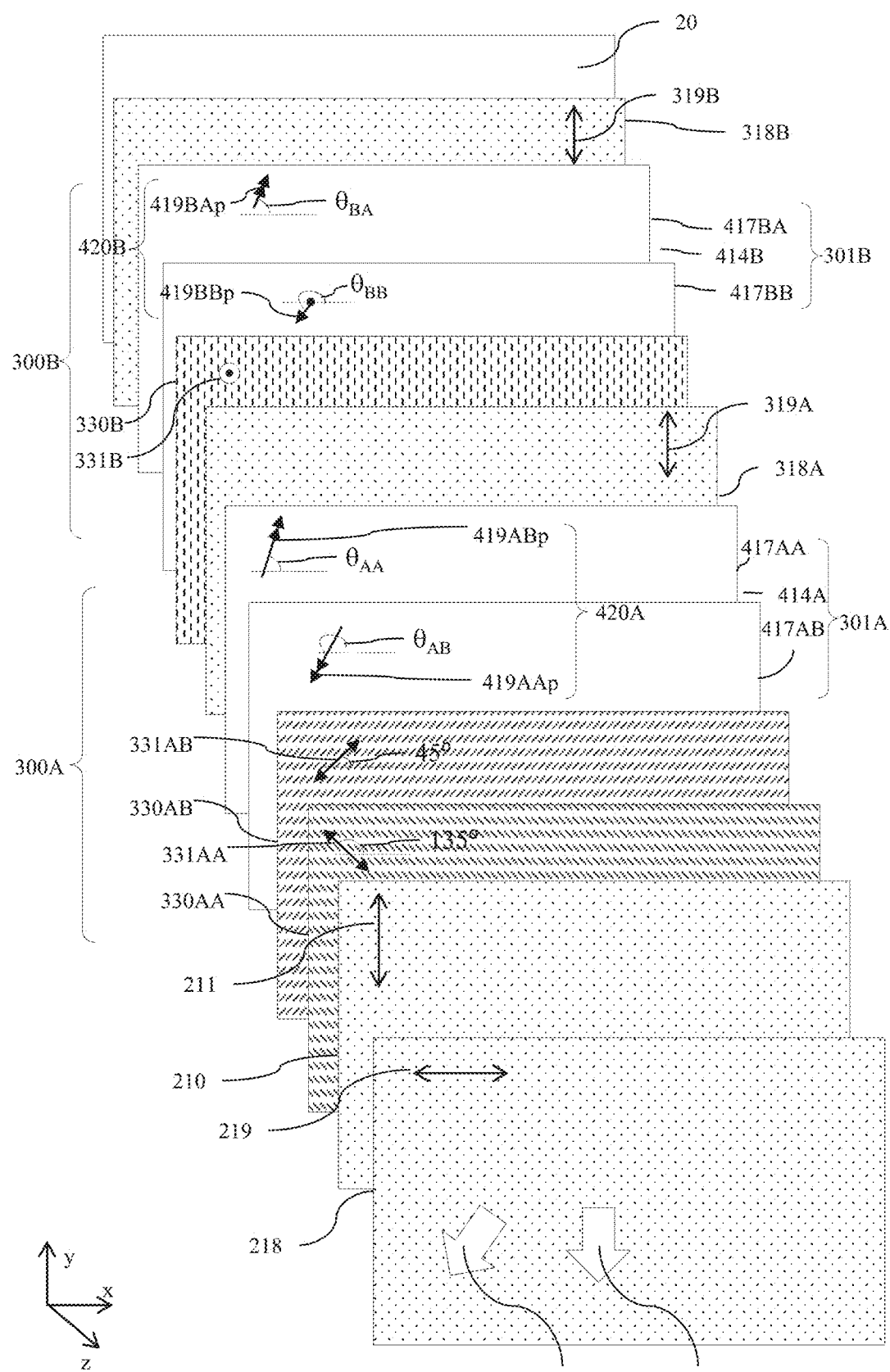
FIG. 3B is a schematic diagram illustrating a front perspective view of alignment orientations for components of the privacy display of FIG. 2 wherein the electric vector transmission direction of the polarisers is rotated by 90 degrees compared to the orientations of FIG. 3A.

FIG. 3B is a schematic diagram illustrating a front perspective view of alignment orientations for components of the privacy display of FIG. 2 wherein the electric vector transmission directions 319B, 319A, 211, 219 of the polarisers 318B, 318B, 210, 218 are rotated by 90 degrees compared to the orientations of FIG. 3A. Features of the embodiment of FIG. 3B not discussed in further detail may be assumed to correspond to the features with equivalent reference numerals as discussed above, including any potential variations in the features.

In the present embodiments the polarisers 318A, 318B may have electric vector transmission axes that are parallel to or orthogonal to the y-axis. Embodiments such as FIG. 3A which describe polarisers with horizontal electric vector transmission direction 319A, 319B; and embodiments such as FIG. 3B which describe polarisers with vertical electric vector transmission direction 319A, 319 identical or similar performance will be achieved. The selection of polariser orientation will be arranged to provide desirable polariser electric vector transmission directions 319A, 319B for the spatial light modulator polariser 210, 218 electric vector transmission directions 211, 219.

Figure 3C:
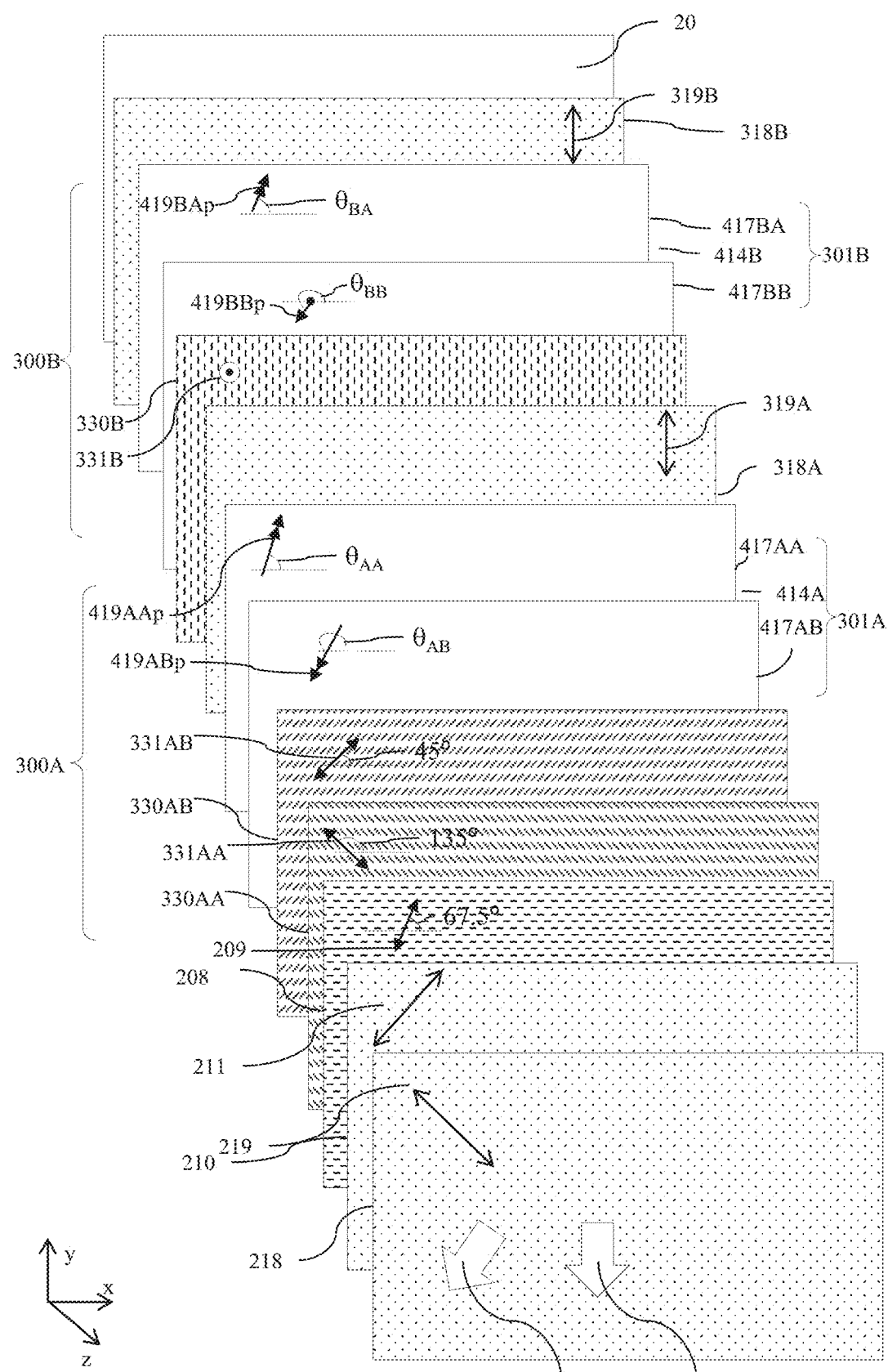
FIG. 3C is a schematic diagram illustrating a front perspective view of alignment orientations for components of the privacy display of FIG. 2 wherein the electric vector transmission direction of the polarisers of the spatial light modulator is rotated by 45 degrees compared to the orientations of FIG. 3B.

FIG. 3C is a schematic diagram illustrating a front perspective view of alignment orientations for components of the privacy display of FIG. 2 wherein the electric vector transmission direction of the polarisers 210, 218 of the spatial light modulator 48 is rotated by 45 degrees compared to the orientations of FIG. 3B. Features of the embodiment of FIG. 3C not discussed in further detail may be assumed to correspond to the features with equivalent reference numerals as discussed above, including any potential variations in the features.

In the illustrative example of FIG. 3C, display polarisers 210, 218 of FIG. 3B at 450 to the horizontal, for example for use with a twisted nematic LCD mode in the spatial light modulator 48. Half waveplate 208 is arranged with an optical axis direction 209 at an angle of 67.5° in series with the display input polariser 210. Half waveplate 208 provides to provide a phase shift such that the polarisation state incident onto the respective polariser 210 from the retarder 330AA is transmitted with maximum efficiency.

In alternative embodiments the electric vector transmission directions of one or more of the polarisers 210, 218, 318A, 318B may be provided at angles other than 0 degrees or 90 degrees wherein a further half waveplate 208 is arranged such that the combination of half waveplate and respective polariser provides maximum transmission through the optical stack of the display device 100.

Figure 3D:
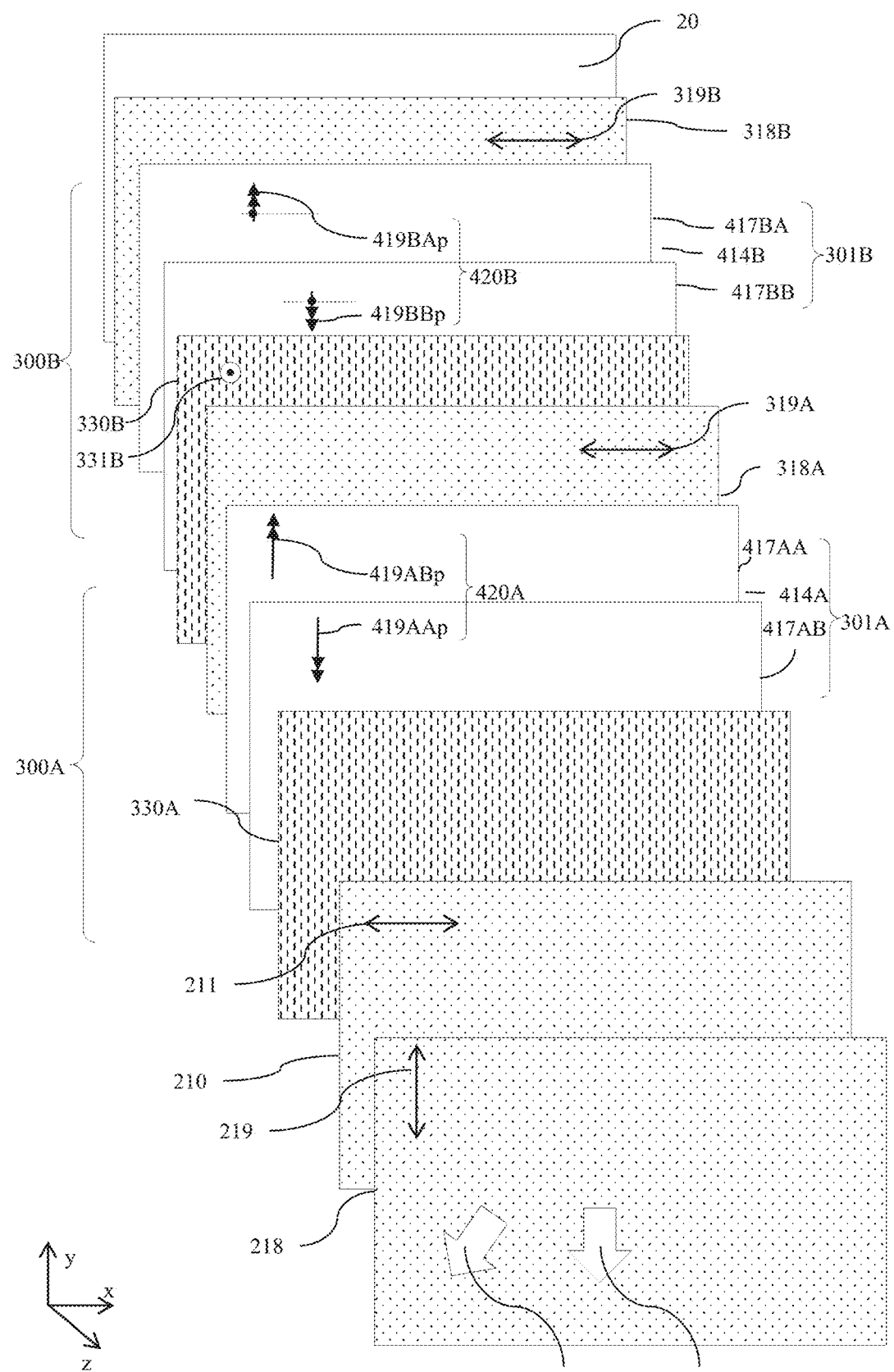
FIG. 3D is a schematic diagram illustrating a front perspective view of alignment orientations for components of the privacy display of FIG. 2 wherein the electric vector transmission direction of the additional polarisers are orthogonal to the first and second pairs 420A of anti-parallel directions of components of pretilt in the plane of the respective alignment layers.

FIG. 3D is a schematic diagram illustrating a front perspective view of alignment orientations for components of the privacy display device 100 of FIG. 2 wherein the electric vector transmission direction 319A of the additional polariser 318A is orthogonal to the first pair 420A of anti-parallel directions of components 419AAp, 419ABp of pretilt 419A in the plane of the respective alignment layer 417AA, 417AB; and the electric vector transmission direction 319B of the additional polariser 318B is orthogonal to the second pair 420B of anti-parallel directions of components 419BAp, 419BBp of pretilt 419B in the plane of the respective alignment layer 417BA, 417BB. Features of the embodiment of FIG. 3D not discussed in further detail may be assumed to correspond to the features with equivalent reference numerals as discussed above, including any potential variations in the features.

The alternative embodiment of FIG. 3D differs from the embodiment of FIG. 3A in that the crossed A-plates compensation retarders 330AA, 330AB of the first polar control retarder 300A are omitted and a C-plate compensation retarder 330A is provided. Advantageously thickness is reduced. In another aspect the pairs 420A, 420B are aligned vertically. Advantageously complexity of manufacture and assembly is reduced in comparison to the rotated pairs 420A, 420B of FIG. 3A. In alternative embodiments (not shown) one of the pairs 420A, 420B may be rotated and the other of the pair may not be rotated with respect to a direction that is parallel or orthogonal to the electric vector transmission direction 319A, 319B of the respective additional polariser 318A, 319B. Advantageously some of the complexity of manufacture and assembly is reduced while security factor S is increased as will be described further hereinbelow.

A control system for the privacy display device 100 of FIG. 2 will now be described.

Figure 4:
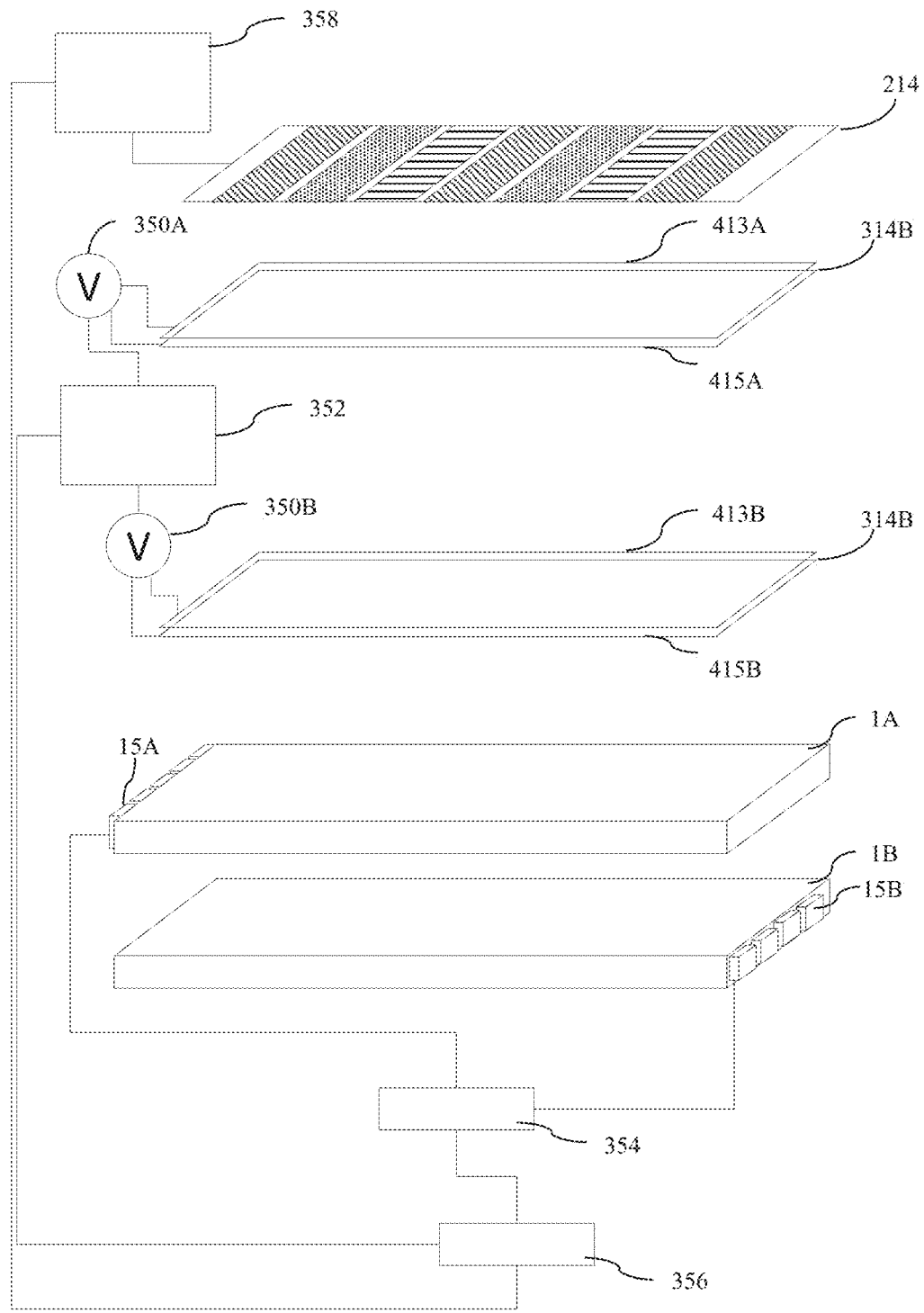
FIG. 4 is a schematic diagram illustrating a front perspective view of a control system for the switchable privacy display of FIG. 2.

FIG. 4 is a schematic diagram illustrating a front perspective view of a control system for the switchable privacy display of FIG. 2. Features of the embodiment of FIG. 4 not discussed in further detail may be assumed to correspond to the features with equivalent reference numerals as discussed above, including any potential variations in the features.

The display device 100 of FIG. 2 further comprises a display controller 356 arranged to independently control the light source 15A, 15B controller 354, the liquid crystal retarder 314A, 314B controller 352 and optionally the spatial light modulator 48 pixel layer 214 display driver 358.

Control of the polar control retarders 300A, 300B is achieved by means of drivers 350A, 350B to change the operating voltage across the liquid crystal layers 314A, 314B. Controller 352 is provided to control the drivers 350A, 350B and controller 354 that further controls the driving of light sources 15, 17. In other words controller 352 is provided to control the drivers 350A, 350B that provide a controlled electric field across retarder 314A, 314B electrodes 413A, 415A and 413B, 415B respectively.

Controller 354 controls the driving of light sources 15A, 15B as described elsewhere herein.

Further sensors (not shown) may be provided and the privacy display control system of FIG. 4 hereinbelow may be arranged to provide appropriate share or privacy operation that is determined by the driver's operating conditions to achieve safe operation of the privacy display device 100.

The display device 100 is arranged to display an image and capable of operating in at least a share mode and a privacy mode, wherein in the privacy mode the privacy function is provided and the visibility of the image to an off-axis viewer is reduced compared to the share mode and the visibility of the image to the primary user in an on-axis position remains visible in both the privacy and share modes. The control system 350, 352, 354 selectively operates the display device 100 in the share mode or the privacy mode for at least one region of the displayed image, typically the entire displayed image. At least part of the electrodes 413A, 415A and 413B, 415B may be patterned so that some electrode pattern regions operate in privacy mode and other parts in share mode. Separate drivers 350 may be provided for each respective electrode patterned region.

Illustrative polar profiles of output from an illustrative backlight 20 of FIG. 2 will now be described with reference to a backlight 20 of the type shown in FIG. 2 and FIG. 13A.

Figure 5A:
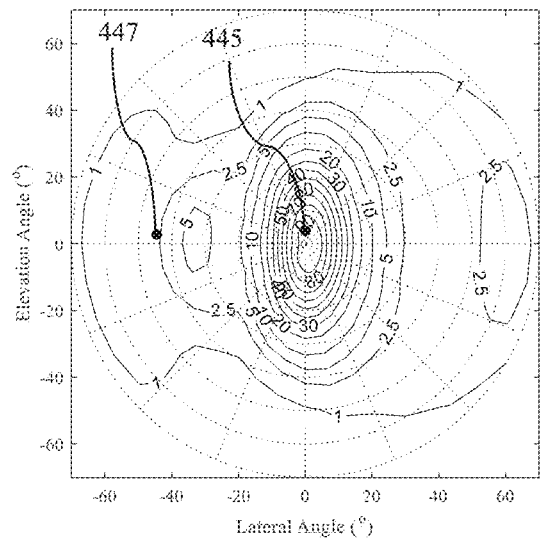
FIG. 5A is a schematic graph illustrating the polar variation of luminance output for an alternative backlight of FIG. 2 primarily operating to direct light to the passenger.

FIG. 5A is a schematic graph illustrating the simulated polar variation of luminance output for an illustrative backlight 20 of FIG. 2 primarily operating to direct light to the passenger 45, that is light source 15A is illuminated and light source 15B is not illuminated.

Figure 6A:
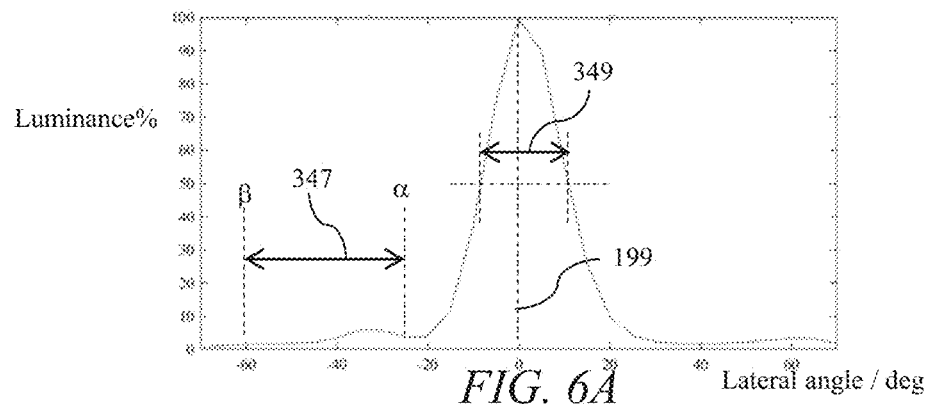
FIG. 6A is a schematic graph illustrating the variation of relative luminance output at zero elevation for the alternative backlight of FIG. 2 primarily operating to direct light to the passenger.

As illustrated in FIG. 5A and FIG. 6A hereinbelow, the backlight 20 in at least a first mode of operation has a first luminance distribution having an output luminance profile having a full width half maximum 349 that is at most 40 degrees, preferably at most 30 degrees and most preferably at most 20 degrees.

Advantageously most light is directed towards the passenger 45 in direction 445 and high suppression of luminance is achieved in the driver 47 in direction 447. High power efficiency for passenger 45 illumination is achieved. However, such an illumination profile is not sufficient to achieve desirable security factor, S as will be described further hereinbelow.

Figure 5B:
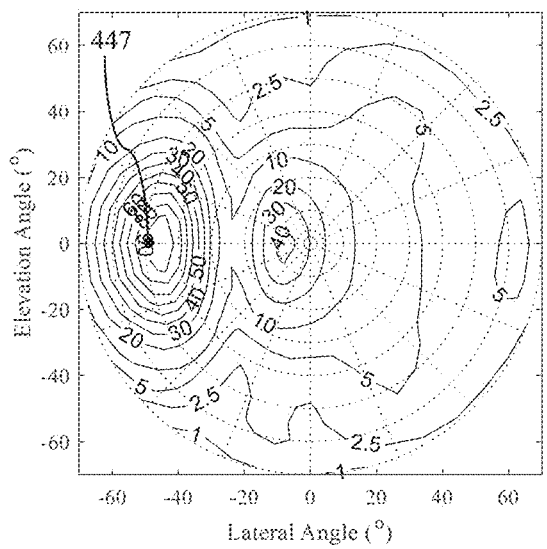
FIG. 5B is a schematic graph illustrating the polar variation of luminance output for an alternative backlight of FIG. 2 primarily operating to direct light to the driver.

FIG. 5B is a schematic graph illustrating the polar variation of luminance output for an illustrative alternative backlight 20 of FIG. 2 primarily operating to direct light to the driver 47, that is light source 15B is illuminated and light source 15A is not illuminated. Advantageously most light is directed towards the driver 47 in direction 447 and low luminance is achieved in the passenger 45 direction. High power efficiency for driver 47 illumination is achieved in a mode of operation in which the light source 15B is illuminated.

Figure 5C:
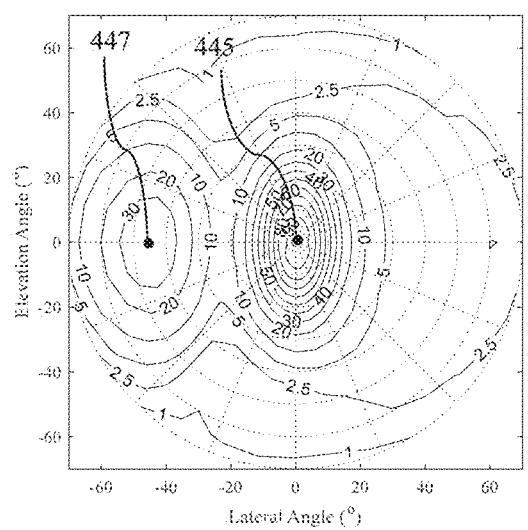
FIG. 5C is a schematic graph illustrating the polar variation of luminance output for an alternative backlight of FIG. 2 operating to direct light to the passenger and to the driver.
Figure 5D:
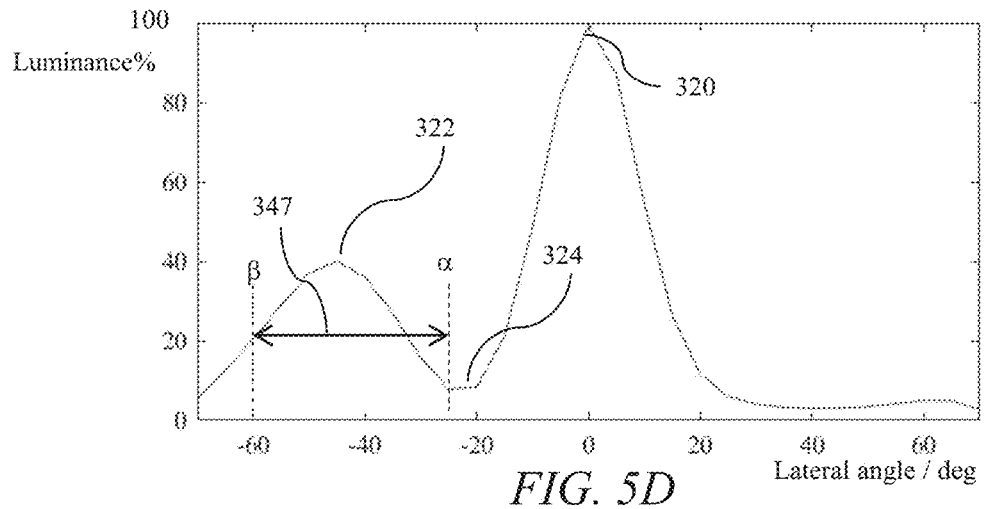
FIG. 5D is a schematic graph illustrating the variation of relative luminance output at zero elevation for the alternative backlight profile of FIG. 5C operating to direct light to the passenger and driver.

FIG. 5C is a schematic graph illustrating the polar variation of luminance output for an illustrative backlight 20 of FIG. 2 operating to direct light to the passenger 45 and to the driver 47, that is both light sources 15A,15B are illuminated; and FIG. 5D is a schematic graph illustrating the variation of relative luminance output at zero elevation for the alternative backlight profile of FIG. 5C operating to direct light to the passenger and driver in a share mode of operation. Such a profile may be provided by a backlight 20 as will be described with reference to FIG. 13A hereinbelow for example.

The backlight 20 in a second mode of operation has a second luminance distribution having an output luminance profile having first and second maxima 320, 322 in luminance at first and second different polar locations 445, 447 with a minimum 324 in luminance therebetween. The luminance of the minimum 324 is desirably at most 25% of the luminance of the first and second maxima.

The profile of FIG. 5D has a first peak 320 directed towards the passenger 45 near to polar location 445. The profile further has a second peak 322 directed towards the driver 47 near to polar location 447. Between peaks 320, 322 a luminance minimum 324 is provided near to polar angle α. In operation in privacy mode, peak 322 is not illuminated. It is desirable to minimise the luminance in region of angle α. Optical structures that are arranged to provide peak 322 will provide undesirable scatter to light from optical structures that provide peak 320.

Advantageously a display device 100 that may be observed by both driver 47 and passenger 45 may be provided.

The embodiment of FIG. 5D and FIG. 13A advantageously achieves low scatter in privacy mode of operation, and reduced luminance near minimum 324. Advantageously security factor in privacy mode is increased.

The polar profile of output from an illustrative display device 100 of TABLE 1 and backlight 20 profile of FIG. 5A operating in privacy mode will now be described along the lateral axis with zero elevation.

Considering TABLE 1 in respect of the second polar control retarder 300B, each of the surface alignment layers 417BA, 417BB is arranged to provide homeotropic alignment in the adjacent liquid crystal material 414B. In respect of the first polar control retarder 300A, both of the surface alignment layers 417AA, 417AB are arranged to provide homogenous alignment in the adjacent liquid crystal material 414A.

In an alternative embodiment as will be described further hereinbelow in respect of the first polar control retarder 300A, both of the surface alignment layers 417AA, 417AB are arranged to provide homeotropic alignment in the adjacent liquid crystal material 414A; and in respect of the second polar control retarder 300B, each of the surface alignment layers 417BA, 417BB is arranged to provide homogeneous alignment in the adjacent liquid crystal material 414B.

In other words, in respect of one of the at least one first polar control retarder 300A and the at least one second polar control retarder 300B, both of the surface alignment layers 417AA, 417AB or 417BA, 417BB respectively are arranged to provide homogenous alignment in the adjacent liquid crystal material. In respect of the other of the at least one first polar control retarder 300A and the at least one second polar control retarder 300B, both of the surface alignment layers 417AA, 417AB or 417BA, 417BB respectively are arranged to provide homeotropic alignment in the adjacent liquid crystal material.

The switchable liquid crystal retarder 301A, 301B of said one of the at least one first polar control retarder 300A and the at least one second polar control retarder 300B has a retardance for light of a wavelength of 550 nm having a first retardance value and the switchable liquid crystal retarder 301A, 301B of said other of the at least one first polar control retarder 300A and the at least one second polar control retarder 300B has a retardance for light of a wavelength of 550 nm has a second retardance value, the first retardance value and the second retardance value being different, the magnitude of the difference between the first retardance value and the second retardance value being at least 10% of the average of the first retardance value and the second retardance value.

TABLE 1

| Item | Layer | Alignment type | Pretilt | In-plane alignment 419 direction | LC layer 314 retardance {narrow range} (wide range) | Additional passive retarder 330 type | Additional passive retarder 330 retardance {narrow range} (wide range) |
|---|---|---|---|---|---|---|---|
| 300B | 417BB | Homeotropic | 88° | θ 270°<br>$\phi_B$ 0° | 750 nm<br>{500 nm~850 nm}<br>(350 nm~900 nm) | | |
| | 417BA | Homeotropic | 88° | θ 90°<br>$\phi_B$ 0° | | | |
| | 330B | | | | | Negative C-plate | −660 nm<br>{−400 nm~−800 nm}<br>(−250 nm~−850 nm) |
| 300A | 417AB | Homogeneous | 2° | θ 90°<br>$\phi_A$ 0° | 1000 nm<br>{700 nm~1500 nm}<br>(500 nm~2000 nm) | | |
| | 417AA | Homogeneous | 2° | θ 270°<br>$\phi_A$ 0° | | | |
| | 330AA | | | | | Positive A-plate @ 135° | +800 nm<br>{+500 nm~+1200 nm}<br>(+300 nm~+1500 nm) |
| | 330AB | | | | | Positive A-plate @ 45° | +800 nm<br>{+500 nm~+1200 nm}<br>(+300 nm~+1500 nm) |

In alternative embodiments, the magnitude of the difference between the first retardance value and the second retardance value is at least 25% of the average of the first retardance value and the second retardance value. Said other of the at least one first polar control retarder 300A and the at least one second polar control retarder 300B is between the backlight 20 and the transmissive spatial light modulator 48. Said one of the at least one first polar control retarder 300A and the at least one second polar control retarder 300B is on the output side of said other of the at least one first polar control retarder 300A and the at least one second polar control retarder 300B.

The properties of the first and second polar control retarders 300A, 300B of TABLE 1 will now be described further. The first retardance value for the layer 314A of liquid crystal material 414A is greater than the second retardance value for the layer 314B of liquid crystal material 414B wherein the first retardance value is in a range from 500 nm to 2000 nm, preferably in a range from 700 nm to 1500 nm, and the second retardance value is in a range from 350 nm to 900 nm, preferably in a range from 500 nm to 850 nm.

The first polar control retarder 300A further comprises a pair of passive uniaxial retarders 330A, 330B having optical axes 331A, 331B in the plane of the retarders 330A, 330B respectively that are crossed wherein each passive retarder 330AA, 330AB has a retardance for light of a wavelength of 550 nm in a range from 300 nm to 1500 nm, preferably in a range from 500 nm to 1200 nm.

The second polar control retarder 300B comprises a passive uniaxial retarder 330B having its optical axis 331B perpendicular to the plane of the retarder 330B and has a retardance for light of a wavelength of 550 nm in a range from −250 nm to −850 nm, preferably in a range from −400 nm to −800 nm.

The in plane alignment directions will now be considered. Said surface alignment layers 417AA, 417AB of the at least one first polar control retarder 300A has pretilts 419AA, 419AB having pretilt directions with components 419AAp, 419ABp in the plane of the layer 314A of liquid crystal material 414A in a first pair 420A of anti-parallel directions as described elsewhere herein and provided by angle $\theta_{AA}$ for 419AAp of 270° and angle $\theta_{AB}$ for 419ABp of 90°.

Considering FIG. 3A, polariser 318A has a horizontal electric vector transmission direction 319A with orientation along the axis at 0° and 180°. The first pair 420A of anti-parallel directions is orthogonal to the electric vector transmission direction 319A of the first additional polariser 318A.

Considering FIG. 3B, polariser 318A has a vertical electric vector transmission direction 319A with orientation along the axis at 90° and 270°. The first pair 420A of anti-parallel directions is parallel to the electric vector transmission direction 319A of the first additional polariser 318A.

Said surface alignment layers 417BA, 417BB of the at least one second polar control retarder 300B has pretilts 419BA, 419BB having pretilt directions with components 419BAp, 419BBp in the plane of the layer 314B of liquid crystal material 414B in a second pair 420B of anti-parallel directions as described elsewhere herein and provided by angle $\theta_{BA}$ for 419BAp and angle $\theta_{BB}$ for 419BBp. The second pair 420B of anti-parallel directions is parallel or orthogonal to the electric vector transmission direction 319B of the second additional polariser 318B.

FIG. 6A is a schematic graph illustrating the variation of relative luminance output at zero elevation for an illustrative backlight 20 of FIG. 2 primarily operating to direct light to the passenger 45. Desirable region 347 for driver 47 locations are illustrated, within which range image security factor S may be provided to achieve acceptably low driver 47 distraction.

Figure 6B:
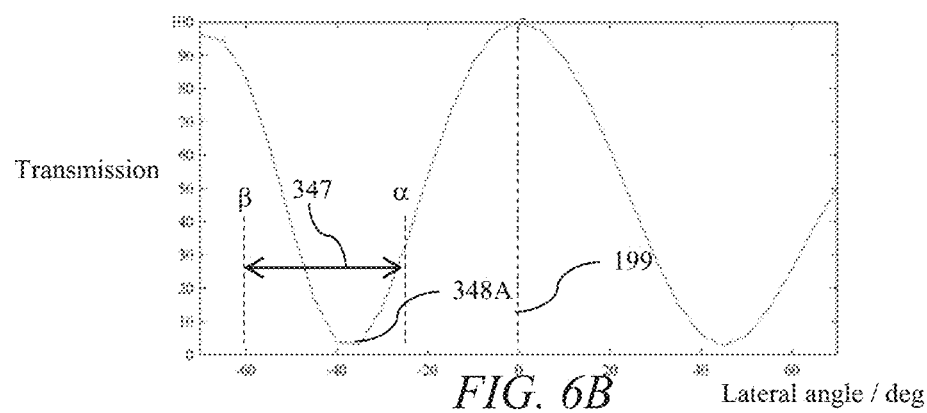
FIG. 6B is a schematic graph illustrating the variation of relative transmission at 0° elevation for the polar control retarder 300A of FIG. 2 operating in privacy mode.

FIG. 6B is a schematic graph illustrating the variation of relative transmission at zero elevation for the polar control retarder 300A arranged between parallel polarisers 318A, 210 of FIG. 2 operating in privacy mode for the illustrative embodiment of TABLE 1. Such profile has high extinction at transmission minimum 348A around −40° however the extinction of the polar control retarder 300A at higher and lower angles is less than that which would be desirable to achieve high image security factor S over region 347 as will be described further below.

Figure 6C:
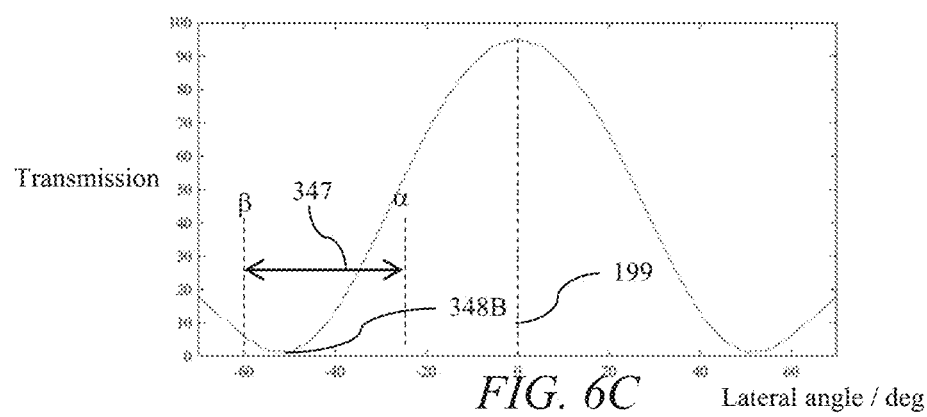
FIG. 6C is a schematic graph illustrating the variation of relative transmission at 0° elevation for the polar control retarder 300B of FIG. 2 operating in privacy mode.

FIG. 6C is a schematic graph illustrating the variation of relative transmission at zero elevation for the polar control retarder 300B arranged between parallel polarisers 318B, 3318A of FIG. 2 operating in privacy mode for the illustrative embodiment of TABLE 1. The profile achieves high luminance extinction at transmission minimum 348B around −50°, however high transmission closer to the optical axis 199.

The retardance of the LC layer 314A of polar control retarder 300A is higher than the retardance of LC layer 314B of polar control retarder 300B to achieve the different polar location of transmission minima. The profile achieves high luminance extinction at higher viewing angles, however high transmission closer to the optical axis.

Thus, the multiplicative effect of the contributions from each of the components described in FIGS. 6A-C achieves the necessary suppression level to prevent the driver 47 being distracted.

Figure 6D:
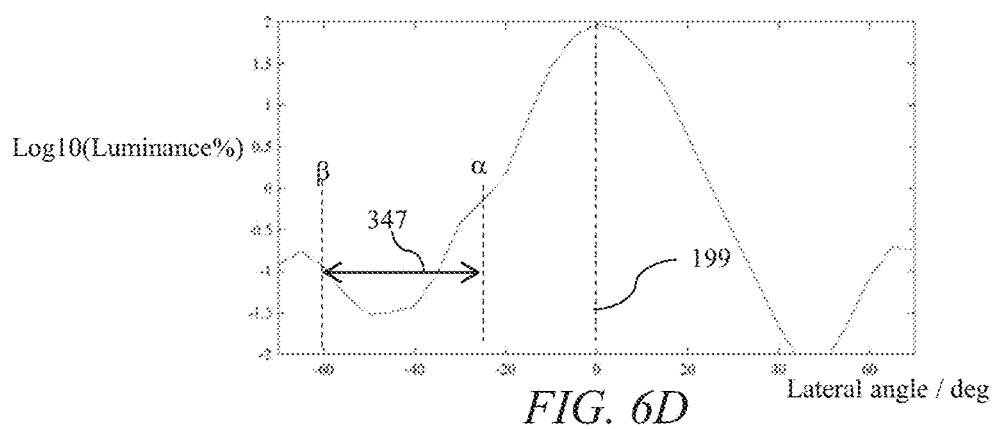
FIG. 6D is a schematic graph illustrating the variation of logarithm to the base 10 of relative luminance output at 0° elevation for the alternative backlight of FIG. 2 primarily operating to direct light to the passenger and operating in privacy mode.

FIG. 6D is a schematic graph illustrating the variation of logarithm to the base 10 of relative luminance output at zero elevation for the display device 100 of FIG. 2 for the illustrative embodiment of TABLE 1. The display device 100 is arranged to direct light to the passenger and operating in privacy mode, with the backlight 20 profile of FIG. 6A having the additional transmission profiles of FIGS. 2B-15C provided by retarders 300A, 300B and polarisers 318A, 318B respectively. Such profile illustrates that ratio of luminance to peak luminance of less than 1% may be achieved over the entire driver region 347. Thus the different polar locations of the transmission minima for the first and second polar retarders 300A, 300B achieves significantly increased size of region 347 for which desirably high security factor is achieved when used in combination with achievable backlight 20 luminance profiles.

Polar profiles for the polar control retarders 300A, 300B of TABLE 1 will now be described.

Figure 7A:
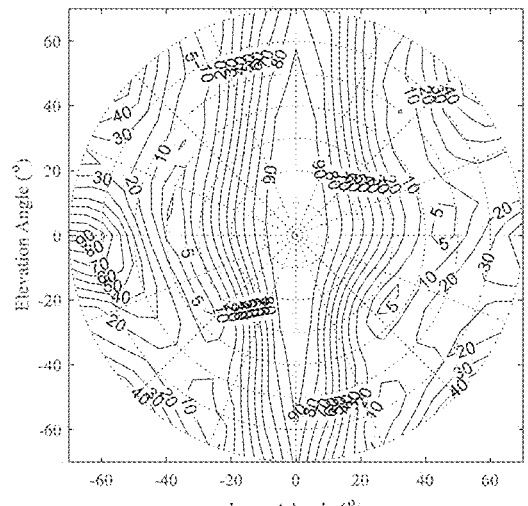
FIG. 7A is a schematic graph illustrating the polar variation of transmission for a first polar control retarder with non-rotated alignment layers.
Figure 7B:
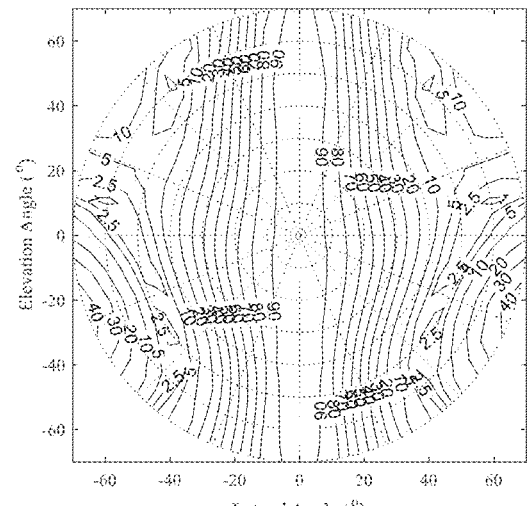
FIG. 7B is a schematic graph illustrating the polar variation of transmission for a second polar control retarder with non-rotated alignment layers.

FIG. 7A is a schematic graph illustrating the polar variation of transmission for a first polar control retarder 300A with (referring to FIG. 2) alignment layers 417AA, 417AB that are arranged to provide alignment directions 419AAp, 419ABp at an angle $\theta_A$ respectively of 90° or 270° to the horizontal direction (x-axis); and FIG. 7B is a schematic graph illustrating the polar variation of transmission for a second polar control retarder 300B with (referring to FIG. 2) alignment layers 417BA, 417BB that are arranged to provide alignment directions 419BAp, 419BBp at an angle $\theta_B$ respectively of 90° or 270° to the horizontal direction (x-axis).

Figure 7C:
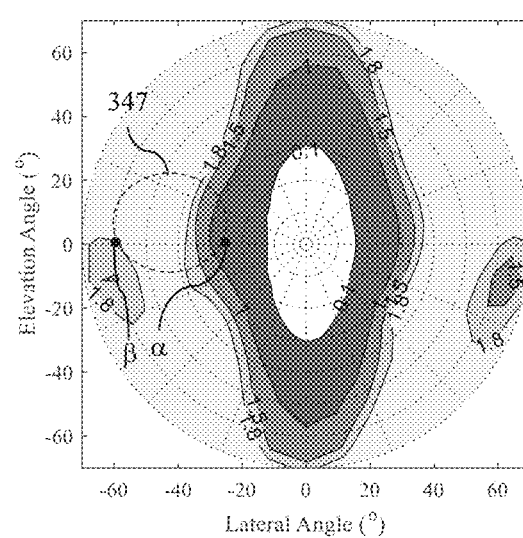
FIG. 7C is a schematic graph illustrating the polar variation of security factor, S for the illustrative embodiment of TABLE 1 in a privacy mode of operation for the display device of FIG. 2 with luminance profile of FIG. 5A and transmission profile of FIGS. 7A-B with a display head-on luminance, of value $Y_{max}$ measured in nits that is half of the illuminance of value I measured in lux.

FIG. 7C is a schematic graph illustrating the polar variation of security factor, S in a privacy mode of operation for the display device of FIG. 2 with backlight 20 luminance FIG. 5A and polar control retarder 300A, 300B transmission profiles of FIGS. 7A-B with a display head-on luminance, of value $Y_{max}$ measured in nits that is half of the illuminance of value I measured in lux. An illustrative driver headbox region 347 is shown.

In most of the headbox (driver viewing) region 347, a desirably high security factor S is provided and low driver distraction is advantageously achieved. However in part of headbox region 347, particularly where the driver 47 leans towards the display device 100 and is close to the angle α of FIG. 1 then the security factor falls below 1.0 and the display data may start to be visible or distracting.

In an alternative illustrative embodiment the first and second polar control retarders 300A, 300B are provided as described in TABLE 2. In comparison to TABLE 1 the polar control retarder 300A with homogeneous alignment layers 417AA, 417AB comprises a C-plate 330A rather than crossed A-plates 330AA, 330AB.

of 550 nm in a range from −300 nm to −1700 nm, preferably in a range from −500 nm to −1200 nm.

Figure 7D:
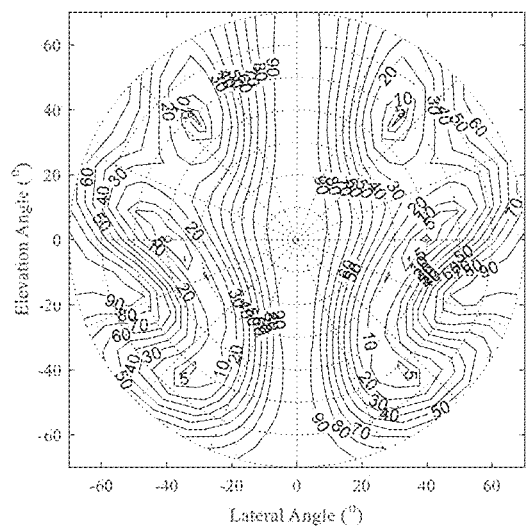
FIG. 7D is a schematic graph illustrating the polar variation of transmission for the first polar control retarder of TABLE 2 in a privacy mode of operation.
Figure 7E:
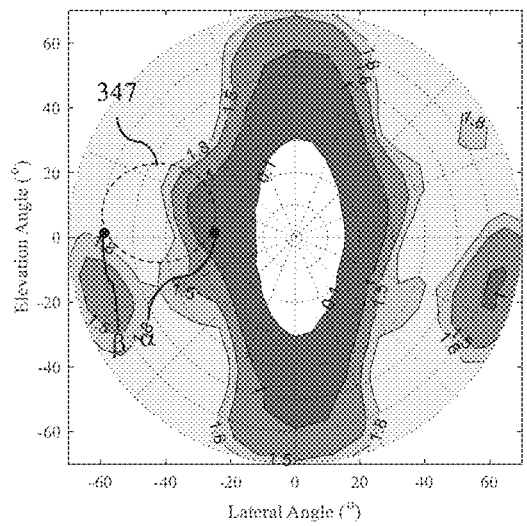
FIG. 7E is a schematic graph illustrating the polar variation of security factor, S for the illustrative embodiment of TABLE 2 in a privacy mode of operation for the display device of FIG. 2 and profiles of FIG. 5A, FIG. 7B and FIG. 7D with a display head-on luminance, of value $Y_{max}$ measured in nits that is half of the illuminance of value I measured in lux.

FIG. 7D is a schematic graph illustrating the polar variation of transmission for the first polar control retarder 300A of TABLE 2 in a privacy mode of operation; and FIG. 7E is a schematic graph illustrating the polar variation of security factor, S in a privacy mode of operation for a display device 100 of FIG. 2 (with C-plate 330A in place of crossed A-plates 330AA, 330AB) and profiles of FIG. 5A, FIG. 7B and FIG. 7D with a display head-on luminance, of value $Y_{max}$ measured in nits that is half of the illuminance of value I measured in lux.

The thickness of the optical stack is advantageously reduced. As will be described further hereinbelow, in comparison to the illustrative embodiment of TABLE 1, the colour of the image provided to the driver in share mode

TABLE 2

| Item | Layer | Alignment type | Pretilt | In-plane alignment 419 direction | LC layer 314 retardance | Additional passive retarder 330 type | Additional passive retarder 330 retardance |
|---|---|---|---|---|---|---|---|
| 300B | 417BB | Homeotropic | 88° | θ 270°<br>$\phi_B$ 0° | 750 nm<br>{500 nm~850 nm} | | |
| | 417BA | Homeotropic | 88° | θ 90°<br>$\phi_B$ 0° | (350 nm~900 nm) | | |
| | 330B | | | | | Negative C-plate | −660 nm<br>{−400 nm~−800 nm}<br>(−250 nm~−850 nm) |
| 300A | 417AB | Homogeneous | 2° | θ 90°<br>$\phi_A$ 0° | 1000 nm<br>{700 nm~1500 nm} | | |
| | 417AA | Homogeneous | 2° | θ 270°<br>$\phi_A$ 0° | (500 nm~2000 nm) | | |
| | 330A | | | | | Negative C-plate | −800 nm<br>{−500 nm~−1200 nm}<br>(−300 nm~−1700 nm) |

The properties of the first and second polar control retarders 300A, 300B of TABLE 2 will now be described further. The retardance properties of the first and second liquid crystal retarders 301A, 301B and of the second passive retarder 330B of TABLE 2 is the same as for TABLE 1. The passive retarder 330A comprises a passive uniaxial retarder with its optical axis perpendicular to the plane of the retarder 330A and has a retardance for light of a wavelength may advantageously have less colour difference across the polar region than is achieved by the A-plate retarders 330AA, 330AB of TABLE 3.

It may be desirable to further increase the security factor S in the region 347 close to the angle α. In an alternative embodiment the first and second polar control retarders 300A, 300B are provided as described in TABLE 3.

TABLE 3

| Item | Layer | Alignment type | Pretilt | In-plane alignment 419 direction {range(°)} | LC layer 314 retardance | Additional passive retarder 330 type | Additional passive retarder 330 retardance |
|---|---|---|---|---|---|---|---|
| 300B | 417BB | Homeotropic | 88° | θ 265°<br>{250°~270°}<br>$\phi_B$ 5° {0°-20°} | 750 nm<br>{500 nm~850 nm}<br>(350 nm~900 nm) | | |
| | 417BA | Homeotropic | 88° | θ 85°<br>{70°~90°}<br>$\phi_B$ 5° {0°-20°} | | | |
| | 330B | | | | | Negative C-plate | −660 nm<br>{−400 nm~−800 nm}<br>(−250 nm~−850 nm) |
| 300A | 417AB | Homogeneous | 2° | θ 85°<br>{70°~90°}<br>$\phi_A$ 5° {0°-20°} | 1000 nm<br>{700 nm~1500 nm}<br>(500 nm~2000 nm) | | |
| | 417AA | Homogeneous | 2° | θ 265°<br>{250°-270°}<br>$\phi_A$ 5° {0°-20°} | | | |
| | 330AA | | | | | Positive A-plate @ 45° | +800 nm<br>{+500 nm~+1200 nm}<br>(+300 nm~+1500 nm) |

TABLE 3-continued

| Item | Layer | Alignment type | Pretilt | In-plane alignment 419 direction {range(°)} | LC layer 314 retardance | Additional passive retarder 330 type | Additional passive retarder 330 retardance |
|---|---|---|---|---|---|---|---|
| | 330AB | | | | | Positive A-plate @ 135° | +800 nm {+500 nm~+1200 nm} (+300 nm~+1500 nm) |

The retardance of each of the polar control retarders 300A, 300B is the same as provided in TABLE 1. The in plane alignment directions of TABLE 3 will now be considered.

Said surface alignment layers 417AA, 417AB of the at least one first polar control retarder 300A has pretilts 419AA, 419AB having pretilt directions with components 419AAp, 419ABp in the plane of the layer 314A of liquid crystal material 414A in a first pair 420A of anti-parallel directions as described elsewhere herein and provided by angle $\theta_{AA}$ for 419AAp and angle $\theta_{AB}$ for 419ABp. The first pair 420A of anti-parallel directions is angularly offset by angle $\phi_A$ from being parallel or orthogonal to the electric vector transmission direction 319A of said first additional polariser 318A by an amount having a magnitude of at most 20°.

Said surface alignment layers 417BA, 417BB of the at least second polar control retarder 300B has pretilts 419BA, 419BB having pretilt directions with components 419BAp, 419BBp in the plane of the layer 314B of liquid crystal material 414B in a second pair 420B of anti-parallel directions as described elsewhere herein and provided by angle $\theta_{BA}$ for 419BAp and angle $\theta_{BB}$ for 419BBp. The second pair 420B of anti-parallel directions is angularly offset by angle $\phi_B$ from being parallel or orthogonal to the electric vector transmission direction 319B of said second additional polariser 318B by an amount having a magnitude of at most 20°.

FIG. 8A is a schematic graph illustrating the polar variation of transmission for a first polar control retarder 300A with rotated alignment layers 417AA, 417AB; and FIG. 8B is a schematic graph illustrating the polar variation of transmission for a second polar control retarder 300B with rotated alignment layers 417BA, 417BB.

In comparison to TABLE 1, TABLE 3, alignment layers 417AA, 417AB, 417BA, 417BB are arranged to provide alignment directions 419AAp, 419ABp at angles $\theta_A$, $\theta_B$ respectively of 85° or 265° to the horizontal and are thus rotated in the plane of the respective alignment layers 417.

FIG. 8C is a schematic graph illustrating the polar variation of security factor, S in a privacy mode of operation for the display device of FIG. 2, backlight 20 luminance profile of FIG. 5A and polar control retarder 300A, 300B transmission profiles of FIGS. 8A-B with a display head-on luminance, of value $Y_{max}$, measured in nits that is half of the illuminance of value I measured in lux.

FIG. 8C illustrates that within the polar location of region 347 higher security factor S than in FIG. 7C are achieved, particularly in the region near the angle α. Advantageously the security factor S is increased to a level at which the image is invisible to the driver when attempting to look at the display. Such an arrangement achieves desirable increase in the safety for driver 47 changes of position from the nominal seating position.

Illustrative performance in share mode will now be described.

Figure 9A:
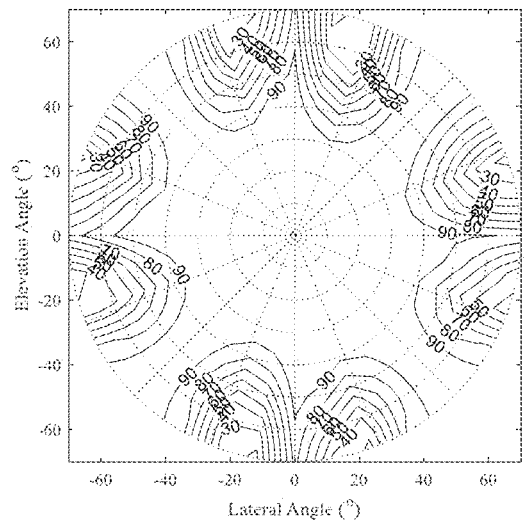
FIG. 9A is a schematic graph illustrating the polar variation of transmission for the first polar control retarder in a share mode of operation.
Figure 9B:
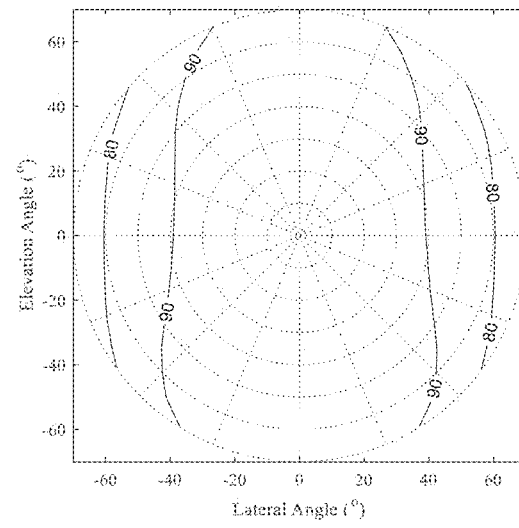
FIG. 9B is a schematic graph illustrating the polar variation of transmission for the second polar control retarder in a share mode of operation.

FIG. 9A is a schematic graph illustrating the polar variation of transmission for the first polar control retarder 300A of TABLE 1 in a share mode of operation; FIG. 9B is a schematic graph illustrating the polar variation of transmission for the second polar control retarder 300B of TABLE 1 in a share mode of operation. In comparison to the profiles of FIG. 7A, FIG. 7B, FIG. 8A, and FIG. 8B the size of the polar regions for high transmission are substantially increased.

Figure 9C:
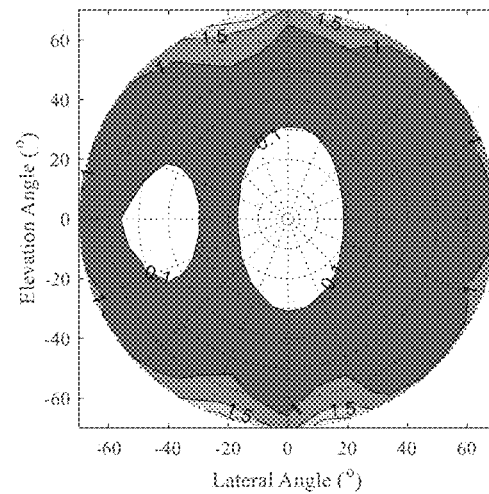
FIG. 9C is a schematic graph illustrating the polar variation of security factor, S in a share mode of operation for the display device of FIG. 2, backlight luminance profile of FIG. 5C and polar control retarder transmission profiles of FIGS. 9A-B with a display head-on luminance, of value $Y_{max}$ measured in nits that is half of the illuminance of value I measured in lux.

FIG. 9C is a schematic graph illustrating the polar variation of security factor, S in a share mode of operation for the display device of FIG. 2 and profiles of FIG. 5C, FIGS. 9A-B with a display head-on luminance, of value $Y_{max}$ measured in nits that is half of the illuminance of value I measured in lux. Advantageously regions of high image visibility (low security factor, S) are provided in region 347 around nominal driver 47 location as well as the nominal passenger 45 location near the optical axis 199.

It would be desirable to provide a share mode of operation with reduced colour variations and reduced power consumption. In an alternative illustrative embodiment the first and second polar control retarders 300A, 300B are provided as described in TABLE 4. In comparison to TABLE 3 the A-plate retarders 330AA, 330AB are replaced by a C-plate retarder 330A.

TABLE 4

| Item | Layer | Alignment type | Pretilt | In-plane alignment 419 direction {range(°)} | LC layer 314 retardance | Additional passive retarder 330 type | Additional passive retarder 330 retardance |
|---|---|---|---|---|---|---|---|
| 300B | 417BB | Homeotropic | 88° | θ 270° {250°~270°} $\phi_B$ 0° {0°-20°} | 1500 nm {1000 nm~2000 nm} (650 nm~2800 nm) | | |
| | 417BA | Homeotropic | 88° | θ 90° {70°~90°} $\phi_B$ 0° {0°-20°} | | | |
| | 330B | | | | | Negative C-plate | −1400 nm {−700 nm~−1700 nm} (−400 nm~−2400 nm) |

TABLE 4-continued

| Item | Layer | Alignment type | Pretilt | In-plane alignment 419 direction {range(°)} | LC layer 314 retardance | Additional passive retarder 330 type | Additional passive retarder 330 retardance |
|---|---|---|---|---|---|---|---|
| 300A | 417AB | Homogeneous | 2° | θ 90° {70°~90°} $\phi_A$ 0° {0°-20°} | 750 nm {500 nm~900 nm} (350 nm~1000 nm) | | |
| | 417AA | Homogeneous | 2° | θ 270° {250°-270°} $\phi_A$ 0° {0°-20°} | | | |
| | 330A | | | | | Negative C-plate | −440 nm {−300 nm~−700 nm} (−250 nm~−800 nm) |

The properties of the first and second polar control retarders 300A, 300B of TABLE 4 will now be described further. The first retardance value for the layer 314A of liquid crystal material 414A is less than the second retardance value for the layer 314B of liquid crystal material 414B wherein the first retardance value is in a range from 350 nm to 1000 nm, preferably in a range from 500 nm to 900 nm, and the second retardance value is in a range from 650 nm to 2800 nm, preferably in a range from 1000 nm to 2000 nm. The passive retarder 330A has its optical axis perpendicular to the plane of the retarder 330A and has a retardance for light of a wavelength of 550 nm in a range from −250 nm to −800 nm, preferably in a range from −300 nm to −700 nm. The second polar control retarder 300B comprises a passive uniaxial retarder 330B having its optical axis perpendicular to the plane of the retarder and has a retardance for light of a wavelength of 550 nm in a range from −400 nm to −2400 nm, preferably in a range from −700 nm to −1700 nm.

FIG. 10A is a schematic graph illustrating the polar variation of transmission for the first polar control retarder 300A of TABLE 4 in a privacy mode of operation; FIG. 10B is a schematic graph illustrating the polar variation of transmission for the second polar control retarder 300B of TABLE 4 in a privacy mode of operation. In comparison to TABLE 3, for the embodiment of TABLE 4 the first polar control retarder 300A comprises a C-plate 330A compared to crossed A-plates 330AA, 330AB. Further the retardance of the LC layer 314A of polar control retarder 300A is lower than the retardance of LC layer 314B of polar control retarder 300B. By way of comparison, for TABLE 3 the retardance of the LC layer 314A of polar control retarder 300A is higher than the retardance of LC layer 314B of polar control retarder 300B.

FIG. 10C is a schematic graph illustrating the polar variation of security factor, S in a privacy mode of operation for the display device of FIG. 2 and profiles of FIG. 5A and FIGS. 10A-B with a display head-on luminance, of value $Y_{max}$ measured in nits that is half of the illuminance of value I measured in lux. The locations of transmission minima are different for the two polar control retarders 300A, 300B to advantageously achieve luminance reduction at small polar angles α as well as large polar angles β.

FIG. 10D is a schematic graph illustrating the polar variation of transmission for the first polar control retarder of TABLE 4 in a share mode of operation; and FIG. 10E is a schematic graph illustrating the polar variation of transmission for the second polar control retarder of TABLE 4 in a share mode of operation. Considering FIGS. 10D-E in comparison to FIGS. 9A-B, the polar region for high transmission is increased in share mode. Advantageously the variation of colour across the polar region is reduced. The variation of output colour with polar angle is reduced and the visual appearance in share mode is advantageously improved for various viewing positions in the automotive vehicle 650 cabin. Further the drive voltage for the first polar control retarder 300A for share mode is zero volts and the power consumption in share mode is improved. Increased transmission may be achieved at higher polar angles.

In an alternative illustrative embodiment the first and second polar control retarders 300A, 300B are provided as described in TABLE 5. In comparison to TABLE 1 the polar control retarder 300A with homogeneous alignment layers 417AA, 417AB has a lower retardance than the polar control retarder 300B with homeotropic alignment layers 417BA, 417BB.

TABLE 5

| Item | Layer | Alignment type | Pretilt | In-plane alignment 419 direction {range(°)} | LC layer 314 retardance {narrow range} (wide range) | Additional passive retarder 330 type | Additional passive retarder 330 retardance {narrow range} (wide range) |
|---|---|---|---|---|---|---|---|
| 300B | 417BB | Homeotropic | 88° | θ 270° {250°~270°} $\phi_B$ 0° {0°-20°} | 1250 nm {1000 nm~2000 nm} (650 nm~2800 nm) | | |
| | 417BA | Homeotropic | 88° | θ 90° {70°~90°} $\phi_B$ 0° {0°-20°} | | | |
| | 330B | | | | | Negative C-plate | −1050 nm {−700 nm~−1700 nm} (−400 nm ~−2400 nm) |

TABLE 5-continued

| Item | Layer | Alignment type | Pretilt | In-plane alignment 419 direction {range(°)} | LC layer 314 retardance {narrow range} (wide range) | Additional passive retarder 330 type | Additional passive retarder 330 retardance {narrow range} (wide range) |
|---|---|---|---|---|---|---|---|
| 300A | 417AB | Homogeneous | 2° | θ 90° {70°~90°} $\phi_A$ 0° {0°-20°} | 700 nm {500 nm~900 nm} (350 nm~1000 nm) | | |
| | 417AA | Homogeneous | 2° | θ 270° {250°~270°} $\phi_A$ 0° {0°-20°} | | | |
| | 330AA | | | | | Positive A-plate @ 135° | +600 nm {+400 nm~+800 nm} (+300 nm~+900 nm) |
| | 330AB | | | | | Positive A-plate @ 45° | +600 nm {+400 nm~+800 nm} (+300 nm~+900 nm) |

The properties of the first and second polar control retarders 300A, 300B of TABLE 5 will now be described further. The first retardance value for the layer 314A of liquid crystal material 414A is less than the second retardance value for the layer 314B of liquid crystal material 414B wherein the first retardance value is in a range from 350 nm to 1000 nm, preferably in a range from 500 nm to 900 nm, and the second retardance value is in a range from 650 nm to 2800 nm, preferably in a range from 1000 nm to 2000 nm.

The second polar control retarder 300B comprises a passive uniaxial retarder 330B having its optical axis perpendicular to the plane of the retarder and has a retardance for light of a wavelength of 550 nm in a range from −400 nm to −2400 nm, preferably in a range from −700 nm to −1700 nm.

The at least one passive compensation retarder of the first polar control retarder 300A comprises a pair of passive retarders 330A, 330B having optical axes 331A, 331B in the plane of the retarders 330A, 330B that are crossed and each have a retardance for light of a wavelength of 550 nm in a range from 300 nm to 900 nm, preferably in a range from 400 nm to 800 nm.

Figure 10H:
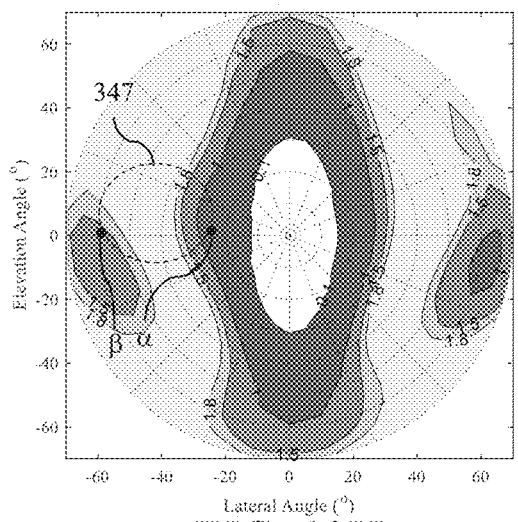
FIG. 10H is a schematic graph illustrating the polar variation of security factor, S in a privacy mode of operation for a display device of FIG. 2 and profiles of FIG. 5A, FIG.

FIG. 10F is a schematic graph illustrating the polar variation of transmission for the first polar control retarder 300A of TABLE 5 in a privacy mode of operation; FIG. 10G is a schematic graph illustrating the polar variation of transmission for the second polar control retarder 300B of TABLE 5 in a privacy mode of operation; and FIG. 10H is a schematic graph illustrating the polar variation of security factor, S in a privacy mode of operation for a display device 100 of FIG. 2 and profiles of FIG. 5A, FIG. 10F and FIG. 10G with a display head-on luminance, of value $Y_{max}$ measured in nits that is half of the illuminance of value I measured in lux. In comparison with the arrangement of FIG. 7C, some improvement in security factor near the angle α is advantageously provided.

Arrangements of liquid crystal alignment for use in the retarders 300A, 300B of the embodiments described elsewhere herein will now be described in further detail.

FIG. 11A is a schematic diagram illustrating in side perspective view a structure of a polar control retarder 300 wherein the polar control retarder 300 comprises a passive C-plate retarder 330 and an active liquid crystal layer 314 comprising two homogeneous alignment layers 417A, 417B, wherein pretilt directions of the alignment layers have a component 419Ap, 419Bp in the plane of the alignment layers that are antiparallel. Features of the embodiment of FIG. 11A not discussed in further detail may be assumed to correspond to the features with equivalent reference numerals as discussed above, including any potential variations in the features.

Electrodes 413, 415 are arranged to apply a voltage from driver 350 across the liquid crystal material 414 in the layer 314. In a first driven state the liquid crystal molecules are arranged to provide no phase modification to input polarisation state in a normal direction to the polar control retarder and modified phase to an input polarisation state in directions at an angle to the normal direction to the polar control retarder 300. Such a driven state may be provided for privacy mode operation.

In a second driven state the liquid crystal molecules are arranged to provide no phase modification to input polarisation state in a normal direction to the polar control retarder and modified phase to an input polarisation state in directions at an angle to the normal direction to the polar control retarder 300. Such a driven state may be provided for public (or share) mode operation.

The pretilt directions 419A, 419B of the alignment layers have a component in the plane of the alignment layers 417A, 417B that are antiparallel. The pretilt directions 419A, 419B refer to the alignment of the liquid crystal molecules 421 that are adjacent to said layers. The components 419Ap and 419Bp are the in-plane components and are anti-parallel to each other. The pretilt angle is the angle between the directions 419A and 419Ap, and between directions 419B and 419Bp respectively.

The components 419Ap, 419Bp are oriented in a first direction in the plane of the alignment layers, that is parallel to the y-axis.

FIG. 11B is a schematic diagram illustrating in side perspective view a structure of a polar control retarder 300 and an active liquid crystal layer 314 comprising two homogeneous alignment layers 417A, 417B wherein the polar control retarder 300 comprises crossed A-plates 330A, 330B. In alternative embodiments, the passive retarder 330 may comprise 'crossed' A-plates. Features of the embodiment of FIG. 11B not discussed in further detail may be assumed to correspond to the features with equivalent reference numerals as discussed above, including any potential variations in the features.

In the present disclosure crossed A-plates refers to a pair of passive uniaxial retarders having optical axes in the plane of the retarders that are crossed, as illustrated by retarders 330A, 330B in FIG. 2.

FIG. 11C is a schematic diagram illustrating in side perspective view a structure of a polar control retarder 300 wherein the polar control retarder 300 comprises a passive C-plate 330 and an active liquid crystal layer 314 comprising two homeotropic alignment layers 417A, 417B, wherein pretilt directions 419A, 419B of the alignment layers 417A, 417B have a component 419Ap, 419Bp in the plane of the alignment layers 417A, 417B that are antiparallel. The polar control retarder 300 comprises crossed A-plates 330A, 330B. Features of the embodiment of FIG. 11C not discussed in further detail may be assumed to correspond to the features with equivalent reference numerals as discussed above, including any potential variations in the features.

FIG. 11D is a schematic diagram illustrating in side perspective view a structure of a polar control retarder and an active liquid crystal layer comprising two homeotropic alignment layers 417A, 417B wherein the polar control retarder 300 comprises a C-plate 330. Features of the embodiment of FIG. 11D not discussed in further detail may be assumed to correspond to the features with equivalent reference numerals as discussed above, including any potential variations in the features. Advantageously higher retardances of the passive retarder 330A, 330B may be provided at lower cost in comparison to a C-plate 330 embodiment of FIG. 11C.

In the present embodiments one of the polar control retarders 300A, 300B may comprise the polar control retarder 300 of FIG. 11A and the other of the polar control retarders 300A, 300B may comprise one of the polar control retarders 300 of FIGS. 11A-D. The at least one passive compensation retarder 330 of said other of the at least one first polar control retarder 300A and the at least one second polar control retarder 300B comprises either: a passive uniaxial retarder having its optical axis perpendicular to the plane of the retarder; or a pair of passive uniaxial retarders having optical axes in the plane of the retarders that are crossed.

In respect of said other (with alignment layers that are of the same type) of the at least one first polar control retarder and the at least one second polar control retarder, both of the surface alignment layers may be arranged to provide homeotropic alignment in the adjacent liquid crystal material. Advantageously reduced voltage and power consumption may be provided in share mode in comparison to arrangements in which both alignment layers have homogeneous alignment.

In respect of said other (with alignment layers that are of the same type) of the at least one first polar control retarder and the at least one second polar control retarder, both of the surface alignment layers may be arranged to provide homogeneous alignment in the adjacent liquid crystal material. Advantageously the visibility of defects to applied pressure may be reduced in comparison to arrangements in which both alignment layers have homeotropic alignment.

Operation of polar control retarders between parallel polarisers is described further in U.S. Pat. No. 10,126,575 and in U.S. Patent Publ. No. 2019-0086706, both of which are herein incorporated by reference in their entireties. The operation of the plural polar control retarders of the present embodiments in a share mode of operation will now be described.

The structure of polar control retarders 300 with rotated alignment layers for improved security factor for a driver 47 leaning towards the privacy display device 100, such as illustrated with respect to FIGS. 8A-C will now be described.

FIG. 12A is a schematic diagram illustrating a front perspective view of a polar control retarder 300B comprising a liquid crystal retarder 301B with alignment layers 417BA, 417BB having pretilt directions 419BA with components 419BAp, 419BBp in the plane of the layer 314B of liquid crystal material 414B that is at acute non-zero angles $\theta_{BA}$ to the electric vector transmission or absorption directions 319A, 319B of the additional polarisers 318A, 318B which are parallel. Features of the embodiment of FIG. 12A not discussed in further detail may be assumed to correspond to the features with equivalent reference numerals as discussed above, including any potential variations in the features.

FIG. 12A illustrates the surface alignment layer 417BA is arranged to provide homogeneous alignment in the adjacent liquid crystal material 414B, said surface alignment layer 417BA having said pretilt having a pretilt direction 419BA with a component 419BAp in the plane of the layer 314B of liquid crystal material 414B that is at an acute non-zero angle $\theta_{BB}$ to the electric vector transmission directions 319A, 319B of the additional polarisers 318A, 318B.

The other of the surface alignment layers 417BB is arranged to provide homogeneous alignment in the adjacent liquid crystal material 414B. The other of the surface alignment layers 417BB has said pretilt having a pretilt direction 419BB with a component 419BBp in the plane of the layer 314B of liquid crystal material 414B that is at a non-zero angle $\theta_{BB}$ to the electric vector transmission or absorption directions 319A, 319B of the additional polarisers 318A, 318B. Thus each of the surface alignment layers 417BA, 417BB have pretilts having pretilt directions 419BA, 419BB with components 419BAp, 419BBp in the plane of the layer 314 of liquid crystal material 414B that are at acute non-zero angles $\theta_{BA}$, $\theta_{BB}$ to the electric vector transmission or absorption directions 319A, 319B of the additional polarisers 318A, 318B which are parallel.

The non-zero angles $\theta_B$ are from the vertical direction (y-axis) and are equivalent to the angles $90-\theta_A$, $90-\theta_B$ measured from the horizontal direction (x-axis) and referred to elsewhere herein.

More generally, at least one of the alignment layers 417BA, 417BB may have pretilt directions 419BA, 419BB with components 419BAp, 419BBp in the plane of the layer 314B of liquid crystal material 414B that are at acute non-zero angles $\theta_{BA}$, $\theta_{BB}$ to at least one of the electric vector transmission or absorption directions 319A, 319B of the additional polarisers 318A, 318B.

FIG. 12B is a schematic diagram illustrating a front view of a display comprising the polar control retarder of FIG. 12A. Features of the embodiment of FIG. 12B not discussed in further detail may be assumed to correspond to the features with equivalent reference numerals as discussed above, including any potential variations in the features.

In this example, the acute non-zero angles $\theta_B$ are present across the entirety of the display device 100. This is also the case in all embodiments where not otherwise specified. However, more generally the acute non-zero angles $\theta_B$ are present across any part of the display device 100, in which case the technical effects described hereinabove are achieved for that part.

FIG. 12B illustrates that the pretilt direction may be the same at all positions across the surface alignment layer 417BB so that the surface alignment layers 417BA, 417BB each have pretilts having pretilt directions 419B with components 419BAp, 419BBp in the plane of the layer 314B of liquid crystal material 414B that are at the same non-zero acute angle $\theta_B$ to the electric vector transmission or absorption directions 319A, 319B of the additional polarisers 318A, 318B as will be described further with respect to FIGS. 12C-F.

In the present embodiments the polarisers 318A, 318B, 210 have transmission or absorption axes 319A, 319B, 211 that are parallel to or orthogonal to the y-axis. In embodiments which describe polarisers with horizontal electric vector transmission direction 319A, 319B, 211 then vertical transmission direction 319A, 319B, 211 may be assumed to have identical or similar performance, the selection depending on the desirable polariser direction for the spatial light modulator polariser 210, 218 electric vector transmission directions 211, 219.

FIGS. 12A-B refer to the second polar control retarder 300B. The first polar control retarder 300A may be considered in the same manner with rotations $\theta_{AA}$, $\theta_{AB}$ that may be the same or different to the rotations $\theta_{BA}$, $\theta_{BB}$. Advantageously increased image security may be achieved as described elsewhere herein.

Various alternatives for alignment directions of polarisers and liquid crystal alignment directions will now be illustrated.

FIG. 12C is a schematic diagram illustrating a front view of vertical polariser 318B electric vector transmission direction 319B and alignment directions 419BAp, 419BBp of pretilt components in the plane of the liquid crystal layer 314B of for a left hand drive vehicle 650 such as illustrated in FIG. 1; and FIG. 12D is a schematic diagram illustrating a front view of horizontal polariser electric vector transmission direction and alignment directions of pretilt components in the plane of the layer of liquid crystal for a left hand drive vehicle 650 such as illustrated in FIG. 1. Features of the embodiments of FIGS. 12C-D not discussed in further detail may be assumed to correspond to the features with equivalent reference numerals as discussed above, including any potential variations in the features.

In the embodiments of FIGS. 12C-F some elements of the second polar control retarder 300B are described and the second additional polariser 318B are described. The illustration may also apply to the first polar control retarder 300A. The polarisers 318A, 318B and respective display polariser 210 or display polariser 218 may have transmission directions that are parallel, or as illustrated in FIG. 3C may cooperate with a further half wave retarder 208 to provide high transmission in at least one polar angle.

Considering FIG. 12C, polariser 318B has an electric vector $\underline{E}$ transmission direction 319B that is vertical (parallel to the y axis) and an electric vector absorption direction $\underline{B}$ that is horizontal (parallel to the x axis).

Alignment layer 417BA has a pretilt direction 419BA that has a component direction 419BAp in the plane of the alignment layer 417BA that is a vector inclined at angle $\theta_{BA}$ anti-clockwise from the easterly direction (positive x direction). The component direction 419BAp is inclined at a rotation angle $ to the direction 319B.

Alignment layer 417BB has a pretilt direction 419BB that has a component direction 419BBp in the plane of the alignment layer 417BB that is a vector inclined at angle $\theta_{BB}$ anti-clockwise from the easterly direction that is anti-parallel to the component 419BAp. The component direction 419BBp is also inclined at the same rotation angle φ to the direction 319 as for the component 419BBp.

Considering FIG. 12D, polariser 318B has an electric vector $\underline{E}$ transmission direction 319B that is horizontal (parallel to the x axis) and an electric vector absorption direction $\underline{B}$ that is vertical (parallel to the y axis). In the present embodiments, the arrangements of FIGS. 12C-12D achieve substantially the same polar transmission performance as discussed hereinabove for FIGS. 3A-C.

Alignment layer 417BA has a pretilt direction 419BA that has a component direction 419BAp in the plane of the alignment layer 417BA that is a vector inclined at angle $\theta_{BA}$ anti-clockwise from the easterly direction. The component direction 419BAp is inclined at a rotation angle φ to the direction 317B and a rotation angle 90–φ degrees to the direction 319B.

Alignment layer 417BB has a pretilt direction 419BB that has a component direction 419BBp in the plane of the alignment layer 417BB that is a vector inclined at angle $\theta_{BB}$ anti-clockwise from the easterly direction that is anti-parallel to the component 419BAp. The component direction 419BBp is also inclined at the same rotation angle φ to the direction 317B as for the component 419BBp.

More generally, said surface alignment layers 417AA, 417AB of the first polar control retarder 300A have pretilts 419AA, 419AB respectively having pretilt directions with components 419AAp, 419ABp in the plane of the layer of liquid crystal material 314A in a first pair 420A of anti-parallel directions. Said surface alignment layers 417BA, 417BB of the second polar control retarder 300B have pretilts 419BA, 419BB respectively having pretilt directions with components 419BAp, 419BBp in the plane of the layer of liquid crystal material 314B in a second pair 420B of anti-parallel directions.

Referring to the illustrative embodiment of FIG. 3D and FIG. 12D the first pair 420A of parallel directions is orthogonal to the electric vector transmission direction 319A of additional polariser 318A and the second pair 420B of parallel directions is orthogonal to the electric vector transmission direction 319B of additional polariser 318B.

Rotated alignment orientations will now be described in further detail.

Referring to the embodiment of FIG. 3A and corresponding FIG. 12D, the first pair 420A of parallel directions is angularly offset from being orthogonal to the electric vector transmission direction 319A of the first additional polariser 318A by an amount having a magnitude of at most 20° and the second pair 420B of parallel directions is angularly offset from being orthogonal to the electric vector transmission direction 319B of the second additional polariser 318B by an amount φ having a magnitude of at most 20°.

Referring to the embodiment of FIG. 3B and corresponding FIG. 12C, the first pair 420A of parallel directions is angularly offset from being parallel to the electric vector transmission direction 319A of the first additional polariser 318A by an amount having a magnitude of at most 20° and the second pair 420B of parallel directions is angularly offset from being parallel to the electric vector transmission direction 319B of the second additional polariser 318B by an amount φ having a magnitude of at most 20°.

FIG. 12E is a schematic diagram illustrating a front view of vertical polariser electric vector transmission direction and alignment directions of pretilt components in the plane of the layer of liquid crystal for a right hand drive vehicle; and FIG. 12F is a schematic diagram illustrating a front view of horizontal polariser electric vector transmission direction and alignment directions of pretilt components in the plane of the layer of liquid crystal for a right hand drive vehicle. Features of the embodiments of FIGS. 12E-F not discussed in further detail may be assumed to correspond to the features with equivalent reference numerals as discussed above, including any potential variations in the features.

In comparison to the embodiments of FIGS. 12C-D, the reduction in off-axis luminance near the angle α is increased and advantageously security factor S is improved in the case that the passenger privacy display device 100 is arranged on the left hand side of the vehicle 650.

The structure and operation of various alternative backlights 20 that provide desirable illumination characteristics for the switchable privacy display device 100 of the present embodiments will now be described further.

FIG. 13A is a schematic diagram illustrating a side view of the switchable backlight 20 of FIG. 2 comprising waveguides 1A, 1B, a rear reflector 3 and an optical turning film component 50 and outputting light beams 445, 447 with the angular distributions as illustrated in FIGS. 5A-C;

FIG. 13B is a schematic diagram illustrating a front perspective view of an optical turning film component 50 for the backlight 20 of FIG. 13A; and FIG. 13C is a schematic diagram illustrating a side view of an optical turning film component 50. Features of the embodiment of FIG. 13A-C not discussed in further detail may be assumed to correspond to the features with equivalent reference numerals as discussed above, including any potential variations in the features.

The backlight 20 comprises: at least one first light source 15A arranged to provide input light 444A and at least one second light source 15B arranged to provide input light 444B in an opposite direction from the at least one first light source 15A. A waveguide arrangement 11 comprises waveguides 1A, 1B, the waveguide arrangement 11 being arranged to receive the input light 444A, 444B from the at least one first light source 15A and the at least one second light source 15B and to cause light 444A, 444B from the at least one first light source 15A and the at least one second light source 15B to exit from the waveguide arrangement 11 by breaking total internal reflection.

The waveguide arrangement 11 comprises: a first waveguide 1A extending across a plane and comprising first and second opposed light guiding surfaces 6A, 8A arranged to guide light along the first waveguide 1A, the second light guiding surface 8A being arranged to guide light by total internal reflection; and a first input end 2A arranged between the first and second light guiding surfaces 6A, 8A of the first waveguide 1A and extending in a lateral direction between the first and second light guiding surfaces 6A, 8A. The at least one first light source 15A is arranged to input light 444A into the first waveguide 1A through the first input end 2A, and the first waveguide 1A is arranged to cause light from the at least one first light source 15A to exit from the first waveguide 1A through one of the first and second light guiding surfaces 6A, 8A by breaking total internal reflection. A second waveguide 1B extending across the plane is arranged in series with the first waveguide 1A and comprises first and second opposed light guiding surfaces 6B, 8B arranged to guide light along the second waveguide 1B, the second light guiding surface 8B being arranged to guide light by total internal reflection, and a second input end 2B arranged between the first and second light guiding surfaces 6B, 8B of the second waveguide 1B and extending in a lateral direction between the first and second light guiding surfaces 6B, 8B. The at least one second light source 15B is arranged to input light into the second waveguide 1B through the second input end 2B, and the second waveguide 1B is arranged to cause light 444B from the at least one second light source 15B to exit from the second waveguide 1B through one of the first and second light guiding surfaces 6B, 8B by breaking total internal reflection, and wherein the first and second waveguides 1A, 1B are oriented so that at least one first light source 15A and at least one second light source 15B input light 444A, 444B into the first and second waveguides 1A, 1B in opposite directions.

An optical turning film component 50 comprises: an input surface 56 arranged to receive the light 444A, 444B exiting from the waveguide arrangement 11 through a light guiding surface of the at least one waveguide 1A, 1B of the waveguide arrangement by breaking total internal reflection, the input surface 56 extending across the plane; and an output surface 58 facing the input surface, wherein the input surface 56 comprises an array of elongate prismatic elements 52. The prismatic elements each comprise a pair of elongate facets 52 defining a ridge 54 therebetween.

The backlight 20 of FIG. 13A may provide the exemplary luminance profiles of FIGS. 5A-D hereinabove. In operation, the light 444A from the first light source 15A exits the backlight 20 with a first angular distribution 445 and as illustrated in FIG. 5A and the light from the second light source 15B exits the backlight 20 with a second angular distribution 457 and as illustrated in FIG. 5B different from the first angular distribution 455. The first angular distribution 455 is symmetrical about an axis 199 of symmetry of the backlight 20 and the second angular distribution 457 is asymmetrical about the same axis 199 of symmetry of the backlight 20. In a left hand drive vehicle, the asymmetrical distribution 457 may be to left of the axis 199 of symmetry of the backlight 20 and in a right hand drive vehicle the asymmetrical distribution 457 may be to right of the axis 199 of symmetry of the backlight 20.

The operation of the backlight 20 of FIG. 13A will now be described in further detail.

Each waveguide 1A, 1B extends across a plane and comprises: first and second opposed light guiding surfaces 6A, 8A and 6B, 8B arranged to guide light along the respective optical waveguide 1A, 1B, being arranged to guide light by total internal reflection.

First and second input ends 2A, 4A and 2B, 4B are arranged between the first and second light guiding surfaces 6, 8 and extend in a lateral direction between the first and second light guiding surfaces 6, 8.

The light sources 15A, 15B are arranged to input light 445, 447 into the waveguide 1 through the first input end 2A, 2B.

Figure 14A:
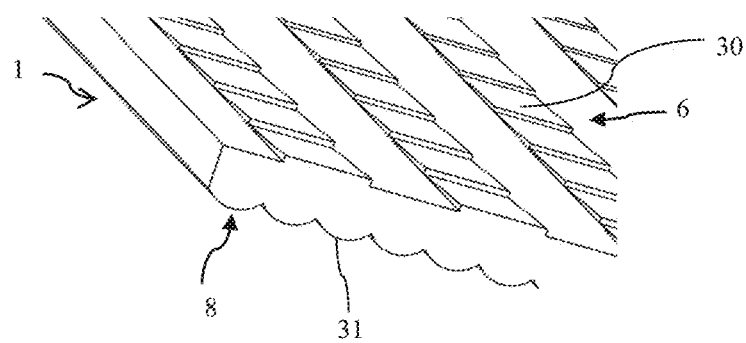
Figure 14B:
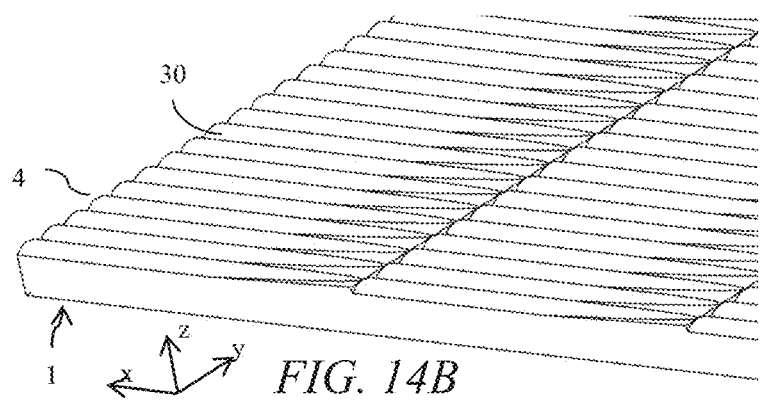
Figure 14C:
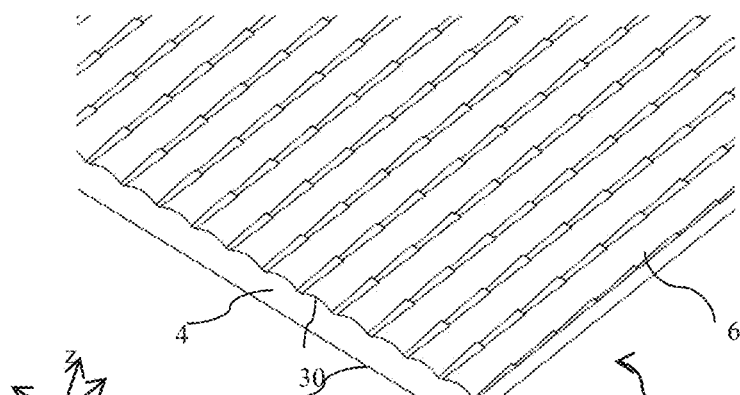
Figure 14D:
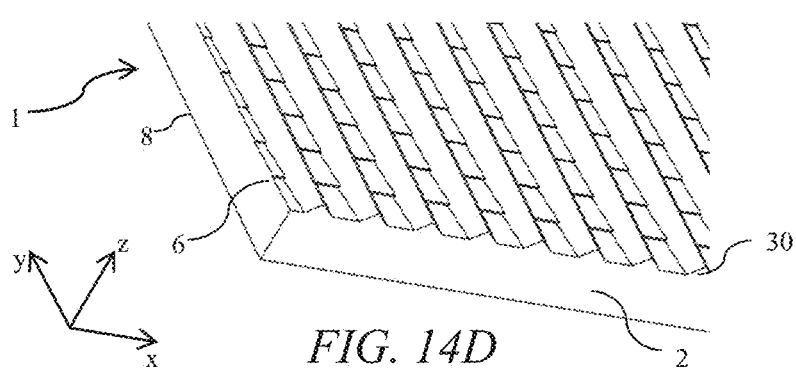

Waveguides 1A, 1B comprise surface relief features that are arranged to leak some of the guiding light either towards the rear reflector 3 or towards the light turning film 50 that comprises an array of prisms 52 facing the output of the waveguides 1A, 1B. Each waveguide 1A,1B comprise a surface relief 30 arranged on the first side 6A, 6B that may comprise prism surfaces 32, 33. Further the second sides 8A, 8B may further comprise surface relief 31 that may comprise elongate features such as illustrated in FIGS. 14A-C or prism features as illustrated in FIG. 14D hereinbelow. In operation the surface reliefs 30, 31 provide leakage of light 445, 447 from the waveguide 1A, 1B for light guiding along the waveguide 1A, 1B.

The waveguides 1A,1B are arranged to cause light 445, 447 from the light sources 15A, 15B to exit from the waveguides 1A, 1B through one of the first and second light guiding surfaces 6A,8A and 6B,8B respectively by breaking total internal reflection.

Referring also to FIG. 2, light source 15A such as an array of LEDs is arranged to input light rays 444A into the waveguide 1A through input side 2A. Such light rays 444A are guided within the waveguide 1A and are extracted outside of the waveguide 1A by light extraction features on the surface of the waveguide 1A. Light rays 444A pass either through waveguide 1B, are reflected by rear reflector 3, pass again through waveguides 1B,1A onto the prisms 52 of the light turning film 50, or are pass directly onto the prisms 52 of the light turning film 50.

Light rays 444A are refracted at the first prism surface 53A and reflected at the second prism surface 53B of the respective prism 52 of the turning film component 50. By means of design of the surface profiles of light extraction features of the waveguide 1A and surface of the first and second prism surfaces 53A, 53B the nominal direction of output light 445 may be directed in directions near to the normal 199 of the display device 100 with polar luminance profile as will be described hereinbelow.

The luminous flux of the light sources 15A determine the luminance of the polar light output distribution of output light 445. Light sources 15A provide control of the luminance for passenger 45 illumination.

Light source 15B such as an array of LEDs is arranged to input light rays 444B into the waveguide 1B from an input side 2B that faces the input side 2A of the first waveguide 1A. Such light rays 444B are guided within the waveguide 1B and are extracted outside of the waveguide 1B by light extraction features on the surface of the waveguide 1B. Light rays 444B pass either by reflection at rear reflector 3, passing through waveguides 1B, 1A onto the prisms 52 of the light turning film 50, or are passed through waveguide 1A onto the prisms 52 of the light turning film 50.

Light rays 444B are refracted at the second prism surface 53B and reflected at the first prism surface 53A of the respective prism 52. By means of design of the surface profiles of light extraction features of the waveguide 1B and surface profiles of the first and second prism surfaces 53A, 53B the nominal direction of output light 447 may be directed in directions away from the normal 199 of the display device 100 towards the nominal driver location with polar luminance profile as will be described hereinbelow. The luminous flux of the light sources 15B determine the luminance of the polar light output distribution of output light 447.

The optical turning film component 50 will now be described in more detail.

The optical turning film component 50 comprises: an input surface 56 arranged to receive the light exiting from a waveguide 1 through a light guiding surface 6, 8 of the waveguide 1 by breaking total internal reflection, the input surface 56 extending across the plane; and an output surface 58 facing the input surface 56, wherein the input surface comprises an array of elongate prismatic elements 52 comprising ridges 54.

Angles $\phi_A$, $\phi_B$ of prism surfaces 53A, 53B are provided to direct the nominal light output from waveguides 1A, 1B to directions 445, 447 by refraction and reflection at surfaces 53A, 53B. Advantageously desirable illumination directions such as illustrated in FIGS. 5A-F may be achieved by selection of angles $\phi_A$, $\phi_B$.

Examples of waveguide structures for use in the waveguides 1A, 1B will now be described in further detail.

FIGS. 14A-D are schematic diagrams illustrating perspective views of various alternative waveguides 1 for the embodiment of FIG. 13A. Features of the embodiments of FIGS. 14A-D not discussed in further detail may be assumed to correspond to the features with equivalent reference numerals as discussed above, including any potential variations in the features.

Surface relief features 30 are illustrated on both sides 6, 8 of the waveguide 1 such as illustrated in FIG. 14A or surface relief features 30 may be provided on one side 6 of the waveguide 1 while the side 8 may be planar such as illustrated in FIGS. 14B-D. For example lenticular structures may be provided as surface relief profile 31 on surface 8 and prismatic structures may be provided as surface relief profile 30 on surface 6.

In comparison to the waveguide 1 of FIG. 14A, the waveguides 1 of FIGS. 14B-D are provided with microstructures on a single surface of the waveguide. The principles of operation are otherwise similar. The surfaces may be provided on a single surface of the waveguide 1, advantageously achieving reduced cost and complexity.

An alternative backlight 20 to the arrangements of FIG. 2 and FIG. 13A will now be described.

FIG. 15 is a schematic diagram illustrating a side view of a switchable backlight 20 comprising a single waveguide 1, a rear reflector 3 and an optical turning film component 50 and outputting light beams for passenger and driver nominal directions; and FIGS. 16A-B are schematic diagrams illustrating perspective views of alternative waveguides 1 for the embodiment of FIG. 15. Features of the embodiments of FIG. 15 and FIGS. 16A-B not discussed in further detail may be assumed to correspond to the features with equivalent reference numerals as discussed above, including any potential variations in the features.

The backlight 20 comprises: at least one first light source 15A arranged to provide input light 444A and at least one second light source 15B arranged to provide input light 444B in an opposite direction from the at least one first light source 15A. The waveguide arrangement 11 comprises waveguide 1, the waveguide arrangement 11 being arranged to receive the input light 444A, 444B from the at least one first light source 15A and the at least one second light source 15B and to cause light 444A, 444B from the at least one first light source 15A and the at least one second light source 15B to exit from the waveguide arrangement 11 by breaking total internal reflection. In comparison to the waveguide arrangement 11 of FIG. 13A, the waveguide arrangement 11 of FIG. 15 comprises: a waveguide 1 extending across a plane and comprising: first and second opposed light guiding surfaces 6, 8 arranged to guide light along the waveguide 1, the second light guiding surface 8 being arranged to guide light by total internal reflection, and first and second input ends 2, 4 arranged between the first and second light guiding surfaces 6, 8 and extending in a lateral direction between the first and second light guiding surfaces 6, 8. The at least one first light source 15A is arranged to input light 444A into the waveguide 1 through the first input end 2 and the at least one second light source 15B is arranged to input light 444B into the waveguide 1 through the second input end 4, and the waveguide 1 is arranged to cause light 444A from the at least one first light source 15A and the at least one second light source 15B to exit from the waveguide 1 through one of the first and second light guiding surfaces 6, 8 by breaking total internal reflection.

The operation of the backlight 20 of FIG. 15 will now be described in further detail.

The waveguide 1 extends across a plane and comprising: first and second opposed light guiding surfaces 6, 8 arranged to guide light along the optical waveguide 1, the second light guiding surface 8 being arranged to guide light by total internal reflection.

First and second input ends 2, 4 are arranged between the first and second light guiding surfaces 6, 8 and extend in a lateral direction between the first and second light guiding surfaces 6, 8.

The at least one first light source 15A is arranged to input light 445 into the waveguide 1 through the first input end 2 and the at least one second light source 15B is arranged to input light 447 into the waveguide 1 through the second input end 4.

The waveguide 1 is arranged to cause light 445, 447 from the at least one first light source 15A and the at least one second light source 15B to exit from the waveguide 1 through one of the first and second light guiding surfaces 6, 8 by breaking total internal reflection.

The optical turning film component 50 has a structure and operation similar to that described with reference to FIGS. 13A-C.

The waveguide 1 is arranged to cause light 445, 447 from the at least one first light source 15 and the at least one second light source 15B to exit from the waveguide 1 with angular distributions 455, 457.

Waveguide 1 comprises arrays of inclined facets 32A, 32B that extend along the lateral (x-axis) direction. The waveguide 1 of FIG. 16A comprises lenticular microstructure 30 while waveguide 1 of FIG. 16B comprises prismatic elements 29 that extend orthogonal to the lateral direction. The facets 32 and elements 29, 30 of the waveguides 1 are arranged to adjust the propagation of guiding light 445, 447 within the waveguides 1 so that some light leaks from the waveguide 1 by breaking internal reflection.

Switchable privacy display components will now be described.

FIG. 17 is a schematic diagram illustrating in side perspective view a switchable privacy display component 102 for use with a spatial light modulator 48 comprising a first polar control retarder 300A and a first additional polariser 318A, a reflective polariser 302; and a second polar control retarder 300B arranged between the first additional polariser 318A and a second additional polariser 318B. Advantageously a spatial light modulator 48 may be reconfigured in the factory or in the field for use as a switchable privacy display. Features of the embodiment of FIG. 17 not discussed in further detail may be assumed to correspond to the features with equivalent reference numerals as discussed above, including any potential variations in the features.

FIGS. 21A-F, and FIGS. 23A-E, hereinbelow provide alternative switchable privacy displays 100. Switchable privacy display components 102 may be provided that may comprise both polar control retarders 300A, 300B and polarisers 318A, 318B as a single combined component 102. Alternatively considering each of FIGS. 21A-F, FIGS. 22A-J and FIGS. 23A-E, the polar control retarders 300A, 300B may be provided as separate components or may be provided as components with retarders 300A with attached polarisers 318A and retarders 300B with attached polarisers 318B.

It would be desirable to increase the security factor of a privacy display for at least the automotive application of FIG. 1.

FIG. 18A is a schematic diagram illustrating a front perspective view of a switchable privacy display device 100 comprising a transmissive spatial light modulator 48 wherein a first polar control retarder 300A is arranged between the backlight 20 and the spatial light modulator 48 and wherein the spatial light modulator 48 is arranged between the first and second polar control retarders 300A, 300B; and FIG. 18B is a schematic diagram illustrating a front perspective view of alignment orientations for components of the privacy display of FIG. 18A.

In the embodiment of FIG. 18A said display polariser is an input display polariser 210 arranged on the input side of the spatial light modulator 48. A first additional polariser 318A is arranged on the input side of the spatial light modulator 48, the first additional polariser 318A being a linear polariser. At least one first polar control retarder 300A arranged between the first additional polariser 318A and the display polariser 210. The display device 100 further comprises an output display polariser 218 arranged on the output side of the spatial light modulator 48. The second additional polariser 318B is arranged on the output side of the spatial light modulator 48. The at least one second polar control retarder 300B is arranged between the second additional polariser 318B and the output display polariser 218.

FIG. 18A illustrates a backlight 20 of the type described in FIG. 15, hereinabove.

FIGS. 18A-B illustrate that C-plate passive retarders 330A, 300B may be provided for both polar control retarders 300A, 300B, advantageously reducing cost and colour variations with polar angle as described elsewhere herein.

The display device 100 further comprises a reflective polariser 302, the reflective polariser 302 being a linear polariser, and said display polariser is an input display polariser 210 arranged on the input side of the spatial light modulator 48, and the display device 100 further comprises an output display polariser 218 arranged on the output side of the spatial light modulator 48, the second additional polariser 318B is arranged on the output side of the spatial light modulator 48, the at least one second polar control retarder 300B is arranged between the second additional polariser 318B and the output display polariser 218, and the reflective polariser 302 is arranged between the output display polariser 218 and at least one second polar control retarder 300B. In alternative embodiments said one of the at least one first polar control retarder 300A and the at least one second polar control retarder 300B is the at least one second polar control retarder 300B and said other of the at least one first polar control retarder 300A and the at least one second polar control retarder 300B is the at least one first polar control retarder 300A.

Increased reflectivity provides increased security factor and is advantageously provided in privacy mode of operation, while low reflectivity is provided in share mode of operation as described in FIGS. 24C-D hereinbelow.

FIG. 19A is a schematic diagram illustrating a front perspective view of a switchable privacy display device 100 comprising a transmissive spatial light modulator 48 wherein the first and second polar control retarders 300A, 300B are arranged to receive light from the spatial light modulator 48 and further comprising reflective polariser 302; and FIG. 19B is a schematic diagram illustrating a front perspective view of alignment orientations for components of the privacy display of FIG. 19A. Features of the embodiment of FIGS. 19A-B not discussed in further detail may be assumed to correspond to the features with equivalent reference numerals as discussed above, including any potential variations in the features.

In the embodiment of FIGS. 19A-B the display polariser is an output display polariser 218 arranged on the output side of the spatial light modulator 48. A first additional polariser 318A is arranged on the output side of the spatial light modulator 48 as the display polariser 218, the first additional polariser 318A being a linear polariser. At least one first polar control retarder 300A is arranged between the first additional polariser 318A and the display polariser 218 and the second additional polariser 318B is arranged on the same side of the spatial light modulator 48 as the first additional polariser 318A outside (on the output side of) the first additional polariser 318A. The at least one second polar control retarder 300B is arranged between the first additional polariser 318A and the second additional polariser 318B.

The display device 100 further comprises a reflective polariser 302, the reflective polariser 302 being a linear polariser, and said display polariser is an output display polariser 218 arranged on the output side of the spatial light modulator 48, the second additional polariser 318B is arranged on the same side of the spatial light modulator 48 as the first additional polariser 318A outside the first additional polariser 318A, the at least one second polar control retarder 300B is arranged between the first additional polariser 318A and the second additional polariser 318B, and the reflective polariser 302 is arranged between the first additional polariser 318A and the at least one second polar control retarder 300B. In alternative embodiments said one of the at least one first polar control retarder 300A and the at least one second polar control retarder 300B is the at least one second polar control retarder 300B and said other of the at least one first polar control retarder 300A and the at least one second polar control retarder 300B is the at least one first polar control retarder 300A.

Increased reflectivity and increased security factor is advantageously provided in privacy mode of operation, while low reflectivity is provided in share mode of operation.

Various alternative embodiments of privacy display device 100 will now be described.

FIG. 20 is a key for the alternative stacking arrangements of FIGS. 21A-J, FIGS. 22A-J, and FIGS. 23A-E. Various further alternatives are provided by the present embodiments, including those wherein the sequence of passive retarder 330 and liquid crystal retarder layer 314 is different to those illustrated in FIGS. 21A-J, FIGS. 22A-J, and FIGS. 23A-E.

FIGS. 21A-J are schematic diagrams illustrating in side view alternatives for optical component stackings for a switchable privacy display device 100 wherein the first and second polar control retarders 300A, 300B are arranged to receive light from a transmissive spatial light modulator 48 and backlight 20; FIGS. 22A-J are schematic diagrams illustrating in side view alternatives for optical component stackings for a switchable privacy display device 100 wherein one of the first and second polar control retarders 300A, 300B is arranged to receive light from a transmissive spatial light modulator 48 and the spatial light modulator 48 is arranged to receive light from the other of the first and second polar control retarders 300A, 300B and a backlight 20; and FIGS. 23A-E are schematic diagrams illustrating in side view alternatives for optical component stackings for a switchable privacy display wherein the transmissive spatial light modulator 48 is arranged to receive light from the first and second polar control retarders 300A, 300B and backlight 20. Features of the embodiment of FIGS. 21A-J, FIGS. 22A-J, and FIGS. 23A-E not discussed in further detail may be assumed to correspond to the features with equivalent reference numerals as discussed above, including any potential variations in the features.

In the alternatives of FIGS. 21A-J, FIGS. 22A-J, and FIGS. 23A-E various alternatives are illustrated and can more generally be described as follows.

For each polar control retarder 300A, 300B that comprises a liquid crystal retarder 314A, 314B with two homogeneous alignment layers 417A, 417B or two homeotropic alignment layers 417A, 417B then the respective passive retarder 330A, 330B or pair of crossed passive retarders 330AA, 330AB or 330BA, 330BB may be arranged to either receive light from the respective liquid crystal retarder 314A, 314B; or the liquid crystal retarder 314A, 314B may be arranged to receive light from the respective passive retarder 330A, 330B or pair of crossed passive retarders 330AA, 330AB or 330BA, 330BB. Advantageously the lamination of polarisers and passive retarders to the substrates 312A, 316A, 312B, 316B may be arranged to optimise the ruggedness and flatness of the respective polar control retarder 300A, 300B.

For each polar control retarder 300A, 300B that comprises a liquid crystal retarder 314A, 314B with one homogeneous alignment layer and one homeotropic alignment layer 417A, 417B then preferably the homeotropic alignment layer is arranged between the respective layer of liquid crystal material 414A, 414B and the respective passive retarder 330A, 330B. Advantageously the size of the polar region for reduced luminance in privacy mode is increased.

For the alternatives of FIG. 21A, FIG. 21C, FIG. 21E, FIG. 21G, FIG. 21I, FIG. 22A, FIG. 22C, FIG. 22E, FIG. 22G, and FIG. 22I, a further reflective polariser 302 is provided. The polar control retarder 300B is arranged between the reflective polariser 302 and second additional polariser 318B. Advantageously the reflectivity of the display device 100 in privacy mode of operation may be increased, and security factor increased, as will be described with reference to FIGS. 24C-D hereinbelow.

The size of the polar region for which high reflectivity is achieved in privacy mode may be adjusted by selection of the polar control retarder 300B. Polar control retarders 300B that comprise homeotropic alignment layer 417BA and homogeneous alignment layer 417BB advantageously increase the size of the polar region with high reflectivity. Polar control retarders 300B that comprise two homogeneous or two homeotropic alignment layers 417BA, 417BB increase the security factor close to angle $\alpha$ of FIG. 1. The visibility of the display to the driver 47 leaning towards the privacy display device 100 is advantageously reduced.

The operation of the polar control retarders for on-axis and off-axis light will now be described.

FIG. 24A is a schematic diagram illustrating in side view the operation of the arrangement of FIG. 2 for transmitted light from the spatial light modulator in the share mode of operation. In the embodiments that will be described below, light ray 445 that is normal to the display (or in a head-on direction) is transmitted by the display polariser 219 with a polarisation state 360 that is unmodified by the polar control retarders 300A, 300B and polarisers 318A, 302 and 318B. Such light is transmitted with high luminance.

In share mode, rays 447 with a non-zero polar angle to the normal direction are also transmitted with the same polarisation state 360 that is substantially not modified by the polar control retarders 300A, 300B and polarisers 318A, 302 and 318B. The polar profile of luminance from the spatial light modulator may be substantially unmodified. Advantageously the display may be visible from a wide range of polar viewing positions and viewable by multiple display users.

FIG. 24B is a schematic diagram illustrating in side view the operation of the arrangement of FIG. 2 for transmitted light from the spatial light modulator in a privacy mode of operation with high reflectivity of ambient light. Head-on light ray 445 has a polarisation state 360 that is substantially unmodified by polar control retarders 300A, 300B. By comparison, off-axis light ray 447 has an output from the first polar control retarder that has an imparted phase difference to provide in general an elliptical state 362A. On incidence with first additional polariser 318A the luminance of the ray 447 is reduced with output state 360. Said light ray 447 is transmitted through reflective polariser 302 with small loss and is incident on the second polar control retarder 300B at which further phase modulation is provided and an output polarisation state 362B is achieved. Such state 362B is at least in part absorbed by second additional polariser 318B. Ray 447 is thus transmitted at off-axis polar locations with reduced luminance compared to the ray 447 in FIG. 24A.

The operation of the reflective polariser 302 will now be described.

FIG. 24C is a schematic diagram illustrating in side view the operation of the arrangement of FIG. 18A for incident ambient light 604 in the share mode of operation. Light rays 404, 406 are incident on the display device 100 with substantially unpolarised state 370. The polariser 318B provides a polarisation state 360 that is incident on the first polar control retarder and is substantially unmodified for head-on ray 404 and off-axis ray 406. Thus the light rays are substantially not reflected by the display are absorbed in the spatial light modulator 48 and backlight 20 if present. The display reflectivity is maintained at a low level for a wide range of viewing directions and advantageously a high contrast image is seen by multiple display users.

FIG. 24D is a schematic diagram illustrating in side view the operation of the arrangement of FIG. 18A for ambient light in a privacy mode of operation with high reflectivity of ambient light. Head-on incident ambient light ray 404 is transmitted with substantial reflection from the reflective polariser 302. Features of the embodiments of FIGS. 24A-D not discussed in further detail may be assumed to correspond to the features with equivalent reference numerals as discussed above, including any potential variations in the features.

By comparison light ray 406 undergoes a phase modulation at the polar control retarder 300B such that state 364 illuminates the reflective polariser. The resolved polarisation state 366 that is orthogonal to the electric vector transmission direction 303 of the reflective polariser 302 is reflected and is passed through the polar retarder such that polarisation state 368 is incident on to the second additional polariser. The component of the state 368 that is parallel to the electric vector transmission direction of the polariser 318B is thus transmitted. To an off-axis observer, the display appears to have increased reflectivity. Said increased reflectivity advantageously achieves increased security factor, S as described above.

The embodiments herein that are illustrated comprising a reflective polariser 302 may further be provided with no reflective polariser 302. Advantageously displays may be provided with low reflectivity in privacy mode of operation. For example displays for use in bright ambient environments such as for daytime operation in automotive vehicles may not provide a reflectivity enhancement in privacy mode.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device comprising:
a backlight arranged to output light;
a transmissive spatial light modulator arranged to receive output light from the backlight;
a display polariser arranged on a side of the spatial light modulator, the display polariser being a linear polariser;
a first additional polariser arranged on the same side of the spatial light modulator as the display polariser, the first additional polariser being a linear polariser;
at least one first polar control retarder arranged between the first additional polariser and the display polariser,
a second additional polariser, the second additional polariser being a linear polariser; and
at least one second polar control retarder, wherein either:
    the second additional polariser is arranged on the same side of the spatial light modulator as the first additional polariser outside the first additional polariser, and the at least one second polar control retarder is arranged between the first additional polariser and the second additional polariser; or
    said display polariser is an input display polariser arranged on the input side of the spatial light modulator, and the display device further comprises an output display polariser arranged on the output side of the spatial light modulator, the second additional polariser is arranged on the output side of the spatial light modulator, and the at least one second polar control retarder is arranged between the second additional polariser and the output display polariser,
wherein:
each of the at least one first polar control retarder and the at least one second polar control retarder comprises a respective switchable liquid crystal retarder comprising a layer of liquid crystal material and two surface alignment layers disposed adjacent to the layer of liquid crystal material and on opposite sides thereof,
in respect of one of the at least one first polar control retarder and the at least one second polar control retarder, both of the surface alignment layers are arranged to provide homogenous alignment in the adjacent liquid crystal material, and in respect of the other of the at least one first polar control retarder and the at least one second polar control retarder, both of the surface alignment layers are arranged to provide homeotropic alignment in the adjacent liquid crystal material, and the switchable liquid crystal retarder of said one of the at least one first polar control retarder and the at least one second polar control retarder has a retardance for light of a wavelength of 550 nm having a first retardance value and the switchable liquid crystal retarder of said other of the at least one first polar control retarder and the at least one second polar control retarder has a retardance for light of a wavelength of 550 nm having a second retardance value, the first retardance value and the second retardance value being different, the magnitude of the difference between the first retardance value and the second retardance value being at least 10% of the average of the first retardance value and the second retardance value.

2. A display device according to claim 1, wherein the first retardance value is greater than the second retardance value.

3. A display device according to claim 2, wherein
the first retardance value is in a range from 500 nm to 2000 nm, preferably in a range from 700 nm to 1500 nm, and
the second retardance value is in a range from 350 nm to 900 nm, preferably in a range from 500 nm to 850 nm.

4. A display device according to claim 1, wherein the first retardance value is less than the second retardance value.

5. A display device according to claim 4, wherein
the first retardance value is in a range from 350 nm to 1000 nm, preferably in a range from 500 nm to 900 nm, and
the second retardance value is in a range from 650 nm to 2800 nm, preferably in a range from 1000 nm to 2000 nm.

6. A display device according to claim 1, wherein said one of the at least one first polar control retarder and the at least one second polar control retarder further comprises at least one passive compensation retarder.

7. A display device according to claim 6, wherein the at least one passive compensation retarder of said one of the at least one first polar control retarder and the at least one second polar control retarder comprises a pair of passive uniaxial retarders having optical axes in the plane of the retarders that are crossed.

8. A display device according to claim 7, wherein the first retardance value is greater than the second retardance value, and the pair of passive uniaxial retarders having optical axes in the plane of the retarders that are crossed each have a retardance for light of a wavelength of 550 nm in a range from 300 nm to 1500 nm, preferably in a range from 500 nm to 1200 nm.

9. A display device according to claim 7, wherein the first retardance value is less than the second retardance value, and the pair of passive uniaxial retarders having optical axes in the plane of the retarders that are crossed each have a retardance for light of a wavelength of 550 nm in a range from 300 nm to 900 nm, preferably in a range from 400 nm to 800 nm.

10. A display device according to claim 6, wherein the at least one passive compensation retarder of said other of the at least one first polar control retarder and the at least one second polar control retarder comprises a passive uniaxial retarder having its optical axis perpendicular to the plane of the retarder.

11. A display device according to claim 10, wherein the first retardance value is greater than the second retardance value, and the passive uniaxial retarder having its optical axis perpendicular to the plane of the retarder has a retardance for light of a wavelength of 550 nm in a range from −300 nm to −1700 nm, preferably in a range from −500 nm to −1200 nm.

12. A display device according to claim 10, wherein the first retardance value is less than the second retardance value, and the passive uniaxial retarder having its optical axis perpendicular to the plane of the retarder has a retardance for light of a wavelength of 550 nm in a range from −250 nm to −800 nm, preferably in a range from −300 nm to −700 nm.

13. A display device according to claim 1, wherein said other of the at least one first polar control retarder and the at least one second polar control retarder further comprises at least one passive compensation retarder.

14. A display device according to claim 13, wherein the at least one passive compensation retarder of said other of the at least one first polar control retarder and the at least one second polar control retarder comprises a passive uniaxial retarder having its optical axis perpendicular to the plane of the retarder.

15. A display device according to claim 14, wherein the first retardance value is greater than the second retardance value, and the passive uniaxial retarder having its optical axis perpendicular to the plane of the retarder has a retardance for light of a wavelength of 550 nm in a range from −250 nm to −850 nm, preferably in a range from −400 nm to −800 nm.

16. A display device according to claim 14, wherein the first retardance value is less than the second retardance value, and the passive uniaxial retarder having its optical axis perpendicular to the plane of the retarder has a retardance for light of a wavelength of 550 nm in a range from −400 nm to −2400 nm, preferably in a range from −700 nm to −1700 nm.

17. A display device according to claim 1, wherein
the display device further comprises a reflective polariser, the reflective polariser being a linear polariser, and either:
said display polariser is an output display polariser arranged on the output side of the spatial light modulator, the second additional polariser is arranged on the same side of the spatial light modulator as the first additional polariser outside the first additional polariser, the at least one second polar control retarder is arranged between the first additional polariser and the second additional polariser, and the reflective polariser is arranged between the first additional polariser and the at least one second polar control retarder; or
said display polariser is an input display polariser arranged on the input side of the spatial light modulator, and the display device further comprises an output display polariser arranged on the output side of the spatial light modulator, the second additional polariser is arranged on the output side of the spatial light modulator, the at least one second polar control retarder is arranged between the second additional polariser and the output display polariser, and the reflective polariser is arranged between the output display polariser and at least one second polar control retarder.

18. A display device according to claim 1, wherein said surface alignment layers of the at least one first polar control retarder have pretilts having pretilt directions with components in the plane of the layer of liquid crystal material in a first pair of anti-parallel directions.

19. A display device according to claim 18, wherein the first pair of anti-parallel directions is parallel or orthogonal to the electric vector transmission direction of said first additional polariser.

20. A display device according to claim 18, wherein the first pair of anti-parallel directions is angularly offset from being parallel or orthogonal to the electric vector transmission direction of said first additional polariser by an amount having a magnitude of at most 20 degrees.

21. A display device according to claim 1, wherein said surface alignment layers of the at least one second polar control retarder have pretilts having pretilt directions with components in the plane of the layer of liquid crystal material in a second pair of anti-parallel directions.

22. A display device according to claim 21, wherein the second pair of anti-parallel directions is parallel or orthogonal to the electric vector transmission direction of said second additional polariser.

23. A display device according to claim 21, wherein the second pair of anti-parallel directions is angularly offset from being parallel or orthogonal to the electric vector transmission direction of said second additional polariser by an amount having a magnitude of at most 20 degrees.

24. A display device according to claim 1, wherein the backlight has an output luminance profile having a full width half maximum that is at most 40 degrees, preferably at most 30 degrees and most preferably at most 20 degrees.

25. A display device according to claim 24, wherein the backlight in a second mode of operation has a second luminance distribution having an output luminance profile having first and second maxima in luminance at first and second different polar locations with a minimum in luminance therebetween.

26. A display device according to claim 25, wherein the luminance of the minimum is at most 25% of the luminance of the first and second maxima.

27. A display device according to claim 1, wherein the backlight comprises:
  at least one first light source arranged to provide input light;
  at least one second light source arranged to provide input light in an opposite direction from the at least one first light source;
  a waveguide arrangement comprising at least one waveguide, the waveguide arrangement being arranged to receive the input light from the at least one first light source and the at least one second light source and to cause light from the at least one first light source and the at least one second light source to exit from the waveguide arrangement by breaking total internal reflection; and
  an optical turning film component comprising:
    an input surface arranged to receive the light exiting from the waveguide arrangement through a light guiding surface of the at least one waveguide of the waveguide arrangement by breaking total internal reflection, the input surface extending across the plane; and
    an output surface facing the input surface, wherein the input surface comprises an array of elongate prismatic elements.

28. A display device according to claim 27, wherein the waveguide arrangement comprises:
  a waveguide extending across a plane and comprising:
    first and second opposed light guiding surfaces arranged to guide light along the waveguide, the second light guiding surface being arranged to guide light by total internal reflection, and
    first and second input ends arranged between the first and second light guiding surfaces and extending in a lateral direction between the first and second light guiding surfaces;
  wherein the at least one first light source is arranged to input light into the waveguide through the first input end and the at least one second light source is arranged to input light into the waveguide through the second input end, and
  the waveguide is arranged to cause light from the at least one first light source and the at least one second light source to exit from the waveguide through one of the first and second light guiding surfaces by breaking total internal reflection.

29. A display device according to claim 27, wherein the waveguide arrangement comprises:
  a first waveguide extending across a plane and comprising
    first and second opposed light guiding surfaces arranged to guide light along the first waveguide, the second light guiding surface being arranged to guide light by total internal reflection; and
    a first input end arranged between the first and second light guiding surfaces of the first waveguide and extending in a lateral direction between the first and second light guiding surfaces;
  wherein the at least one first light source is arranged to input light into the first waveguide through the first input end, and the first waveguide is arranged to cause light from the at least one first light source to exit from the first waveguide through one of the first and second light guiding surface by breaking total internal reflection;
  a second waveguide extending across the plane arranged in series with the first waveguide and comprising
    first and second opposed light guiding surfaces arranged to guide light along the second waveguide, the second light guiding surface being arranged to guide light by total internal reflection, and
    a second input end arranged between the first and second light guiding surfaces of the second waveguide and extending in a lateral direction between the first and second light guiding surfaces;
  wherein the at least one second light source is arranged to input light into the second waveguide through the second input end, and the second waveguide is arranged to cause light from the at least one second light source to exit from the second waveguide through one of the first and second light guiding surfaces by breaking total internal reflection, and
  wherein the first and second waveguides are oriented so that at least one first light source and at least one second light source input light into the first and second waveguides in opposite directions.

30. A display device according to claim 27, wherein the prismatic elements each comprise a pair of elongate facets defining a ridge therebetween.

31. A display according to claim 27, wherein the light from the first light source exits the backlight with a first angular distribution and the light from the second light source exits the backlight with a second angular distribution different from the first angular distribution.

32. A display according to claim 31, wherein the first angular distribution is symmetrical about an axis of symmetry of the backlight and the second angular distribution is asymmetrical about the same axis of symmetry of the backlight.

33. A display according to claim 32, wherein the asymmetrical distribution is to either the left or the right of an axis of symmetry of the backlight.

34. A display device according to claim 1, wherein the magnitude of the difference between the first retardance value and the second retardance value is at least 25% of the average of the first retardance value and the second retardance value.

35. A display device according to claim 1, wherein said other of the at least one first polar control retarder and the at least one second polar control retarder is between the backlight and the transmissive spatial light modulator.

36. A display device according to claim 1, wherein said one of the at least one first polar control retarder and the at least one second polar control retarder is on the output side of said other of the at least one first polar control retarder and the at least one second polar control retarder.

* * * * *